(12) United States Patent
Pervan et al.

(10) Patent No.: US 12,509,884 B2
(45) Date of Patent: *Dec. 30, 2025

(54) MECHANICAL LOCKING OF FLOOR PANELS WITH A FLEXIBLE BRISTLE TONGUE

(71) Applicant: Välinge Innovation AB, Viken (SE)

(72) Inventors: Darko Pervan, Viken (SE); Agne Palsson, Hasslarp (SE)

(73) Assignee: VÄLINGE INNOVATION AB, Viken (SE)

( * ) Notice: Subject to any disclaimer, the term of this patent is extended or adjusted under 35 U.S.C. 154(b) by 190 days.

This patent is subject to a terminal disclaimer.

(21) Appl. No.: 18/313,110

(22) Filed: May 5, 2023

(65) Prior Publication Data
US 2024/0076882 A1 Mar. 7, 2024

Related U.S. Application Data

(63) Continuation of application No. 17/518,836, filed on Nov. 4, 2021, now Pat. No. 11,680,415, which is a (Continued)

(30) Foreign Application Priority Data

Jul. 11, 2006 (SE) .................... 0601550-7

(51) Int. Cl.
*E04F 15/00* (2006.01)
*E04B 5/00* (2006.01)
(Continued)

(52) U.S. Cl.
CPC .......... *E04F 15/02038* (2013.01); *E04B 5/00* (2013.01); *E04F 15/02* (2013.01);
(Continued)

(58) Field of Classification Search
CPC .......... E04F 15/02033; E04F 15/02038; E04F 15/107; E04F 15/102; E04F 15/02;
(Continued)

(56) References Cited

U.S. PATENT DOCUMENTS 87,853 A 3/1869 Kappes et al.
108,068 A 10/1870 Utley
(Continued)

FOREIGN PATENT DOCUMENTS

CA 2456513 A1 2/2003
CA 2501898 A1 11/2005
(Continued)

OTHER PUBLICATIONS

"Answer, Affirmative Defenses and Counterclaims of Defendant Valinge Innovation AB", *Akzenta Paneele + Profile GmbH and W. Classen GmbH & Co. KG v. Brown-West L.L.0 d/b/a Carpet One Floor & Home, Shaw Industries Group. Inc. and Valinge Innovation AB* , Apr. 9, 2010 , 28 pages.
(Continued)

*Primary Examiner* — Chi Q Nguyen
(74) *Attorney, Agent, or Firm* — Boone IP Law

(57) ABSTRACT

Floor panels which are provided with a mechanical locking system including a displaceable tongue in a displacement groove. The tongue is moulded and provided with bendable protrusions. A building panel having an edge portion provided with a groove, in which a tongue formed as a separate part is received, wherein the tongue includes at least two bow shaped protrusions at a first long edge of the tongue, and wherein the protrusions are arranged bendable in the groove.

19 Claims, 18 Drawing Sheets

Related U.S. Application Data continuation of application No. 16/861,686, filed on Apr. 29, 2020, now Pat. No. 11,193,283, which is a continuation of application No. 15/172,926, filed on Jun. 3, 2016, now Pat. No. 10,669,723, which is a continuation of application No. 14/463,972, filed on Aug. 20, 2014, now Pat. No. 9,382,716, which is a continuation of application No. 13/728,121, filed on Dec. 27, 2012, now Pat. No. 8,844,236, which is a continuation of application No. 13/195,297, filed on Aug. 1, 2011, now Pat. No. 8,359,805, which is a continuation of application No. 12/788,384, filed on May 27, 2010, now Pat. No. 8,033,074, which is a continuation of application No. 11/775,885, filed on Jul. 11, 2007, now Pat. No. 7,908,815, which is a continuation-in-part of application No. PCT/SE2006/001218, filed on Oct. 27, 2006.

(60) Provisional application No. 60/806,975, filed on Jul. 11, 2006.

(51) Int. Cl.
| | | |
|---|---|---|
| *E04F 15/02* | (2006.01) | |
| *E04F 15/04* | (2006.01) | |
| *E04F 15/08* | (2006.01) | |
| *E04F 15/10* | (2006.01) | |
| *E04F 15/18* | (2006.01) | |

(52) U.S. Cl.
CPC ............. *E04F 15/04* (2013.01); *E04F 15/08* (2013.01); *E04F 15/10* (2013.01); *E04F 15/107* (2013.01); *E04F 15/18* (2013.01); *E04F 2201/0115* (2013.01); *E04F 2201/0138* (2013.01); *E04F 2201/0153* (2013.01); *E04F 2201/0523* (2013.01); *E04F 2201/0547* (2013.01); *Y10T 428/167* (2015.01)

(58) Field of Classification Search
CPC . E04F 15/04; E04F 15/08; E04F 15/10; E04F 15/18; E04F 2201/0115; E04F 2201/042; E04F 2201/0107; E04F 2201/03; E04F 2201/0552; E04F 2201/023; E04F 2201/0525; E04F 2201/0547; E04F 2201/043; E04F 2201/0153; E04F 2201/0138; E04B 5/00; Y10T 428/167
See application file for complete search history.

(56) References Cited

U.S. PATENT DOCUMENTS

| | | |
|---|---|---|
| 124,228 A | 3/1872 | Stuart |
| 213,740 A | 4/1879 | Conner |
| 274,354 A | 3/1883 | Mccarthy et al. |
| 316,176 A | 4/1885 | Ransom |
| 400,776 A | 4/1889 | Casse |
| 634,581 A | 10/1899 | Miller |
| 676,983 A | 6/1901 | Goldsmith |
| 861,911 A | 7/1907 | Stewart |
| 1,194,636 A | 8/1916 | Joy |
| 1,350,904 A | 8/1920 | Walters |
| 1,650,375 A | 11/1927 | Milliken |
| 1,723,306 A | 8/1929 | Sipe |
| 1,743,492 A | 1/1930 | Sipe |
| 1,787,027 A | 12/1930 | Wasleff |
| 1,809,393 A | 6/1931 | Rockwell |
| 1,902,716 A | 3/1933 | Newton |
| 1,925,070 A | 8/1933 | Livezey |
| 1,995,264 A | 3/1935 | Mason |
| 2,015,813 A | 10/1935 | Nielsen |
| 2,017,403 A | 10/1935 | Lorig et al. |
| 2,026,511 A | 12/1935 | Storm |
| 2,027,292 A | 1/1936 | Rockwell |
| 2,078,801 A | 4/1937 | Lewis |
| 2,088,238 A | 7/1937 | Ray |
| 2,089,075 A | 8/1937 | Siebs |
| 2,110,728 A | 3/1938 | Hoggatt |
| 2,142,305 A | 1/1939 | Davis |
| 2,204,675 A | 6/1940 | Grunert |
| 2,266,464 A | 12/1941 | Kraft |
| 2,277,758 A | 3/1942 | Hawkins |
| 2,303,745 A | 12/1942 | Karreman |
| 2,430,200 A | 11/1947 | Wilson |
| 2,497,837 A | 2/1950 | Nelson |
| 2,596,280 A | 5/1952 | Nystrom |
| 2,732,706 A | 1/1956 | Friedman |
| 2,734,684 A | 2/1956 | Jun et al. |
| 2,740,167 A | 4/1956 | Rowley |
| 2,858,584 A | 11/1958 | Gaines |
| 2,863,185 A | 12/1958 | Riedi |
| 2,865,058 A | 12/1958 | Andersson et al. |
| 2,872,712 A | 2/1959 | Brown et al. |
| 2,889,016 A | 6/1959 | Warren |
| 3,023,681 A | 3/1962 | Worson |
| 3,077,703 A | 2/1963 | Bergstrom |
| 3,099,110 A | 7/1963 | Spaight |
| 3,114,477 A | 12/1963 | Dixon |
| 3,147,522 A | 9/1964 | Schumm |
| 3,172,237 A | 3/1965 | Bradley |
| 3,187,612 A | 6/1965 | Hervey |
| 3,271,787 A | 9/1966 | Clary |
| 3,276,797 A | 10/1966 | Humes |
| 3,308,588 A | 3/1967 | Wedel |
| 3,325,585 A | 6/1967 | Brenneman |
| 3,331,180 A | 7/1967 | Vissing |
| 3,378,958 A | 4/1968 | Parks et al. |
| 3,396,640 A | 8/1968 | Fujihara |
| 3,436,888 A | 4/1969 | Ottosson |
| 3,512,324 A | 5/1970 | Reed |
| 3,517,927 A | 6/1970 | Kennel |
| 3,526,071 A | 9/1970 | Watanabe |
| 3,535,844 A | 10/1970 | Glaros |
| 3,535,884 A | 10/1970 | Chaney |
| 3,554,850 A | 1/1971 | Kuhle |
| 3,572,224 A | 3/1971 | Perry |
| 3,579,941 A | 5/1971 | Tibbals |
| 3,626,822 A | 12/1971 | Koster |
| 3,640,191 A | 2/1972 | Hendrich |
| 3,694,983 A | 10/1972 | Couquet |
| 3,720,027 A | 3/1973 | Christensen |
| 3,722,379 A | 3/1973 | Koester |
| 3,731,445 A | 5/1973 | Hoffmann et al. |
| 3,742,669 A | 7/1973 | Mansfeld |
| 3,760,485 A | 9/1973 | Smith |
| 3,760,547 A | 9/1973 | Brenneman |
| 3,760,548 A | 9/1973 | Sauer et al. |
| 3,764,767 A | 10/1973 | Randolph |
| 3,778,954 A | 12/1973 | Meserole |
| 3,849,235 A | 11/1974 | Gwynne |
| 3,919,820 A | 11/1975 | Green |
| 3,930,808 A | 1/1976 | Miller et al. |
| 3,950,915 A | 4/1976 | Cole |
| 3,994,609 A | 11/1976 | Puccio |
| 4,007,767 A | 2/1977 | Colledge |
| 4,007,994 A | 2/1977 | Brown |
| 4,030,852 A | 6/1977 | Hein |
| 4,037,377 A | 7/1977 | Howell et al. |
| 4,041,665 A | 8/1977 | de Munck |
| 4,064,571 A | 12/1977 | Phipps |
| 4,080,086 A | 3/1978 | Watson |
| 4,082,129 A | 4/1978 | Morelock |
| 4,100,710 A | 7/1978 | Kowallik |
| 4,104,840 A | 8/1978 | Heintz et al. |
| 4,107,892 A | 8/1978 | Bellem |
| 4,113,399 A | 9/1978 | Hansen, Sr. |
| 4,154,041 A | 5/1979 | Namy |
| 4,169,688 A | 10/1979 | Toshio |
| RE30,154 E | 11/1979 | Jarvis |
| 4,196,554 A | 4/1980 | Anderson et al. |
| 4,227,430 A | 10/1980 | Jansson et al. |

(56) References Cited

U.S. PATENT DOCUMENTS

| | | | |
|---|---|---|---|
| 4,299,070 A | 11/1981 | Oltmanns et al. |
| 4,304,083 A | 12/1981 | Anderson |
| 4,426,820 A | 1/1984 | Terbrack et al. |
| 4,447,172 A | 5/1984 | Galbreath |
| 4,512,131 A | 4/1985 | Laramore |
| 4,599,841 A | 7/1986 | Haid et al. |
| 4,622,784 A | 11/1986 | Black et al. |
| 4,648,165 A | 3/1987 | Whitehorne |
| 4,819,932 A | 4/1989 | Trotter, Jr. |
| 4,948,716 A | 8/1990 | Mihayashi et al. |
| 4,998,395 A | 3/1991 | Bezner |
| 5,007,222 A | 4/1991 | Raymond |
| 5,026,112 A | 6/1991 | Rice |
| 5,071,282 A | 12/1991 | Brown |
| 5,105,980 A | 4/1992 | Hofmann |
| 5,135,597 A | 8/1992 | Barker |
| 5,148,850 A | 9/1992 | Urbanick |
| 5,173,012 A | 12/1992 | Ortwein et al. |
| 5,182,892 A | 2/1993 | Chase |
| 5,247,773 A | 9/1993 | Weir |
| 5,272,850 A | 12/1993 | Mysliwiec et al. |
| 5,274,979 A | 1/1994 | Tsai |
| 5,281,055 A | 1/1994 | Neitzke et al. |
| 5,293,728 A | 3/1994 | Christopher et al. |
| 5,295,341 A | 3/1994 | Kajiwara |
| 5,344,700 A | 9/1994 | McGath et al. |
| 5,348,778 A | 9/1994 | Knipp et al. |
| 5,349,796 A | 9/1994 | Meyerson |
| 5,373,674 A | 12/1994 | Winter, IV |
| 5,465,546 A | 11/1995 | Buse |
| 5,485,702 A | 1/1996 | Sholton |
| 5,502,939 A | 4/1996 | Zadok et al. |
| 5,548,937 A | 8/1996 | Shimonohara |
| 5,577,357 A | 11/1996 | Civelli |
| 5,582,611 A | 12/1996 | Tsuruta et al. |
| 5,587,218 A | 12/1996 | Betz |
| 5,598,682 A | 2/1997 | Haughian |
| 5,616,389 A | 4/1997 | Blatz |
| 5,618,602 A | 4/1997 | Nelson |
| 5,634,309 A | 6/1997 | Polen |
| 5,658,086 A | 8/1997 | Brokaw et al. |
| 5,671,575 A | 9/1997 | Wu |
| 5,694,730 A | 12/1997 | Del Rincon et al. |
| 5,755,068 A | 5/1998 | Ormiston |
| 5,860,267 A | 1/1999 | Pervan |
| 5,899,038 A | 5/1999 | Stroppiana |
| 5,910,084 A | 6/1999 | Koike et al. |
| 5,950,389 A | 9/1999 | Porter |
| 5,970,675 A | 10/1999 | Schray |
| 6,006,486 A | 12/1999 | Moriau et al. |
| 6,029,416 A | 2/2000 | Andersson |
| 6,052,960 A | 4/2000 | Yonemura et al. |
| 6,065,262 A | 5/2000 | Motta |
| 6,098,354 A | 8/2000 | Skandis |
| 6,122,879 A | 9/2000 | Montes |
| 6,134,854 A | 10/2000 | Stanchfield et al. |
| 6,145,261 A | 11/2000 | Godfrey et al. |
| 6,164,618 A | 12/2000 | Yonemura |
| 6,173,548 B1 | 1/2001 | Hamar et al. |
| 6,182,410 B1 | 2/2001 | Pervan |
| 6,203,653 B1 | 3/2001 | Seidner |
| 6,210,512 B1 | 4/2001 | Jones |
| 6,216,409 B1 | 4/2001 | Roy et al. |
| 6,254,301 B1 | 7/2001 | Hatch |
| 6,273,315 B1 | 8/2001 | Mcguinness et al. |
| 6,295,779 B1 | 10/2001 | Canfield |
| 6,314,701 B1 | 11/2001 | Meyerson |
| 6,324,796 B1 | 12/2001 | Heath |
| 6,324,809 B1 | 12/2001 | Nelson |
| 6,332,733 B1 | 12/2001 | Hamberger et al. |
| 6,339,908 B1 | 1/2002 | Chuang |
| 6,345,481 B1 | 2/2002 | Nelson |
| 6,358,352 B1 | 3/2002 | Schmidt et al. |
| 6,363,677 B1 | 4/2002 | Chen et al. |
| 6,385,936 B1 | 5/2002 | Schneider |
| 6,418,683 B1 | 7/2002 | Martensson et al. |
| 6,446,413 B1 | 9/2002 | Gruber |
| 6,449,918 B1 | 9/2002 | Nelson |
| 6,450,235 B1 | 9/2002 | Lee |
| 6,490,836 B1 | 12/2002 | Moriau et al. |
| 6,505,452 B1 | 1/2003 | Hannig et al. |
| 6,536,178 B1 | 3/2003 | Paalsson et al. |
| 6,546,691 B2 | 4/2003 | Leopolder |
| 6,553,724 B1 | 4/2003 | Bigler |
| 6,576,079 B1 | 6/2003 | Kai et al. |
| 6,584,747 B2 | 7/2003 | Kettler et al. |
| 6,588,166 B2 | 7/2003 | Martensson et al. |
| 6,591,568 B1 | 7/2003 | Palsson |
| 6,601,359 B2 | 8/2003 | Olofsson |
| 6,608,777 B2 | 8/2003 | Bloch et al. |
| 6,617,009 B1 | 9/2003 | Chen et al. |
| 6,647,689 B2 | 11/2003 | Pletzer et al. |
| 6,647,690 B1 | 11/2003 | Martensson |
| 6,651,400 B1 | 11/2003 | Murphy |
| 6,670,019 B2 | 12/2003 | Andersson |
| 6,672,030 B2 | 1/2004 | Schulte |
| 6,681,820 B2 | 1/2004 | Olofsson |
| 6,682,254 B1 | 1/2004 | Palmblad et al. |
| 6,684,592 B2 | 2/2004 | Martin |
| 6,685,391 B1 | 2/2004 | Gideon |
| 6,729,091 B1 | 5/2004 | Martensson |
| 6,763,643 B1 | 7/2004 | Martensson |
| 6,766,622 B1 | 7/2004 | Thiers |
| 6,769,218 B2 | 8/2004 | Pervan et al. |
| 6,769,219 B2 | 8/2004 | Schwitte et al. |
| 6,769,835 B2 | 8/2004 | Stridsman |
| 6,802,166 B1 | 10/2004 | Gerhard |
| 6,804,926 B1 | 10/2004 | Eisermann |
| 6,808,777 B2 | 10/2004 | Andersson et al. |
| 6,854,235 B2 | 2/2005 | Martensson |
| 6,862,857 B2 | 3/2005 | Tychsen |
| 6,865,855 B2 | 3/2005 | Knauseder |
| 6,874,291 B1 | 4/2005 | Weber |
| 6,880,307 B2 | 4/2005 | Schwitte et al. |
| 6,948,716 B2 | 9/2005 | Drouin |
| 7,021,019 B2 | 4/2006 | Knauseder |
| 7,040,068 B2 | 5/2006 | Moriau et al. |
| 7,051,486 B2 | 5/2006 | Pervan |
| 7,108,031 B1 | 9/2006 | Secrest |
| 7,121,058 B2 | 10/2006 | Palsson et al. |
| 7,127,860 B2 | 10/2006 | Pervan et al. |
| 7,137,229 B2 | 11/2006 | Pervan |
| 7,152,383 B1 | 12/2006 | Wilkinson, Jr. et al. |
| 7,156,383 B1 | 1/2007 | Jacobs |
| 7,188,456 B2 | 3/2007 | Knauseder |
| 7,219,392 B2 | 5/2007 | Mullet et al. |
| 7,251,916 B2 | 8/2007 | Konzelmann et al. |
| 7,251,918 B2 | 8/2007 | Reif et al. |
| 7,257,926 B1 | 8/2007 | Kirby |
| 7,275,350 B2 | 10/2007 | Pervan et al. |
| 7,337,588 B1 | 3/2008 | Moebus |
| 7,377,081 B2 | 5/2008 | Ruhdorfer |
| 7,380,383 B2 | 6/2008 | Olofsson et al. |
| 7,441,384 B2 | 10/2008 | Miller et al. |
| 7,451,578 B2 | 11/2008 | Hannig |
| 7,454,875 B2 | 11/2008 | Pervan et al. |
| 7,516,588 B2 | 4/2009 | Pervan |
| 7,517,427 B2 | 4/2009 | Sjoberg et al. |
| 7,520,092 B2 | 4/2009 | Showers et al. |
| 7,533,500 B2 | 5/2009 | Morton et al. |
| 7,556,849 B2 | 7/2009 | Thompson et al. |
| 7,568,322 B2 | 8/2009 | Pervan |
| 7,584,583 B2 | 9/2009 | Bergelin et al. |
| 7,591,116 B2 | 9/2009 | Thiers et al. |
| 7,603,826 B1 | 10/2009 | Moebus |
| 7,614,197 B2 | 11/2009 | Nelson |
| 7,617,651 B2 | 11/2009 | Grafenauer |
| 7,621,092 B2 | 11/2009 | Groeke et al. |
| 7,621,094 B2 | 11/2009 | Moriau et al. |
| 7,634,884 B2 | 12/2009 | Pervan et al. |
| 7,637,068 B2 | 12/2009 | Pervan |
| 7,644,553 B2 | 1/2010 | Knauseder |
| 7,654,055 B2 | 2/2010 | Ricker |
| 7,656,789 B2 | 2/2010 | Alves et al. |

(56) References Cited

U.S. PATENT DOCUMENTS

| | | |
|---|---|---|
| 7,677,005 B2 | 3/2010 | Pervan |
| 7,716,889 B2 | 5/2010 | Pervan |
| 7,721,503 B2 | 5/2010 | Pervan et al. |
| 7,726,088 B2 | 6/2010 | Muehlebach |
| 7,748,176 B2 | 7/2010 | Harding et al. |
| 7,757,452 B2 | 7/2010 | Pervan |
| 7,802,411 B2 | 9/2010 | Pervan et al. |
| 7,806,624 B2 | 10/2010 | McLean et al. |
| 7,827,749 B2 | 11/2010 | Groeke et al. |
| 7,841,144 B2 | 11/2010 | Pervan |
| 7,841,145 B2 | 11/2010 | Pervan et al. |
| 7,841,150 B2 | 11/2010 | Pervan |
| 7,849,642 B2 | 12/2010 | Forster et al. |
| 7,856,789 B2 | 12/2010 | Eisermann |
| 7,861,482 B2 | 1/2011 | Pervan et al. |
| 7,866,110 B2 | 1/2011 | Pervan |
| 7,896,571 B1 | 3/2011 | Hannig et al. |
| 7,900,416 B1 | 3/2011 | Yokubison et al. |
| 7,908,815 B2 | 3/2011 | Pervan et al. |
| 7,908,816 B2 | 3/2011 | Grafenauer et al. |
| 7,913,471 B2 | 3/2011 | Pervan |
| 7,930,862 B2 | 4/2011 | Bergelin et al. |
| 7,954,295 B2 | 6/2011 | Pervan |
| 7,964,133 B2 | 6/2011 | Cappelle et al. |
| 7,980,039 B2 | 7/2011 | Groeke et al. |
| 7,980,041 B2 | 7/2011 | Pervan et al. |
| 8,001,741 B2 | 8/2011 | Duernberger |
| 8,006,458 B1 | 8/2011 | Olofsson et al. |
| 8,033,074 B2 | 10/2011 | Pervan et al. |
| 8,042,311 B2 | 10/2011 | Pervan et al. |
| 8,061,104 B2 | 11/2011 | Pervan |
| 8,079,196 B2 | 12/2011 | Pervan |
| 8,112,967 B2 | 2/2012 | Pervan et al. |
| 8,171,692 B2 | 5/2012 | Pervan |
| 8,181,416 B2 | 5/2012 | Pervan et al. |
| 8,191,334 B2 | 6/2012 | Braun |
| 8,220,217 B2 | 7/2012 | Muehlebach |
| 8,234,830 B2 | 8/2012 | Pervan et al. |
| 8,245,478 B2 | 8/2012 | Nilsson et al. |
| 8,281,549 B2 | 10/2012 | Du |
| 8,302,367 B2 | 11/2012 | Schulte |
| 8,336,272 B2 | 12/2012 | Prager et al. |
| 8,341,914 B2 | 1/2013 | Pervan et al. |
| 8,341,915 B2 | 1/2013 | Pervan et al. |
| 8,353,140 B2 | 1/2013 | Pervan et al. |
| 8,359,794 B2 | 1/2013 | Biro et al. |
| 8,359,805 B2 | 1/2013 | Pervan et al. |
| 8,365,499 B2 | 2/2013 | Nilsson et al. |
| 8,375,673 B2 | 2/2013 | Evjen |
| 8,381,476 B2 | 2/2013 | Hannig |
| 8,381,477 B2 | 2/2013 | Pervan et al. |
| 8,387,327 B2 | 3/2013 | Pervan |
| 8,448,402 B2 | 5/2013 | Pervan et al. |
| 8,499,521 B2 | 8/2013 | Pervan et al. |
| 8,505,257 B2 | 8/2013 | Boo et al. |
| 8,511,031 B2 | 8/2013 | Bergelin et al. |
| 8,522,505 B2 | 9/2013 | Beach et al. |
| 8,528,289 B2 | 9/2013 | Pervan et al. |
| 8,544,230 B2 | 10/2013 | Pervan |
| 8,544,232 B2 | 10/2013 | Wybo et al. |
| 8,544,233 B2 | 10/2013 | Pálsson et al. |
| 8,544,234 B2 | 10/2013 | Pervan et al. |
| 8,572,922 B2 | 11/2013 | Pervan |
| 8,576,675 B2 | 11/2013 | Shimoda et al. |
| 8,578,675 B2 | 11/2013 | Palsson et al. |
| 8,590,250 B2 | 11/2013 | Oh |
| 8,596,013 B2 | 12/2013 | Boo |
| 8,615,952 B2 | 12/2013 | Engstrom |
| 8,621,814 B2 | 1/2014 | Cappelle |
| 8,627,862 B2 | 1/2014 | Pervan et al. |
| 8,631,623 B2 | 1/2014 | Engstrom |
| 8,635,829 B2 | 1/2014 | Schulte |
| 8,640,418 B2 | 2/2014 | Paetrow et al. |
| 8,640,424 B2 | 2/2014 | Pervan et al. |
| 8,650,826 B2 | 2/2014 | Pervan et al. |
| 8,677,714 B2 | 3/2014 | Pervan |
| 8,689,512 B2 | 4/2014 | Pervan |
| 8,701,368 B2 | 4/2014 | Vermeulen et al. |
| 8,707,650 B2 | 4/2014 | Pervan et al. |
| 8,713,886 B2 | 5/2014 | Pervan et al. |
| 8,731,410 B2 | 5/2014 | Welch |
| 8,733,065 B2 | 5/2014 | Pervan |
| 8,733,410 B2 | 5/2014 | Pervan |
| 8,763,341 B2 | 7/2014 | Pervan |
| 8,769,905 B2 | 7/2014 | Pervan et al. |
| 8,776,473 B2 | 7/2014 | Pervan et al. |
| 8,806,832 B2 | 8/2014 | Kell |
| 8,833,026 B2 | 9/2014 | Devos et al. |
| 8,844,236 B2 | 9/2014 | Pervan et al. |
| 8,857,126 B2 | 10/2014 | Pervan et al. |
| 8,869,485 B2 | 10/2014 | Pervan |
| 8,887,468 B2 | 11/2014 | Hakansson et al. |
| 8,898,988 B2 | 12/2014 | Pervan |
| 8,925,274 B2 | 1/2015 | Darko et al. |
| 8,938,929 B2 | 1/2015 | Engstrom |
| 8,959,866 B2 | 2/2015 | Pervan |
| 8,973,331 B2 | 3/2015 | Boo |
| 8,991,055 B2 | 3/2015 | Cappelle |
| 8,997,423 B2 | 4/2015 | Mann |
| 8,997,430 B1 | 4/2015 | Vermeulen et al. |
| 9,027,306 B2 | 5/2015 | Pervan |
| 9,051,738 B2 | 6/2015 | Pervan et al. |
| 9,068,360 B2 | 6/2015 | Darko |
| 9,080,329 B2 | 7/2015 | Döhring et al. |
| 9,091,077 B2 | 7/2015 | Boo |
| 9,103,126 B2 | 8/2015 | Kell |
| 9,103,128 B2 | 8/2015 | Pomberger |
| 9,151,062 B2 | 10/2015 | Cappelle et al. |
| 9,181,697 B2 | 11/2015 | Masanek, Jr. et al. |
| 9,194,134 B2 | 11/2015 | Nygren et al. |
| 9,206,611 B2 | 12/2015 | Vermeulen et al. |
| 9,212,492 B2 | 12/2015 | Pervan |
| 9,216,541 B2 | 12/2015 | Boo et al. |
| 9,238,917 B2 | 1/2016 | Pervan et al. |
| 9,284,737 B2 | 3/2016 | Pervan et al. |
| 9,290,948 B2 | 3/2016 | Cappelle et al. |
| 9,309,679 B2 | 4/2016 | Pervan et al. |
| 9,316,002 B2 | 4/2016 | Boo |
| 9,340,974 B2 | 5/2016 | Pervan et al. |
| 9,347,227 B2 | 5/2016 | Ramachandra et al. |
| 9,347,469 B2 | 5/2016 | Pervan et al. |
| 9,359,774 B2 | 6/2016 | Pervan |
| 9,366,034 B2 | 6/2016 | Meirlaen et al. |
| 9,366,036 B2 | 6/2016 | Pervan |
| 9,371,654 B2 | 6/2016 | Cappelle |
| 9,376,821 B2 | 6/2016 | Pervan et al. |
| 9,382,716 B2 | 7/2016 | Pervan et al. |
| 9,388,584 B2 | 7/2016 | Pervan et al. |
| 9,428,919 B2 | 8/2016 | Pervan et al. |
| 9,453,347 B2 | 9/2016 | Pervan et al. |
| 9,458,634 B2 | 10/2016 | Derelov |
| 9,476,202 B2 | 10/2016 | Clancy et al. |
| 9,482,012 B2 | 11/2016 | Nygren et al. |
| 9,540,825 B2 | 1/2017 | Ramachandra |
| 9,540,826 B2 | 1/2017 | Pervan et al. |
| 9,555,529 B2 | 1/2017 | Ronconi |
| 9,663,940 B2 | 5/2017 | Boo |
| 9,725,912 B2 | 8/2017 | Pervan |
| 9,771,723 B2 | 9/2017 | Pervan |
| 9,777,487 B2 | 10/2017 | Pervan et al. |
| 9,803,374 B2 | 10/2017 | Pervan |
| 9,803,375 B2 | 10/2017 | Pervan et al. |
| 9,803,376 B1 | 10/2017 | Deel |
| 9,821,428 B2 | 11/2017 | Yoshikawa et al. |
| 9,822,533 B2 | 11/2017 | Huang |
| 9,856,656 B2 | 1/2018 | Pervan |
| 9,874,027 B2 | 1/2018 | Pervan et al. |
| 9,945,130 B2 | 4/2018 | Nygren et al. |
| 9,951,526 B2 | 4/2018 | Boo et al. |
| 10,000,935 B2 | 6/2018 | Kell |
| 10,006,210 B2 | 6/2018 | Pervan et al. |
| 10,017,948 B2 | 7/2018 | Boo |
| 10,113,319 B2 | 10/2018 | Pervan |
| 10,125,488 B2 | 11/2018 | Boo |

(56) References Cited

U.S. PATENT DOCUMENTS

| | | | |
|---|---|---|---|
| 10,138,636 | B2 | 11/2018 | Pervan |
| 10,161,139 | B2 | 12/2018 | Pervan |
| 10,180,005 | B2 | 1/2019 | Pervan et al. |
| 10,214,915 | B2 | 2/2019 | Pervan et al. |
| 10,214,917 | B2 | 2/2019 | Pervan et al. |
| 10,240,348 | B2 | 3/2019 | Pervan et al. |
| 10,240,349 | B2 | 3/2019 | Pervan et al. |
| 10,246,883 | B2 | 4/2019 | Derelov |
| 10,352,049 | B2 | 7/2019 | Boo |
| 10,358,830 | B2 | 7/2019 | Pervan |
| 10,378,217 | B2 | 8/2019 | Pervan |
| 10,458,125 | B2 | 10/2019 | Pervan |
| 10,480,196 | B2 | 11/2019 | Boo |
| 10,519,676 | B2 | 12/2019 | Pervan |
| 10,526,792 | B2 | 1/2020 | Pervan et al. |
| 10,538,922 | B2 | 1/2020 | Pervan |
| 10,570,625 | B2 | 2/2020 | Pervan |
| 10,640,989 | B2 | 5/2020 | Pervan |
| 10,655,339 | B2 | 5/2020 | Pervan |
| 10,669,723 | B2 | 6/2020 | Pervan et al. |
| 10,724,251 | B2 | 7/2020 | Kell |
| 10,731,358 | B2 | 8/2020 | Pervan |
| 10,794,065 | B2 | 10/2020 | Boo et al. |
| 10,828,798 | B2 | 11/2020 | Fransson |
| 10,876,562 | B2 | 12/2020 | Pervan |
| 10,933,592 | B2 | 3/2021 | Blomgren et al. |
| 10,934,721 | B2 | 3/2021 | Pervan et al. |
| 10,953,566 | B2 | 3/2021 | Fransson et al. |
| 10,968,639 | B2 | 4/2021 | Pervan et al. |
| 10,975,577 | B2 | 4/2021 | Pervan et al. |
| 10,995,501 | B2 | 5/2021 | Pervan |
| 11,045,933 | B2 | 6/2021 | Fransson et al. |
| 11,053,691 | B2 | 7/2021 | Pervan |
| 11,053,692 | B2 | 7/2021 | Pervan |
| 11,060,302 | B2 | 7/2021 | Ylikangas et al. |
| 11,066,835 | B2 | 7/2021 | Boo |
| 11,078,673 | B2 | 8/2021 | Pervan et al. |
| 11,091,920 | B2 | 8/2021 | Kell |
| 11,131,099 | B2 | 9/2021 | Pervan |
| 11,174,646 | B2 | 11/2021 | Pervan |
| 11,193,283 | B2 | 12/2021 | Pervan et al. |
| 11,261,608 | B2 | 3/2022 | Pervan |
| 11,274,453 | B2 | 3/2022 | Pervan |
| 11,326,353 | B2 | 5/2022 | Nilsson et al. |
| 11,331,824 | B2 | 5/2022 | Myllykangas et al. |
| 11,359,381 | B2 | 6/2022 | Sieder et al. |
| 11,680,415 | B2 * | 6/2023 | Pervan ................ E04B 5/00 52/582.1 |
| 2001/0024707 | A1 | 9/2001 | Andersson et al. |
| 2001/0034991 | A1 | 11/2001 | Martensson et al. |
| 2001/0045150 | A1 | 11/2001 | Owens |
| 2002/0007608 | A1 | 1/2002 | Pervan |
| 2002/0007609 | A1 | 1/2002 | Pervan |
| 2002/0014047 | A1 | 2/2002 | Thiers et al. |
| 2002/0031646 | A1 * | 3/2002 | Chen ................ E04F 15/10 428/167 |
| 2002/0046433 | A1 | 4/2002 | Sellman et al. |
| 2002/0056245 | A1 | 5/2002 | Thiers |
| 2002/0069611 | A1 | 6/2002 | Leopolder |
| 2002/0083673 | A1 | 7/2002 | Kettler et al. |
| 2002/0092263 | A1 | 7/2002 | Schulte |
| 2002/0095694 | A1 | 7/2002 | Johal et al. |
| 2002/0095894 | A1 | 7/2002 | Pervan |
| 2002/0100231 | A1 | 8/2002 | Miller et al. |
| 2002/0105343 | A1 | 8/2002 | Scheible et al. |
| 2002/0108343 | A1 | 8/2002 | Knauseder |
| 2002/0170258 | A1 | 11/2002 | Schwitte et al. |
| 2002/0170259 | A1 | 11/2002 | Ferris |
| 2002/0178674 | A1 | 12/2002 | Pervan |
| 2002/0178680 | A1 | 12/2002 | Martensson et al. |
| 2002/0189190 | A1 | 12/2002 | Charmat et al. |
| 2002/0189747 | A1 | 12/2002 | Steinwender |
| 2002/0194807 | A1 | 12/2002 | Nelson et al. |
| 2003/0009971 | A1 | 1/2003 | Palmberg |
| 2003/0024199 | A1 | 2/2003 | Pervan et al. |
| 2003/0037504 | A1 | 2/2003 | Schwitte et al. |
| 2003/0066588 | A1 | 4/2003 | Pálsson et al. |
| 2003/0084636 | A1 | 5/2003 | Pervan |
| 2003/0094230 | A1 | 5/2003 | Sjoberg |
| 2003/0101674 | A1 | 6/2003 | Pervan et al. |
| 2003/0101681 | A1 | 6/2003 | Tychsen |
| 2003/0145549 | A1 | 8/2003 | Palsson et al. |
| 2003/0154676 | A1 | 8/2003 | Schwartz |
| 2003/0180091 | A1 | 9/2003 | Stridsman |
| 2003/0188504 | A1 | 10/2003 | Ralf |
| 2003/0196405 | A1 | 10/2003 | Pervan et al. |
| 2004/0016196 | A1 | 1/2004 | Pervan |
| 2004/0031225 | A1 | 2/2004 | Fowler et al. |
| 2004/0031227 | A1 | 2/2004 | Knauseder |
| 2004/0049999 | A1 | 3/2004 | Krieger |
| 2004/0060255 | A1 | 4/2004 | Knauseder |
| 2004/0068954 | A1 | 4/2004 | Martensson |
| 2004/0107659 | A1 | 6/2004 | Glockl |
| 2004/0123548 | A1 | 7/2004 | Gimpel et al. |
| 2004/0128934 | A1 | 7/2004 | Hecht |
| 2004/0137180 | A1 | 7/2004 | Sjoberg et al. |
| 2004/0139676 | A1 | 7/2004 | Knauseder |
| 2004/0139678 | A1 | 7/2004 | Pervan |
| 2004/0159066 | A1 | 8/2004 | Thiers et al. |
| 2004/0168392 | A1 | 9/2004 | Konzelmann et al. |
| 2004/0177584 | A1 | 9/2004 | Pervan |
| 2004/0182033 | A1 | 9/2004 | Wernersson |
| 2004/0182036 | A1 | 9/2004 | Sjoberg et al. |
| 2004/0188392 | A1 | 9/2004 | Campbell |
| 2004/0200175 | A1 | 10/2004 | Weber |
| 2004/0211143 | A1 | 10/2004 | Hanning |
| 2004/0238001 | A1 | 12/2004 | Risden |
| 2004/0244325 | A1 | 12/2004 | Nelson |
| 2004/0250492 | A1 | 12/2004 | Becker |
| 2004/0255541 | A1 | 12/2004 | Thiers et al. |
| 2004/0261348 | A1 | 12/2004 | Vulin |
| 2005/0003132 | A1 | 1/2005 | Blix et al. |
| 2005/0021081 | A1 | 1/2005 | Lebner |
| 2005/0028474 | A1 | 2/2005 | Kim |
| 2005/0050827 | A1 | 3/2005 | Schitter |
| 2005/0138881 | A1 | 6/2005 | Pervan |
| 2005/0160694 | A1 | 7/2005 | Pervan |
| 2005/0166514 | A1 | 8/2005 | Pervan |
| 2005/0183370 | A1 | 8/2005 | Cripps |
| 2005/0205161 | A1 | 9/2005 | Lewark |
| 2005/0210810 | A1 | 9/2005 | Pervan |
| 2005/0235593 | A1 | 10/2005 | Hecht |
| 2005/0252130 | A1 | 11/2005 | Martensson |
| 2005/0252167 | A1 | 11/2005 | Van |
| 2005/0266738 | A1 | 12/2005 | Martin et al. |
| 2005/0268570 | A2 | 12/2005 | Pervan |
| 2006/0032168 | A1 | 2/2006 | Thiers et al. |
| 2006/0053724 | A1 | 3/2006 | Braun et al. |
| 2006/0064940 | A1 | 3/2006 | Cappelle |
| 2006/0070333 | A1 | 4/2006 | Pervan |
| 2006/0099386 | A1 | 5/2006 | Smith |
| 2006/0101769 | A1 * | 5/2006 | Pervan ................ E04F 15/02 52/591.1 |
| 2006/0144004 | A1 | 7/2006 | Nollet et al. |
| 2006/0156670 | A1 | 7/2006 | Knauseder |
| 2006/0174577 | A1 | 8/2006 | Oneil |
| 2006/0179754 | A1 | 8/2006 | Yang |
| 2006/0185287 | A1 | 8/2006 | Glazer et al. |
| 2006/0236642 | A1 | 10/2006 | Pervan |
| 2006/0260254 | A1 | 11/2006 | Pervan |
| 2006/0272262 | A1 | 12/2006 | Pomberger |
| 2007/0003366 | A1 | 1/2007 | Wedberg |
| 2007/0006543 | A1 | 1/2007 | Engstrom |
| 2007/0011981 | A1 | 1/2007 | Eisermann |
| 2007/0022689 | A1 | 2/2007 | Thrush et al. |
| 2007/0028547 | A1 | 2/2007 | Grafenauer et al. |
| 2007/0065293 | A1 | 3/2007 | Hannig |
| 2007/0094969 | A1 | 5/2007 | Mcintosh et al. |
| 2007/0094985 | A1 | 5/2007 | Grafenauer |
| 2007/0108679 | A1 | 5/2007 | Grothaus |
| 2007/0113509 | A1 | 5/2007 | Zhang |
| 2007/0151189 | A1 | 7/2007 | Yang |
| 2007/0175143 | A1 | 8/2007 | Pervan et al. |
| 2007/0175156 | A1 | 8/2007 | Pervan et al. |

(56) References Cited

U.S. PATENT DOCUMENTS

| | | |
|---|---|---|
| 2007/0193178 A1 | 8/2007 | Groeke et al. |
| 2007/0209736 A1 | 9/2007 | Deringor et al. |
| 2007/0214741 A1 | 9/2007 | Llorens Miravet |
| 2008/0000182 A1 | 1/2008 | Pervan et al. |
| 2008/0000185 A1 | 1/2008 | Duernberger |
| 2008/0000186 A1 | 1/2008 | Pervan et al. |
| 2008/0000187 A1 | 1/2008 | Pervan |
| 2008/0005989 A1 | 1/2008 | Pervan et al. |
| 2008/0005998 A1 | 1/2008 | Pervan |
| 2008/0010931 A1 | 1/2008 | Pervan et al. |
| 2008/0010937 A1 | 1/2008 | Pervan et al. |
| 2008/0028707 A1 | 2/2008 | Pervan |
| 2008/0034708 A1 | 2/2008 | Pervan |
| 2008/0041008 A1 | 2/2008 | Pervan |
| 2008/0053029 A1 | 3/2008 | Ricker |
| 2008/0066415 A1 | 3/2008 | Pervan et al. |
| 2008/0104921 A1 | 5/2008 | Pervan et al. |
| 2008/0110125 A1 | 5/2008 | Pervan |
| 2008/0134607 A1 | 6/2008 | Pervan et al. |
| 2008/0134613 A1 | 6/2008 | Pervan |
| 2008/0134614 A1 | 6/2008 | Pervan et al. |
| 2008/0155930 A1 | 7/2008 | Pervan et al. |
| 2008/0172971 A1 | 7/2008 | Pervan |
| 2008/0184646 A1 | 8/2008 | Alford et al. |
| 2008/0199676 A1 | 8/2008 | Bathelier et al. |
| 2008/0216434 A1 | 9/2008 | Pervan |
| 2008/0216920 A1 | 9/2008 | Pervan |
| 2008/0236088 A1 | 10/2008 | Hannig |
| 2008/0263975 A1 | 10/2008 | Mead |
| 2008/0295432 A1 | 12/2008 | Pervan et al. |
| 2008/0295438 A1 | 12/2008 | Knauseder |
| 2008/0302044 A1 | 12/2008 | Johansson |
| 2009/0019606 A1 | 1/2009 | Frankard et al. |
| 2009/0019806 A1 | 1/2009 | Muehlebach |
| 2009/0049787 A1 | 2/2009 | Hannig |
| 2009/0064624 A1 | 3/2009 | Sokol |
| 2009/0100782 A1 | 4/2009 | Groeke et al. |
| 2009/0126308 A1 | 5/2009 | Hannig et al. |
| 2009/0133353 A1 | 5/2009 | Pervan et al. |
| 2009/0151290 A1 | 6/2009 | Liu |
| 2009/0155612 A1 | 6/2009 | Pervan et al. |
| 2009/0173032 A1 | 7/2009 | Prager et al. |
| 2009/0193741 A1 | 8/2009 | Cappelle |
| 2009/0193748 A1 | 8/2009 | Boo et al. |
| 2009/0193753 A1 | 8/2009 | Schitter |
| 2009/0217615 A1 | 9/2009 | Engstrom |
| 2009/0241460 A1 | 10/2009 | Beaulieu et al. |
| 2009/0249733 A1 | 10/2009 | Moebus |
| 2009/0308014 A1 | 12/2009 | Muehlebach |
| 2010/0018149 A1 | 1/2010 | Thiers |
| 2010/0031351 A1 | 2/2010 | Jung et al. |
| 2010/0043333 A1 | 2/2010 | Hannig |
| 2010/0083603 A1 | 4/2010 | Goodwin |
| 2010/0170189 A1 | 7/2010 | Schulte |
| 2010/0173122 A1 | 7/2010 | Susnjara |
| 2010/0178189 A1 | 7/2010 | Liu |
| 2010/0218360 A1 | 9/2010 | Mangone |
| 2010/0218450 A1 | 9/2010 | Braun et al. |
| 2010/0275541 A1 | 11/2010 | Prinz |
| 2010/0281803 A1 | 11/2010 | Cappelle |
| 2010/0293879 A1 | 11/2010 | Pervan et al. |
| 2010/0300029 A1 | 12/2010 | Braun et al. |
| 2010/0300031 A1 | 12/2010 | Pervan et al. |
| 2010/0313510 A1 | 12/2010 | Tang |
| 2010/0319290 A1 | 12/2010 | Pervan et al. |
| 2010/0319291 A1 | 12/2010 | Pervan et al. |
| 2011/0016815 A1 | 1/2011 | Yang |
| 2011/0030303 A1 | 2/2011 | Pervan et al. |
| 2011/0041996 A1 | 2/2011 | Pervan |
| 2011/0047922 A1 | 3/2011 | Fleming, III |
| 2011/0088344 A1 | 4/2011 | Pervan et al. |
| 2011/0088345 A1 | 4/2011 | Pervan |
| 2011/0088346 A1 | 4/2011 | Hannig |
| 2011/0094178 A1 | 4/2011 | Braun |
| 2011/0131916 A1 | 6/2011 | Chen et al. |
| 2011/0138722 A1 | 6/2011 | Hannig |
| 2011/0154763 A1 | 6/2011 | Bergelin et al. |
| 2011/0162312 A1 | 7/2011 | Schulte et al. |
| 2011/0167744 A1 | 7/2011 | Whispell et al. |
| 2011/0167750 A1 | 7/2011 | Pervan |
| 2011/0167751 A1 | 7/2011 | Engstrom |
| 2011/0173914 A1 | 7/2011 | Engstrom |
| 2011/0197535 A1 | 8/2011 | Baker et al. |
| 2011/0225921 A1 | 9/2011 | Schulte |
| 2011/0225922 A1 | 9/2011 | Pervan et al. |
| 2011/0247285 A1 | 10/2011 | Wybo et al. |
| 2011/0252733 A1 | 10/2011 | Pervan et al. |
| 2011/0271631 A1 | 11/2011 | Engstrom et al. |
| 2011/0271632 A1 | 11/2011 | Cappelle et al. |
| 2011/0283650 A1 | 11/2011 | Pervan et al. |
| 2012/0017533 A1 | 1/2012 | Pervan et al. |
| 2012/0031029 A1 | 2/2012 | Pervan et al. |
| 2012/0036804 A1 | 2/2012 | Pervan |
| 2012/0042598 A1 | 2/2012 | Vermeulen et al. |
| 2012/0055112 A1 | 3/2012 | Engstrom |
| 2012/0124932 A1 | 5/2012 | Schulte et al. |
| 2012/0151865 A1 | 6/2012 | Pervan et al. |
| 2012/0174515 A1 | 7/2012 | Pervan et al. |
| 2012/0174519 A1 | 7/2012 | Schulte et al. |
| 2012/0174520 A1 | 7/2012 | Pervan |
| 2012/0174521 A1 | 7/2012 | Schulte |
| 2012/0192521 A1 | 8/2012 | Schulte |
| 2012/0222378 A1 | 9/2012 | Cappelle et al. |
| 2012/0240502 A1 | 9/2012 | Wilson et al. |
| 2012/0279161 A1 | 11/2012 | Håkansson et al. |
| 2012/0304590 A1 | 12/2012 | Engstrom |
| 2012/0324816 A1 | 12/2012 | Huang |
| 2013/0008117 A1 | 1/2013 | Pervan |
| 2013/0008118 A1 | 1/2013 | Baert et al. |
| 2013/0014463 A1 | 1/2013 | Pervan |
| 2013/0019555 A1 | 1/2013 | Pervan et al. |
| 2013/0025231 A1 | 1/2013 | Vermeulen et al. |
| 2013/0025964 A1 | 1/2013 | Ramachandra et al. |
| 2013/0042562 A1 | 2/2013 | Pervan et al. |
| 2013/0042563 A1 | 2/2013 | Pervan et al. |
| 2013/0042564 A1 | 2/2013 | Pervan et al. |
| 2013/0042565 A1* | 2/2013 | Pervan .............. E04F 15/02038 52/588.1 |
| 2013/0047536 A1 | 2/2013 | Pervan |
| 2013/0081349 A1 | 4/2013 | Pervan et al. |
| 2013/0111837 A1 | 5/2013 | Devos et al. |
| 2013/0111845 A1 | 5/2013 | Pervan et al. |
| 2013/0145708 A1 | 6/2013 | Pervan |
| 2013/0152500 A1 | 6/2013 | Engström et al. |
| 2013/0160391 A1 | 6/2013 | Pervan et al. |
| 2013/0167467 A1 | 7/2013 | Vermeulen et al. |
| 2013/0219806 A2 | 8/2013 | Carrubba et al. |
| 2013/0232905 A1 | 9/2013 | Pervan |
| 2013/0239508 A1 | 9/2013 | Darko et al. |
| 2013/0263454 A1 | 10/2013 | Boo et al. |
| 2013/0263547 A1 | 10/2013 | Boo |
| 2013/0283719 A1 | 10/2013 | Döhring et al. |
| 2013/0305650 A1 | 11/2013 | Liu |
| 2013/0309441 A1 | 11/2013 | Hannig |
| 2013/0318906 A1 | 12/2013 | Pervan et al. |
| 2014/0007539 A1 | 1/2014 | Pervan et al. |
| 2014/0020324 A1 | 1/2014 | Pervan |
| 2014/0026513 A1 | 1/2014 | Bishop et al. |
| 2014/0033633 A1 | 2/2014 | Kell |
| 2014/0033634 A1 | 2/2014 | Pervan |
| 2014/0053497 A1 | 2/2014 | Pervan et al. |
| 2014/0059966 A1 | 3/2014 | Boo |
| 2014/0069043 A1 | 3/2014 | Pervan |
| 2014/0090335 A1 | 4/2014 | Pervan et al. |
| 2014/0109501 A1 | 4/2014 | Pervan |
| 2014/0109506 A1 | 4/2014 | Pervan et al. |
| 2014/0123586 A1 | 5/2014 | Pervan et al. |
| 2014/0130437 A1 | 5/2014 | Cappelle |
| 2014/0140766 A1 | 5/2014 | Riccobene et al. |
| 2014/0144096 A1 | 5/2014 | Vermeulen et al. |
| 2014/0150369 A1 | 6/2014 | Hannig |
| 2014/0150389 A1 | 6/2014 | Divens-Dutcher et al. |
| 2014/0186104 A1 | 7/2014 | Hamberger |
| 2014/0190112 A1 | 7/2014 | Pervan et al. |

(56) References Cited

U.S. PATENT DOCUMENTS

| | | |
|---|---|---|
| 2014/0208677 A1 | 7/2014 | Pervan et al. |
| 2014/0223852 A1 | 8/2014 | Pervan |
| 2014/0237931 A1 | 8/2014 | Pervan |
| 2014/0250813 A1* | 9/2014 | Nygren .................. E04F 15/107 52/309.15 |
| 2014/0260060 A1 | 9/2014 | Pervan et al. |
| 2014/0283466 A1* | 9/2014 | Boo ...................... E04F 15/107 52/309.1 |
| 2014/0290173 A1 | 10/2014 | Hamberger |
| 2014/0305065 A1 | 10/2014 | Pervan |
| 2014/0338177 A1 | 11/2014 | Vermeulen et al. |
| 2014/0366476 A1 | 12/2014 | Pervan et al. |
| 2014/0366477 A1 | 12/2014 | Kell |
| 2014/0373478 A2 | 12/2014 | Pervan et al. |
| 2014/0373480 A1 | 12/2014 | Pervan et al. |
| 2015/0000221 A1 | 1/2015 | Boo |
| 2015/0013260 A1 | 1/2015 | Pervan |
| 2015/0047278 A1 | 2/2015 | Blount |
| 2015/0047284 A1 | 2/2015 | Devos et al. |
| 2015/0059281 A1 | 3/2015 | Pervan |
| 2015/0089896 A2 | 4/2015 | Pervan et al. |
| 2015/0113908 A1 | 4/2015 | Ramachandra et al. |
| 2015/0121796 A1 | 5/2015 | Pervan |
| 2015/0152644 A1 | 6/2015 | Boo |
| 2015/0167318 A1 | 6/2015 | Pervan |
| 2015/0176289 A1 | 6/2015 | Hannig |
| 2015/0176619 A1 | 6/2015 | Baker |
| 2015/0211239 A1 | 7/2015 | Pervan |
| 2015/0233125 A1 | 8/2015 | Pervan et al. |
| 2015/0267419 A1 | 9/2015 | Darko |
| 2015/0300029 A1 | 10/2015 | Pervan |
| 2015/0330088 A1* | 11/2015 | Derelov ............ E04F 15/02022 52/588.1 |
| 2015/0337537 A1 | 11/2015 | Boo |
| 2015/0337542 A1 | 11/2015 | Cappelle et al. |
| 2015/0368910 A1 | 12/2015 | Kell |
| 2016/0030738 A1 | 2/2016 | Lindenthaler |
| 2016/0032596 A1 | 2/2016 | Nygren et al. |
| 2016/0060879 A1 | 3/2016 | Pervan |
| 2016/0069086 A1 | 3/2016 | Hüllenkremer et al. |
| 2016/0069088 A1 | 3/2016 | Boo et al. |
| 2016/0076260 A1 | 3/2016 | Pervan et al. |
| 2016/0090744 A1 | 3/2016 | Pervan et al. |
| 2016/0153200 A1 | 6/2016 | Pervan |
| 2016/0160502 A1 | 6/2016 | Brousseau et al. |
| 2016/0168866 A1 | 6/2016 | Pervan et al. |
| 2016/0186426 A1 | 6/2016 | Boo |
| 2016/0194884 A1 | 7/2016 | Pervan et al. |
| 2016/0201336 A1 | 7/2016 | Pervan |
| 2016/0237695 A1 | 8/2016 | Pervan |
| 2016/0251359 A1 | 9/2016 | Heffernan et al. |
| 2016/0251859 A1 | 9/2016 | Pervan et al. |
| 2016/0251860 A1 | 9/2016 | Pervan |
| 2016/0261368 A1 | 9/2016 | Nakajima et al. |
| 2016/0261370 A1 | 9/2016 | Jeong et al. |
| 2016/0281368 A1 | 9/2016 | Pervan et al. |
| 2016/0281370 A1 | 9/2016 | Pervan et al. |
| 2016/0289984 A1 | 10/2016 | Wagner |
| 2016/0326751 A1 | 11/2016 | Pervan |
| 2016/0340913 A1 | 11/2016 | Derelov |
| 2017/0030088 A1 | 2/2017 | Simoens |
| 2017/0037641 A1 | 2/2017 | Nygren et al. |
| 2017/0067261 A1 | 3/2017 | Hannig et al. |
| 2017/0079433 A1* | 3/2017 | Derelov ............... A47B 96/201 |
| 2017/0081860 A1 | 3/2017 | Boo |
| 2017/0089379 A1 | 3/2017 | Pervan |
| 2017/0254096 A1 | 9/2017 | Pervan |
| 2017/0321433 A1 | 11/2017 | Pervan et al. |
| 2017/0328072 A1 | 11/2017 | Hannig |
| 2017/0362834 A1 | 12/2017 | Pervan et al. |
| 2018/0000151 A1 | 1/2018 | Yang et al. |
| 2018/0001509 A1 | 1/2018 | Myllykangas et al. |
| 2018/0001510 A1 | 1/2018 | Fransson |
| 2018/0001573 A1 | 1/2018 | Blomgren et al. |
| 2018/0002933 A1 | 1/2018 | Pervan |
| 2018/0016783 A1 | 1/2018 | Boo |
| 2018/0030737 A1 | 2/2018 | Pervan |
| 2018/0030738 A1 | 2/2018 | Pervan |
| 2018/0119431 A1 | 5/2018 | Pervan et al. |
| 2018/0155934 A1* | 6/2018 | D'Hondt ................ B27N 7/005 |
| 2018/0178406 A1 | 6/2018 | Fransson et al. |
| 2018/0313094 A1 | 11/2018 | Pervan |
| 2018/0362138 A1 | 12/2018 | Gross et al. |
| 2019/0024387 A1 | 1/2019 | Pervan |
| 2019/0048592 A1 | 2/2019 | Boo |
| 2019/0048596 A1 | 2/2019 | Pervan |
| 2019/0063076 A1 | 2/2019 | Boo et al. |
| 2019/0071879 A1 | 3/2019 | Thiers et al. |
| 2019/0093370 A1 | 3/2019 | Pervan et al. |
| 2019/0093371 A1 | 3/2019 | Pervan |
| 2019/0119928 A1 | 4/2019 | Pervan et al. |
| 2019/0127989 A1 | 5/2019 | Kell |
| 2019/0127990 A1 | 5/2019 | Pervan et al. |
| 2019/0169859 A1 | 6/2019 | Pervan et al. |
| 2019/0232473 A1 | 8/2019 | Fransson et al. |
| 2019/0271165 A1 | 9/2019 | Boo |
| 2019/0376298 A1 | 12/2019 | Pervan et al. |
| 2019/0394314 A1 | 12/2019 | Pervan et al. |
| 2020/0087927 A1 | 3/2020 | Pervan |
| 2020/0102756 A1 | 4/2020 | Pervan |
| 2020/0109569 A1 | 4/2020 | Pervan |
| 2020/0149289 A1 | 5/2020 | Pervan |
| 2020/0173175 A1 | 6/2020 | Pervan |
| 2020/0181923 A1 | 6/2020 | Quist et al. |
| 2020/0224430 A1 | 7/2020 | Ylikangas et al. |
| 2020/0263437 A1 | 8/2020 | Pervan |
| 2020/0284045 A1 | 9/2020 | Kell |
| 2020/0318667 A1 | 10/2020 | Derelöv |
| 2020/0354969 A1 | 11/2020 | Pervan et al. |
| 2020/0412852 A9 | 12/2020 | Pervan et al. |
| 2021/0016465 A1 | 1/2021 | Fransson |
| 2021/0047840 A1 | 2/2021 | Pervan |
| 2021/0047841 A1 | 2/2021 | Pervan et al. |
| 2021/0071426 A1 | 3/2021 | Leary et al. |
| 2021/0071428 A1 | 3/2021 | Pervan |
| 2021/0087829 A1* | 3/2021 | Ylikangas ............... B27G 13/14 |
| 2021/0087831 A1 | 3/2021 | Nilsson et al. |
| 2021/0087832 A1 | 3/2021 | Boo |
| 2021/0087833 A1 | 3/2021 | Ylikangas et al. |
| 2021/0087834 A1 | 3/2021 | Ylikangas et al. |
| 2021/0310257 A1 | 10/2021 | Boo |
| 2021/0348396 A1 | 11/2021 | Pervan et al. |
| 2021/0381251 A1 | 12/2021 | Svensson |
| 2021/0381255 A1 | 12/2021 | Ylikangas et al. |
| 2022/0025657 A1* | 1/2022 | Pervan .................. E04F 15/102 |
| 2022/0025658 A1 | 1/2022 | Kell |
| 2022/0143718 A1 | 5/2022 | Pervan et al. |
| 2022/0268031 A1 | 8/2022 | Pervan et al. |

FOREIGN PATENT DOCUMENTS

| | | |
|---|---|---|
| CN | 201588375 U | 9/2010 |
| CN | 201888375 U | 7/2011 |
| CN | 102155083 A | 8/2011 |
| DE | 138992 C | 2/1903 |
| DE | 142293 C | 7/1903 |
| DE | 1961322 A1 | 6/1971 |
| DE | 2159042 A1 | 6/1973 |
| DE | 2505489 A1 | 8/1976 |
| DE | 3343601 A1 | 6/1985 |
| DE | 3343601 C2 | 2/1987 |
| DE | 3932960 A1 | 4/1991 |
| DE | 3932980 A1 | 11/1991 |
| DE | 4215273 A1 | 11/1993 |
| DE | 4242530 A1 | 6/1994 |
| DE | 19601322 A1 | 5/1997 |
| DE | 29922649 U1 | 3/2000 |
| DE | 20001788 U1 | 6/2000 |
| DE | 20002744 U1 | 8/2000 |
| DE | 19940837 A1 | 11/2000 |
| DE | 19940637 A1 | 3/2001 |
| DE | 19958225 A1 | 6/2001 |
| DE | 20206460 U1 | 7/2002 |
| DE | 20205774 U1 | 8/2002 |

(56) References Cited

FOREIGN PATENT DOCUMENTS

| | | | |
|---|---|---|---|
| DE | 20320799 U1 | 4/2005 |
| DE | 102004055951 A1 | 7/2005 |
| DE | 102004001363 A1 | 8/2005 |
| DE | 102004002297 A1 | 8/2005 |
| DE | 102005002297 A1 | 8/2005 |
| DE | 102005024336 A1 | 12/2005 |
| DE | 102004054368 A1 | 5/2006 |
| DE | 102004054968 A1 | 5/2006 |
| DE | 102004056951 A1 | 6/2006 |
| DE | 102005024366 A1 | 11/2006 |
| DE | 102006024164 A1 | 11/2007 |
| DE | 102006024184 A1 | 11/2007 |
| DE | 102006037614 B3 | 12/2007 |
| DE | 102006057491 A1 | 6/2008 |
| DE | 102007018309 A1 | 8/2008 |
| DE | 102007016533 A1 | 10/2008 |
| DE | 102007016539 A1 | 10/2008 |
| DE | 102007032885 A1 | 1/2009 |
| DE | 102007035646 A1 | 1/2009 |
| DE | 102007035648 A1 | 1/2009 |
| DE | 102007049792 A1 | 2/2009 |
| DE | 102009048050 B3 | 1/2011 |
| DE | 102009041297 A1 | 3/2011 |
| DE | 102009046050 A1 | 4/2011 |
| EP | 0013852 A1 | 8/1980 |
| EP | 0652340 A1 | 5/1995 |
| EP | 0871156 A2 | 10/1998 |
| EP | 0871158 A2 | 10/1998 |
| EP | 0974713 A1 | 1/2000 |
| EP | 1120515 A1 | 8/2001 |
| EP | 1146182 A2 | 10/2001 |
| EP | 1146482 A2 | 10/2001 |
| EP | 1251219 A | 10/2002 |
| EP | 1251219 A1 | 10/2002 |
| EP | 1279778 A2 | 1/2003 |
| EP | 1308577 A2 | 5/2003 |
| EP | 1350904 A2 | 10/2003 |
| EP | 1357239 A2 | 10/2003 |
| EP | 1350904 A3 | 12/2003 |
| EP | 1396593 A2 | 3/2004 |
| EP | 1420125 A2 | 5/2004 |
| EP | 1437457 A2 | 7/2004 |
| EP | 1437457 A3 | 8/2004 |
| EP | 1640530 A2 | 3/2006 |
| EP | 1650375 A1 | 4/2006 |
| EP | 1650375 A8 | 9/2006 |
| EP | 1980683 A2 | 10/2008 |
| EP | 1980883 A1 | 10/2008 |
| EP | 2000610 A1 | 12/2008 |
| EP | 2017403 A2 | 1/2009 |
| EP | 2034106 A1 | 3/2009 |
| EP | 2063045 A2 | 5/2009 |
| EP | 2078801 A1 | 7/2009 |
| EP | 2236694 A1 | 10/2010 |
| EP | 2270291 A1 | 1/2011 |
| EP | 2278091 A2 | 1/2011 |
| EP | 2270291 B1 | 5/2011 |
| EP | 2333195 A1 | 6/2011 |
| EP | 1863984 B1 | 11/2011 |
| EP | 2388391 A2 | 11/2011 |
| EP | 2388394 A2 | 11/2011 |
| EP | 2388409 A2 | 11/2011 |
| EP | 2395179 A2 | 12/2011 |
| EP | 2078801 B1 | 3/2012 |
| EP | 2276614 B1 | 9/2012 |
| EP | 2570564 A2 | 3/2013 |
| EP | 2734684 A1 | 5/2014 |
| EP | 2333195 B1 | 7/2014 |
| EP | 2976801 A1 | 1/2016 |
| EP | 2734684 B1 | 8/2016 |
| EP | 3224427 A1 | 10/2017 |
| FR | 1138586 A | 6/1957 |
| FR | 1138595 A | 6/1957 |
| FR | 2256807 A1 | 8/1975 |
| FR | 2810060 A1 | 12/2001 |
| GB | 240629 A | 10/1925 |
| GB | 376352 A | 7/1932 |
| GB | 1171337 A | 11/1969 |
| GB | 2051916 A | 1/1981 |
| JP | 49-115563 U | 10/1974 |
| JP | 60146553 A | 8/1985 |
| JP | 03110258 A | 5/1991 |
| JP | 0518028 A | 1/1993 |
| JP | 05018028 A | 1/1993 |
| JP | 06146553 A | 5/1994 |
| JP | H06146553 A | 5/1994 |
| JP | 06288017 A | 10/1994 |
| JP | H06286017 A | 10/1994 |
| JP | H06288017 A | 10/1994 |
| JP | 06303961 A | 11/1994 |
| JP | 06306961 A | 11/1994 |
| JP | 06322848 A | 11/1994 |
| JP | H06306961 A | 11/1994 |
| JP | H06322848 A | 11/1994 |
| JP | 07-310426 A | 11/1995 |
| JP | 07300979 A | 11/1995 |
| JP | H07300979 A | 11/1995 |
| JP | 08-086080 A | 4/1996 |
| JP | 10-219975 A | 8/1998 |
| JP | 2900115 B2 | 6/1999 |
| JP | 2002047782 A | 2/2002 |
| JP | 6288017 B2 | 2/2018 |
| JP | 6306961 B2 | 3/2018 |
| JP | 6322848 B2 | 4/2018 |
| KR | 10-2007-0000322 A | 1/2007 |
| SE | 526688 C2 | 10/2005 |
| SE | 529076 C2 | 4/2007 |
| WO | 9426989 A1 | 11/1994 |
| WO | 9426999 A1 | 11/1994 |
| WO | 9623942 A1 | 8/1996 |
| WO | 96/27719 A1 | 9/1996 |
| WO | 9627721 A1 | 9/1996 |
| WO | 9747834 A1 | 12/1997 |
| WO | 9821428 A1 | 5/1998 |
| WO | 9822677 A1 | 5/1998 |
| WO | 98/38401 A1 | 9/1998 |
| WO | 9858142 A1 | 12/1998 |
| WO | 9966151 A1 | 12/1999 |
| WO | 9966152 A1 | 12/1999 |
| WO | 0020705 A1 | 4/2000 |
| WO | 0020706 A1 | 4/2000 |
| WO | 0043281 A2 | 7/2000 |
| WO | 0047641 A1 | 8/2000 |
| WO | 0047841 A1 | 8/2000 |
| WO | 0055067 A1 | 9/2000 |
| WO | 0102669 A1 | 1/2001 |
| WO | 0102670 A1 | 1/2001 |
| WO | 0102671 A1 | 1/2001 |
| WO | 0102672 A1 | 1/2001 |
| WO | 0102869 A2 | 1/2001 |
| WO | 0107729 A1 | 2/2001 |
| WO | 0138657 A1 | 5/2001 |
| WO | 0144669 A2 | 6/2001 |
| WO | 0148132 A1 | 7/2001 |
| WO | 0148331 A1 | 7/2001 |
| WO | 0148332 A1 | 7/2001 |
| WO | 0151732 A1 | 7/2001 |
| WO | 0151733 A1 | 7/2001 |
| WO | 0166877 A1 | 9/2001 |
| WO | 0175247 A1 | 10/2001 |
| WO | 0177461 A1 | 10/2001 |
| WO | 0194721 A1 | 12/2001 |
| WO | 0198604 A1 | 12/2001 |
| WO | 0144669 A3 | 1/2002 |
| WO | 0194721 A8 | 6/2002 |
| WO | 0248127 A2 | 6/2002 |
| WO | 02055809 A1 | 7/2002 |
| WO | 02055810 A1 | 7/2002 |
| WO | 02081843 A1 | 10/2002 |
| WO | 02103135 A1 | 12/2002 |
| WO | 03012224 A1 | 2/2003 |
| WO | 03016554 A1 | 2/2003 |
| WO | 03016654 A1 | 2/2003 |
| WO | 03025307 A1 | 3/2003 |

(56) References Cited

FOREIGN PATENT DOCUMENTS

| | | |
|---|---|---|
| WO | 03038210 A1 | 5/2003 |
| WO | 03044303 A1 | 5/2003 |
| WO | 03069094 A1 | 8/2003 |
| WO | 03/78761 A1 | 9/2003 |
| WO | 03074814 A1 | 9/2003 |
| WO | 03083234 A1 | 10/2003 |
| WO | 03087497 A1 | 10/2003 |
| WO | 03089736 A1 | 10/2003 |
| WO | 2004000779 A1 | 12/2003 |
| WO | 2004003314 A1 | 1/2004 |
| WO | 2004016877 A1 | 2/2004 |
| WO | 2004020764 A1 | 3/2004 |
| WO | 2004028764 A1 | 4/2004 |
| WO | 2004/053257 A1 | 6/2004 |
| WO | 2004048716 A1 | 6/2004 |
| WO | 2004050760 A1 | 6/2004 |
| WO | 2004050780 A2 | 6/2004 |
| WO | 2004079128 A1 | 9/2004 |
| WO | 2004079130 A1 | 9/2004 |
| WO | 2004083557 A1 | 9/2004 |
| WO | 2004085765 A1 | 10/2004 |
| WO | 2005003488 A1 | 1/2005 |
| WO | 2005003489 A1 | 1/2005 |
| WO | 2005008468 A1 | 1/2005 |
| WO | 2005054599 A1 | 6/2005 |
| WO | 2006004950 A2 | 1/2006 |
| WO | 2006017281 A1 | 2/2006 |
| WO | 2006017301 A3 | 3/2006 |
| WO | 2006043893 A1 | 4/2006 |
| WO | 2006050928 A1 | 5/2006 |
| WO | 2006004950 A3 | 6/2006 |
| WO | 2006066245 A2 | 6/2006 |
| WO | 2006104436 A1 | 10/2006 |
| WO | 2006123986 A1 | 11/2006 |
| WO | 2006123988 A1 | 11/2006 |
| WO | 2006125646 A1 | 11/2006 |
| WO | 2007015669 A2 | 2/2007 |
| WO | 2007019957 A1 | 2/2007 |
| WO | 2007015669 A3 | 6/2007 |
| WO | 2007079845 A1 | 7/2007 |
| WO | 2007/089185 A1 | 8/2007 |
| WO | 2007089186 A1 | 8/2007 |
| WO | 2007118352 A1 | 10/2007 |
| WO | 2007141605 A2 | 12/2007 |
| WO | 2007142589 A1 | 12/2007 |
| WO | 2008004960 A2 | 1/2008 |
| WO | 2008017281 A1 | 2/2008 |
| WO | 2008017301 A2 | 2/2008 |
| WO | 2008017301 A3 | 3/2008 |
| WO | 2008060232 A1 | 5/2008 |
| WO | 2008004960 A3 | 6/2008 |
| WO | 2008068245 A1 | 6/2008 |
| WO | 2008004960 A8 | 8/2008 |
| WO | 2008116623 A1 | 10/2008 |
| WO | 2009013590 A2 | 1/2009 |
| WO | 2009013590 A3 | 5/2009 |
| WO | 2009066153 A2 | 5/2009 |
| WO | 2009116926 A1 | 9/2009 |
| WO | 2010006684 A2 | 1/2010 |
| WO | 2010028621 A1 | 3/2010 |
| WO | 2010070472 A2 | 6/2010 |
| WO | 2010070605 A2 | 6/2010 |
| WO | 2010006684 A3 | 7/2010 |
| WO | 2010082171 A2 | 7/2010 |
| WO | 2010087752 A1 | 8/2010 |
| WO | 2010105732 A1 | 9/2010 |
| WO | 2010106732 A1 | 9/2010 |
| WO | 2010106980 A1 | 9/2010 |
| WO | 2010108980 A1 | 9/2010 |
| WO | 2010136171 A1 | 12/2010 |
| WO | 2010070472 A3 | 1/2011 |
| WO | 2011001326 A2 | 1/2011 |
| WO | 2011012104 A2 | 2/2011 |
| WO | 2011012105 A1 | 2/2011 |
| WO | 2011032540 A2 | 3/2011 |
| WO | 2011012104 A3 | 4/2011 |
| WO | 2011038709 A1 | 4/2011 |
| WO | 2011085788 A1 | 7/2011 |
| WO | 2011108812 A2 | 9/2011 |
| WO | 2011127981 A1 | 10/2011 |
| WO | 2011151758 A2 | 12/2011 |
| WO | 2012059093 A2 | 5/2012 |
| WO | 2011151758 A3 | 6/2012 |
| WO | 2013012386 A1 | 1/2013 |
| WO | 2013017574 A1 | 2/2013 |
| WO | 2013017575 A1 | 2/2013 |
| WO | 2013025163 A1 | 2/2013 |
| WO | 2013025164 A1 | 2/2013 |
| WO | 2013032391 A1 | 3/2013 |
| WO | 2013083629 A1 | 6/2013 |
| WO | 2013087190 A1 | 6/2013 |
| WO | 2013151493 A1 | 10/2013 |
| WO | 2014209213 A1 | 12/2014 |
| WO | 2015105449 A1 | 7/2015 |
| WO | 2016085397 A1 | 6/2016 |

OTHER PUBLICATIONS

"Answer, Affirmative Defenses and Counterclaims of Defendant Valinge Innovation AE To Plaintiffs' First Amended Complaint and Counterclaim On Reply", *Akzenta Paneele + Profile GmbH, Akzenta Vedriebs GmbH and W. Classen GmbH & Co. KG v. Shaw Industries Group, Inc. and \Mingo Innovation AB and Darko Pervan*, Jan. 7, 2011, 70 pages.

"Balterio introduces the new fold down installation system PXPR", Retrieved from http://www.balterio.com/gb/en/news/359, Nov. 7, 2013.

"Cancellation Request by Spanolux N. V Divisie Balterio, Inhaberin: Velinge Flooring Technology AB, Antragstellerin: Spanolux N.V. Divisie Balterio", Oct. 31, 2013.

"Complaint", *Akzenta Paneele + Profile GmbH and W. Classen GmbH & Co. KG v. Brown-West L.L.0 d/b/a Carpet One Floor & Home, Shaw Industries Group, Inc. & Valinge Innovation AB*, Jan. 14, 2010, 13 pages.

"Complaint by Velinge Flooring Technology AB, Velinge Flooring Technology AB gegen Spanolux N.V. Divisie Balterio", Grunecker Patent—und Rechtsanwalte, Munchen, DE (with machine translation of Complaint; and with Attachments ("Anlage")): Anlage K1, Anlage K 2, Anlage 2a, Anlage K3, Anlage K4, Anlage K5, Anlage K6, Anlage K7 and Anlage K9), Jan. 7, 2013, 144 pages.

"Correspondence from German Patent and Trademark Office", Correspondence from German Patent and Trademark Office to Gil:meeker, Kinkeldey, Stockmair & Schwanhausse forwarding cancellation request, Nov. 11, 2013, 2 pages.

"Court Order, Verfilgung im Rechtsstreit Velinge Flooring gegen Spanolux N.V", 9, Jan. 2013.

"English-language translation", Reply by Spanolux N.V. Divisie Balterio, Velinge Flooring Technology AB gegen Spanolux N.V. Divisie Balterio.

"Laminate Flooring Tips", Available online at < (httpl/flooring. lifetips.comicat/61734/larninate-flooringtips/index.html)>, 2000, 12 pages.

"Laminate Flooring Tips", Life Tips, available online at (htlp:// flooring.lifetips.com/cat/61734/laminate-flooring-tips/index.html), 2000, 12 pages.

"Laminate Flooring Tips", Life Tips, available at (http://flooringlifefips. com/cati61734/1aminate-flooring-tips/index.htnil), 2000, 12 pages.

"Laminate Flooring Tips", Retrieved from http://flooring.lifetips. com/cat/61734/1aminate-flooring-tips/index.html, 2000, 12 pages.

"Laminate Flooring Tips", LifeTips, 2000, 12 pages.

"Mechanical locking for floor panels with a flexible bristle tonaue", Valinge Innovation AB, IP.com No. IPCOM000145 262D., Jan. 12, 2007, 57 pages.

"Mechanical locking for floor panels with a flexible bristle jtongue", Valinge Innovation AB, IP.com No. IPCOM000145 262D, Jan. 12, 2007, 57 pages.

(56) References Cited

OTHER PUBLICATIONS

"Mechanical locking for floor panels with a flexible bristle tongue", Valinge Innovation AB, IP.com No. IPCOM000145262D, IP.com PriorArtDatabase, Jan. 12, 2007, 57 pages.
"Mechanical locking for floor panels with a flexible bristle tongue", Valinge Innovation AB, Technical Disclosure, Jan. 12, 2007, 57 pages.
"Plaintiff's First Amended Complaint and Counterclaim On Reply", *Akzenta Paneele + Profile GmbH and W. Classen GmbH & Co. KG v. Shaw Industries Group, Inc. and Valinge Innovation AB and Darko Pervan*, Nov. 30, 2010, 153 pages.
"Reply by Spanolux N. V Divisie Balterio, Velinge Flooring Technology AB gegen Spanolux N. V Divisie Balterio", Bird & Bird LLP, Dusseldorf, DE, Mar. 12, 2013, 675 pages.
"Reply by Spanolux N. V Divisie Balterio, Velinge Flooring Technology AB gegen Spanolux N. V Divisie Balterio",, Sep. 17, 2013.
"Reply by Velinge Flooring Technology AB, Velinge Flooring Technology AB gegen Spanolux N.V. Divisie Balterio", Grunecker Patent—und Rechtsanwalte, Munchen, DE, Jul. 3, 2013, 107 pages.
"Reply by Velinge Flooring Technology AB, Velinge Flooring Technology AB gegen Spanolux N.V. Divisie Balterio", Grunecker Patent—und Rechtsanwalte, Munchen, DE, Sep. 23, 2013, 41 pages.
"Shaw Industries Group, Inc.'S Answer, Defenses and Counterclaims To Plaintiffs' First Amended Complaint and Counterclaim On Reply", *Akzenta Paneele + Profile GmbH, Akzenta Vedriebs GmbH and W. Classen GmbH & Co. KG v. Shaw Industries Group, Inc. and Valinge Innovation AB and Darko Pervan*,, Jan. 7, 2011, 104 pages.
06799800.5, "Extended European Search Report Received", 10 pages.
14817686.0, "Extended European Search Report Received", 13 pages.
U.S. Appl. No. 15/813,855, "Mechanical Locking of Floor Panels with a Glued Tongue", U.S. Patent Application, Nov. 15, 2017.
U.S. Appl. No. 15/855,389, "Mechanical Locking System For Floor Panels", U.S. Patent Application, Dec. 27, 2017.
17198982.5, "Extended European Search Report", 6 pages.
Boo, "Building Panel with a Mechanical Locking System", U.S. Appl. No. 17/349,345.
Boo, "Building Panel With a Mechanical Locking System", Nov. 30, 2016.
Boo, "Building Panel With a Mechanical Locking", U.S. Appl. No. 16/419,660, May 22, 2019.
Boo et al., "Building Panel with a Mechanical Locking System", U.S. Appl. No. 17/697,334, Mar. 17, 2022.
Darko et al., "Mechanical Locking of Floor Panels with a Flexible Bristle Tongue", U.S. Appl. No. 17/518,836.
Darko et al., "Mechanical Locking of Floor Panels with a Flexible Tongue", U.S. Patent Application.
Darko, et al., "Mechanical Locking System for Floor Panels", U.S. Appl. No. 16/224,951.
Darko, "Mechanical Locking System for Floor Panels", U.S. Appl. No. 16/581,990.
Darko et al., "Mechanical Locking System for Floor Panels", U.S. Appl. No. 16/269,806.
Derelov, "U.S. Appl. No. 15/229,575", Building Panel with a mechanical Locking system.
Engstrand, "VA-038 Mechanical Locking of Floor Panels With Vertical Folding", Valinge InnovBiion AB, Technical Disclosure, IP com No. IPCOM000179246D, IP.com Prior Art Database, 59 pages.
Engstrand, "VA-038 Mechanical Locking of Floor Panels With Vertical Folding", Valinge Innovation AB. Technical Disclosure, IP com No. IPCOM000179246D, IP.com Prior Art Database, 59 pages.
Engstrand, "VA-038 Mechanical Locking of Floor Panels With Vertical Folding", IP com No. IPCOM000179246D, 59 pages.
Engstrand, Ola, "VA043 5G Linear Slide Tongue", Valinge Innovation AB, Technical Disclosure, IP com No. IPCOM000179015D, IP.com Prior Art Database, 126.
Engstrand, Ola, "VA043 5G Linear Slide Tongue", IP com No. IPCOM000179015D, 126 pages.
Engstrand, Ola, "VA043 5G Linear Slide Tongue", Valinge Innovation AB, Technical Disclosure, IP com No. IPCOM000179015D, IP.com Prior Art Database,, 126 pages.
Engstrand, Ola, "VA043b PCT Mechanical Locking of Floor Panels", Valinge, Innovations AB, Techinaical Discolosure, IP com No., IPCOM00018942D, 62 pages.
Engstrand, Ola, "VA043b PCT Mechanical Locking of Floor Panels", IP com No. IPCOM000189420D, IP.com Prior Art Database, 62 pages.
Engstrand, Ola, "VA043b PCT Mechanical Locking of Floor Panels", Valinge Innovation AB, Technical Disclosure, IP com No. IPCOM000189420D, IP.com Prior Art Database, 62 pages.
Engstrand, Ola, "VA055 Mechanical Locking system for Floor panels", Valinage Innovation AB, IP com No., IPCOM0002064 54D, 25 pages.
Engstrand, Ola, "VA055 Mechanical locking system for floor panels", IP com No. IPCOM000206454D, IP.com Prior Art Database, 25 pages.
Engstrand, Ola, "VA055 Mechanical locking system for floor panels", Valinge Innovation AB, Technical Disclosure, IP com No. IPCOM000206454D, IP.com Prior Art Database, 25 pages.
Engstrand, Ola, "VA058 Rocker Tongue", Valinge Innovation AB, Techinical Disclosure, IP com No. IPCOM000203832D, IP Prior Art Data Base, Feb. 4, 2011.
Engstrand, Ola, "VA058 Rocker Tongue", IP com No. IPCOM000203832D, IP.com Prior Art Database, 22 pages.
Engstrand, Ola, "VA058 Rocker Tongue", Valinge Innovation AB, IP com No. IPCOM000203832D, IP.com Prior Art Database, 22 pages.
EP 04025167, "European Search Report (ESR)", 3 pages.
EP 04025167.0, "European Search Report", 3 pages.
EP 05796804.2, "Extended European Search Report".
EP 06700664.3, "Extended European Search Report Received", 13 pages.
EP 07150233.0, "Extended European Search Report", 7 pages.
EP 07835365.3, "Extended European Search Report Received", 11 pages.
EP 10181002.6, "Extended European Search Report", 8 pages.
EP 10181186.7, "Extended European Search Report", 10 pages.
EP 11007573, "Spanolux N.V.—DIV. Balterio", Priority Document for EP 11007573, Sep. 16, 2011, 20 pages.
EP 11173127.9, "Extended European Search Report", 12 pages.
EP 11173133.7, "Extended European Search Report", 13 pages.
EP 11173135.2, "Extended European Search Report", 13 pages.
EP 11173136.0, "Extended European Search Report", 15 pages.
EP 11173137.8, "Extended European Search Report", 13 pages.
EP 11173138.6, "Extended European Search Report", 13 pages.
EP 11173139.4, "Extended European Search Report", 10 pages.
EP 11173140.2, "Extended European Search Report", 8 pages.
EP 11173141.0, "Extended European Search Report", 20 pages.
EP 11173142.8, "Extended European Search Report", 15 pages.
EP 11173143.6, "Extended European Search Report", 10 pages.
EP 11173144.4, "Extended European Search Report", 14 pages.
EP 11173146.9, "Extended European Search Report", 8 pages.
EP 11173147.7, "Extended European Search Report", 12 pages.
EP 11173149.3, "Extended European Search Report", 11 pages.
EP 11173150.1, "Extended European Search Report", 15 pages.
EP 11173151.9, "Extended European Search Report", 14 pages.
EP 11173154.3, "Extended European Search Report", 10 pages.
EP 11173155.0, "Extended European Search Report", 18 pages.
EP 11173156.8, "Extended European Search Report", 10 pages.
EP 11173157.6, "Extended European Search Report", 15 pages.
EP 11173158.4, "Extended European Search Report", 10 pages.
EP 11183002.2, "Extended European Search Report Received", 11 pages.
EP 11183003.0, "Extended European Search Report Received", 13 pages.
EP 11183058.4, "Extended European Search Report Received", 9 pages.
EP 11183060.0, "Extended European Search Report Received", 10 pages.

(56) References Cited

OTHER PUBLICATIONS

EP 11183061.8 , "Extended European Search Report Received", 10 pages.
EP 11183138.4 , "Extended European Search Report Received", 16 pages.
EP 11183157.4 , "Extended European Search Report Received" , 13 pages.
EP 11183194.7 , "Extended European Search Report Received", 11 pages.
EP 12196884.6 , "Extended European Search Report Received", 8 pages.
EP 12811 602.7 , "Extended European Search Report Received", 4 pages.
EP 12824331.8 , "Extended European Search Report", 7 pages.
EP 17180642.5 , "Extended European Search Report", 10 pages.
EP 18209535.6 , "Extended European Search Report", 7 pages.
EP 19183301.1 , "Extended European Search Report Received", 12 pages.
EP 19183640.2 , "Extended European Search Report issued", 12 Pages.
EP 19195822.2 , "Extended European Search Report", 11 pages.
EP 19200326.7 , "Extended European Search Report", 9 pages.
EP 21168281.0 , "Extended European Search Report", 12 pages.
EP No. 06700664 , "European prosecution file history received", 242 pages.
EP04025167.0 , European Search Report Received.
EP06747799.2 , "Extended European Search Report Received", 12 pages.
EP07808839.0 , "Extended European Search Report Received", 10 pages.
EP11173153.5 , "Extended European Search Report", 13 pages.
EP12 82 4331.8 , "Extended European Search Report Received", 7 pages.
EP12190659.8 , "Extended European Search Report Received", 8 pages.
EP12815189.1 , "Extended European Search Report Received", 9 pages.
EP13157194.5 , "Extended European Search Report Received", 8 pages.
EP13164407.2 , "Extended European Search Report Received", 7 pages.
EP13195978.5 , "Extended European Search Report Received".
EP15862298.5 , "Extended European Search Report Received" , European Patent Office, Munich, DE , Jun. 6, 2018 , 11 pages.
EP16184205.9 , "Extended European Search Report Received", 12 pages.
EP1863984 , "European prosecution".
EP19183301.1 , "Extended European Search report" , European Patent Office, Munich, DE , Oct. 9, 2019 , 12 pages.
EP5862298.5 , "Extended European Search Report Received", pp. 11.
IPCOM000145262D , "Mechanical locking for floor panels with a flexible bristle tongue" , Valinge Innovation AB, Technical Disclosure, IP.com PriorArtDatabase , Jan. 12, 2007 , 57 pages.
IPCOM000145262D , "Mechanical Locking for Floor Panels with a Flexible Bristle Tongue" , Valinge Innovation AB, , Jan. 12, 2007 , 57 pages.
Life Tips , "Laminate Flooring Tips" , httpl/flooringlifetips.com/ca1161734/1aminate-flooringtips/index.html , 2000 , 12 pages.
Lifetips , "Laminate Flooring Tips" , available online at <http://flooring.lifetips.com//cat/61734/laminate-flooring-tips/index.html>, 2000 , 12 pages.
Ola, Engstrand , "VA-038 Mechanical Locking of Floor Panels With Vertical Folding" , IP com No. IPCOM000179246D , 59 pages.
Ola, Engstrand , "VA043 5G Linear Slide Tongue" , IP corn No. IPCOM000179015D , 126 pages.
Ola, Engstrand , "VA043b PCT Mechanical Locking of Floor Panels" , IP corn No. IPCOM000189420D , 62 pages.
Ola, Engstrand , "VA055 Mechanical locking system for floor panels" , IP corn No. IPCOM000206454D , 25 pages.
Ola, Engstrand , "VA058 Rocker Tongue" , IP corn No. IPCOM000203832D , 22 pages.
PCT/SE2006/000033 , "International Search Report Received".
PCT/SE2006/001218 , "International Search Report Received", 9 pages.
PCT/SE2007/000836 , "International Search Report", 8 pages.
PCT/SE2007/050781 , "International Search Report Received", 8 pages.
PCT/SE2012/050817 , "International Search Report Received", 9 pages.
PCT/SE2012/050828 , "International Search Report Received", 7 pages.
PCT/SE2012/050872 , "International Search Report", 5 pages.
PCT/SE2012/050872 , "International Search Report Received", 5 pages.
PCT/SE2014/050792 , "International Search Report received", 7 pages.
PCT/SE2015051270 , "International Search Report Received" , ISA/SE, Patent-och registreringsverket, Stockholm, SE , Mar. 24, 2016 , 7 pages.
PCT/SE2019/051280 , "International Search Report and Written Opinion", 14 pages.
Pervan, Darko , "Mechanical Locking System for Floor Panels" , U.S. Appl. No. 16/692,104.
Pervan, Darko , et al. , "Mechanical Lacking System for Floor Panels," , U.S. Appl. No. 15/855,389.
Pervan, Darko , et al. , "Mechanical Locking of Floor Panels" , U.S. Appl. No. 15/896,571.
Pervan, Darko , "Mechanical Locking of Floor Panels" , U.S. Appl. No. 16/781,301.
Pervan, Darko , "Mechanical Locking of Floor Panels with a Flexible Bristle Tongue" , U.S. Appl. No. 16/861,686.
Pervan, Darko , et al. , "Mechanical Locking of Floor Panels with a Flexible Tongue" , U.S. Appl. No. 15/896,571.
Pervan, Darko , et al. , "Mechanical Locking of Floor Panels with a Flexible Tongue" , U.S. Appl. No. 15/896,571 filed in U.S. Patent Office.
Pervan, Darko , "Mechanical Locking of Floor Panels with a Glued Tongue" , U.S. Appl. No. 15/813,855.
Pervan, Darko , et al. , "Mechanical Locking of Floor Panels with a Glued Tongue" , U.S. Appl. No. 15/813,855.
Pervan, Darko , "Mechanical Locking of Floor Panels with a Glued Tongue" , U.S. Appl. No. 15/813,855 filed in the U.S. PTO.
Pervan, Darko , "Mechanical Locking of Floor Panels With Vertical Folding" , , Jun. 13, 2019.
Pervan, Darko , "Mechanical Locking of Floor Panels With Vertical Folding" , U.S. Appl. No. 16/439,827.
Pervan, Darko , "Mechanical Locking of Floor Panels with Vertical Folding" , U.S. Appl. No. 17/314,431.
Pervan, Darko , "Mechanical Locking System for Floor Panels" , U.S. Appl. No. 16/163,088.
Pervan, Darko , "Mechanical Locking System for Floor Panels" , U.S. Appl. No. 16/224,951.
Pervan, Darko , et al. , "Mechanical Locking System for Floor Panels" , U.S. Appl. No. 16/224,951.
Pervan, Darko , et al. , "Mechanical Locking System for Floor Panels" , U.S. Appl. No. 15/217,023.
Pervan, Darko , "Mechanical Locking System for Floor Panels" , U.S. Appl. No. 16/581,990.
Pervan, Darko , et al. , "Mechanical Locking System for Floor Panels" , U.S. Appl. No. 16/581,990.
Pervan, Darko , et al. , "Mechanical Locking System for Floor panels" , , Dec. 27, 2017.
Pervan, Darko , "Mechanical Locking System for Floor Panels" , U.S. Appl. No. 17/224,290.
Pervan, Darko , et al. , "Mechanical Locking System for Floor Panels" , U.S. Appl. No. 16/269,806.
Pervan, Darko , "Mechanical Locking System for Floor Panels" , U.S. Appl. No. 15/217,023.
Pervan, Darko , "Mechanical Locking System for Floor Panels" , U.S. Appl. No. 15/261,071.
Pervan, Darko , "Mechanical Locking System for Floor Panels" , U.S. Appl. No. 16/908,902.

(56) References Cited

OTHER PUBLICATIONS

Pervan, Darko, "Mechanical Locking System for Panels and Method of Installing Same", U.S. Appl. No. 16/143,610.
Pervan, Darko, "Mechanical Locking System for Panels and Method of Installing Same", filed in the U.S. Patent and Trademark Office.
Pervan, Darko, "Mechanical Locking System for Panels and Method of Installing Same", U.S. Appl. No. 16/861,666.
Pervan, Darko, "Mechanical Locking System for Panels awl Method of Installing Same", U.S. Appl. No. 15/726,853.
Pervan, Darko, "U.S. Appl. No. 15/217,023", Mechanical Locking of Floor Panels.
Pervan, Darko, "U.S. Appl. No. 15/261,071", Mechanical looking system for Floor Panels.
Pervan, Darko, "U.S. Appl. No. 15/813,855", Nov. 15, 2017.
Pervan, Darko, "U.S. Appl. No. 15/813,855", Mechanical Locking of Floor Panels with a Glued Tongue U.S. Appl. No. 15/813,855.
Pervan, Darko, et al., "U.S. Appl. No. 15/896,571", Mechanical Locking of Floor Panels with a Flexible Tongue U.S. Appl. No. 15/896,571.
Pervan, Darko, "VA066b Giued Tongue", Valinge Flooring Technology, Techanical Disclosure, IP com No., IPCCOM0021086D, 19 pages.
Pervan, Darko, "VA066b Glued Tongue", IP com No. IPCOM000210865D, IP.com Prior Art Database, 19 pages.
Pervan, Darko, "VA066b Glued Tongue", IP corn No. IPCOM000210865D, 19 pages.
Pervan, Darko, "VA066b Glued Tongue", Valinge Flooring Technology, Technical Disclosure, IP.com No. IPCOM000210865D, IP.com Prior Art Database, 19 pages.
Pervan, Darko, "VA067 Fold Slide loc", Valinge Flooring Technology AB, Technology Disclousure, IP com No., IPCOM000208542D, Prior art data base, 25 pages.
Pervan, Darko, "VA067 Fold Slide Loc", IP com No. IPCOM000208542D, IP.com Prior Art Database, 37 pages.
Pervan, Darko, "VA067 Fold Slide Loc", IP corn No. IPCOM000208542D, 37 pages.
Pervan, Darko, "VA067 Fold Slide Loc", Valinge Flooring Technology AB, Technical Disclosure, IP.com No. IPCOM000208542D, IP.com Prior Art Database, 37 pages.
Pervan, Darko, "VA068 Press Lock VFT", Vailage Flooring Technology, Technical Disclosure, IP com No., IPCOM000208854D, 25 pages.
Pervan, Darko, "VA068 Press Lock VFT", IP com No. IPCOM000208854D, IP.com Prior Art Database, 25 pages.
Pervan, Darko, "VA068 Press Lock VFT", IP corn No. IPCOM000208854D, 25 pages.
Pervan, Darko, "VA068 Press Lock VFT", Valinge Flooring Technology. Technical Disclosure, IP.com No. IPCOM000208854D, IP.com Prior Art Database, 25 pages.
Pervan, Darko, "VA069 Combi Tongue", Techinical Disclosure, IPCOM000210866D, IP Prior Art Database, 14 pages.
Pervan, Darko, "VA069 Combi Tongue", IP com No. IPCOM000210866D, IP.com Prior Art Database, 41 pages.
Pervan, "VA069 Combi Tongue", Technical Disclosure, IP.com No. IPCOM000210866D, IP.com Prior Art Database, 41 pages.
Pervan, "VA070 Strip Part", Technical Disclosure, IP.com No. IPCOM000210867D, IP. com Prior Art Database, 43 pages.
Pervan, "VA070 Strip Part", IP com No. IPCOM000210867D, IP.com Prior Art Database, 43 pages.
Pervan, "VA070 Strip Part", Technical Disclosure entitled, IP.com No. IPCOM000210867D, IP.com Prior Art Database, 43 pages.
Pervan, "VA070 Strip Part.", IP.com No. IPCOM000210867D, 43 pages.
Pervan, "VA071 Pull Lock", Techinical Disclosure, IP.com No. IPCOM000210868D, IP.com Art Database, 22 pages.
Pervan, "VA071 Pull Lock", IP com No. IPCOM000210868D, IP.com Prior Art Database, 22 pages.
Pervan, "VA071 Pull Lock", IP com No. IPCOM000210868D, 22 pages.
Pervan, "VA071 Pull Lock", Technical Disclosure, IP com No. IPCOM000210868D, IP.com Prior Art Database, , 22 pages.
Pervan, "VA073a Zip Loc", Technical Disclosure, IP com No. IPCOM000210869D, IP.com Prior Art Data base, 36 pages.
Pervan, "VA073a Zip Loc", IP com No. IPCOM000210869D, IP.com Prior Art Database, 36 pages.
Pervan, "VA073a Zip Loc", IP com No. IPCOM000210869D, 36 pages.
Pervan, "Mechanical Locking of Floor Panels with a Flexible Tongue", U.S. Appl. No. 15/896,571.
Pervan, "Mechanical Locking of Floor Panels with a Glued Tongue", U.S. Appl. No. 15/813,855.
Pervan, "Mechanical Locking of Floor Panels with a Flexible Tongue", U.S. Appl. No. 17/206,702.
Pervan, "Mechanical Locking of Floor Panels With Vertical Folding", Jun. 13, 2019.
SE 1950024-8, "Swedish Office Action with Swedish Search Report", 23 pages.
SE PCT/SE2005/001586, "International Search Report", 6 pages.
Valinge Innovation AB, "Mechanical locking for floor panels with a flexible bristle tongue", Technical Disclosure, IP corn No. IPCOM000145262D, IP.com PriorAttDatabase, Jan. 12, 2007, 57 pages.
Ylikangas, "Unlocking System for Panels", U.S. Appl. No. 16/713,373.
Ylikangas, "Unlocking System for Panels", U.S. Appl. No. 17/342,624.
Decision to grant received for European Patent Application No. 06799800.5, mailed on Jul. 13, 2017, 2 pages.
Decision to grant received for European Patent Application No. 17180642.5, mailed on Oct. 29, 2020, 2 pages.
Decision to grant received for European Patent Application No. 20205641.2, mailed on Apr. 14, 2023, 2 pages.
European Search Report and Search Opinion received for European Application No. 20205641.2, mailed on Feb. 17, 2021, 11 pages.
Intention to grant received for European Patent Application No. 06799800.5, mailed on Apr. 13, 2017, 6 pages.
Intention to grant received for European Patent Application No. 17180642.5, mailed on Jun. 5, 2020, 6 pages.
Intention to grant received for European Patent Application No. 20205641.2, mailed on Dec. 8, 2022, 6 pages.
International Preliminary Report on Patentability received for PCT Patent Application No. PCT/SE06/001218, mailed on Jan. 13, 2009, 12 pages.
Office Action received for European Application No. 17180642.5, mailed on Aug. 6, 2019, 8 pages.
Office Action received for Korean Patent Application No. 10-2009-7002835, mailed on Feb. 28, 2013, 14 pages (9 pages of English Translation and 5 pages of Original Document).
Supplementary European Search Report and Search Opinion received for European Application No. 06799800.5, mailed on May 6, 2016, 10 pages. .
U.S. Appl. No. 18/635,607, filed Apr. 15, 2024, Fredrik BOO.
U.S. Appl. No. 19/014,541, filed Jan. 19, 2025, Fredrik Boo.
U.S. Appl. No. 18/963,840, filed Nov. 29, 2024, Anders Nilsson.
Decision to Grant for Japanese Patent Application No. 2009-519402, mailed on Jan. 27, 2012, 5 pages (2 pages of English Translation and 3 pages of Original Document).
European Search Report and Search Opinion received for EP Application No. 23172118.4, mailed on Oct. 9, 2023, 8 pages.
Office Action received for Japanese Patent Application No. 2009-519402, mailed on Jul. 22, 2011, 6 pages (3 pages of English Translation and 3 pages of Original Document). .
U.S. Appl. No. 17/697,334, filed Mar. 17, 2022, Fredrik Boo.
U.S. Appl. No. 18/069,320, filed Dec. 21, 2022, Lucas Larsson.
U.S. Appl. No. 18/222,449, filed Jul. 16, 2023, Christian Boo.
U.S. Appl. No. 18/242,312, filed Sep. 5, 2023, Roger Ylikangas.
U.S. Appl. No. 18/370,443, filed Sep. 20, 2023, Fredrik Boo.
U.S. Appl. No. 18/370,454, filed Sep. 20, 2023, Anders Nilsson.
U.S. Appl. No. 19/174,449, filed Apr. 9, 2025, Lucas Larsson.
U.S. Appl. No. 19/221,907, filed May 29, 2025, Christian Boo.
U.S. Appl. No. 19/221,987, filed May 29, 2035, Roger Ylikangas.

\* cited by examiner

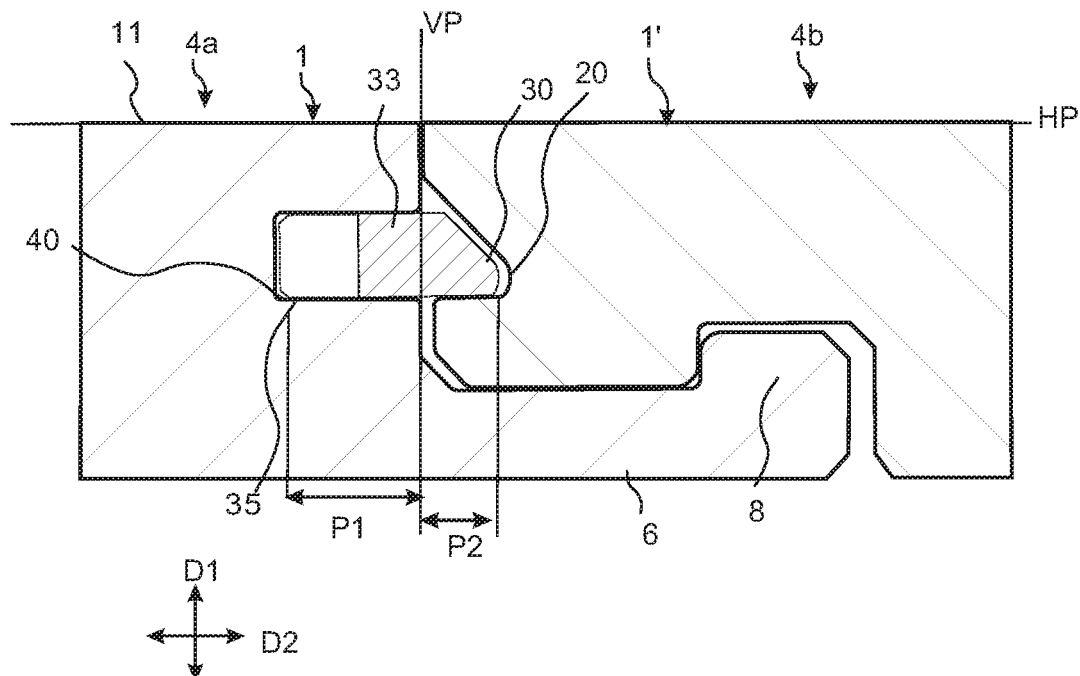
Fig. 1a
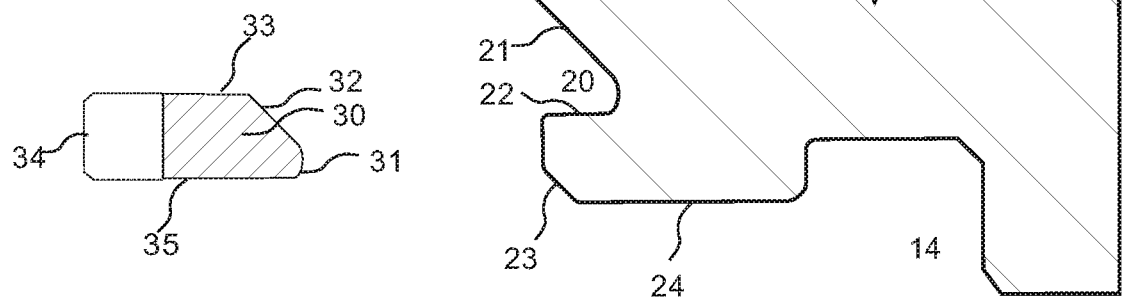
Fig. 1c
Fig. 1b
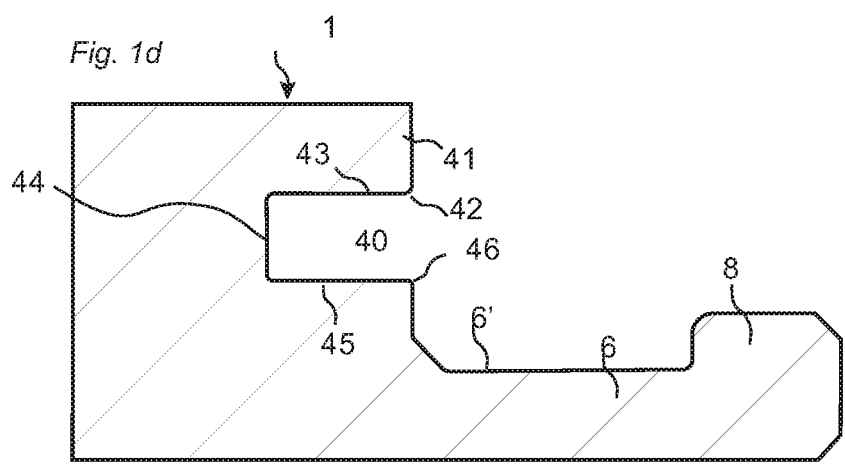
Fig. 1d
Prior Art

Fig. 8a
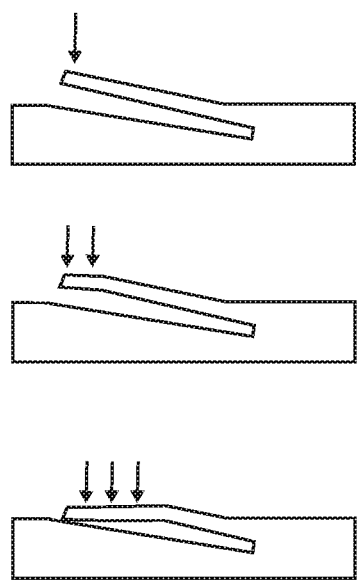
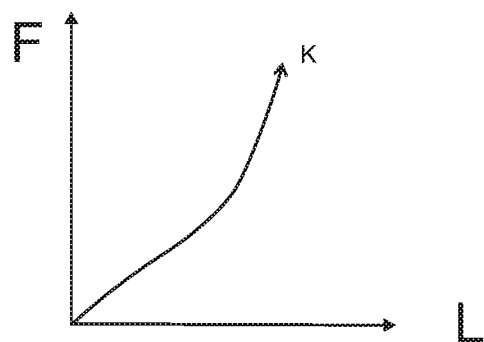
Fig. 8b
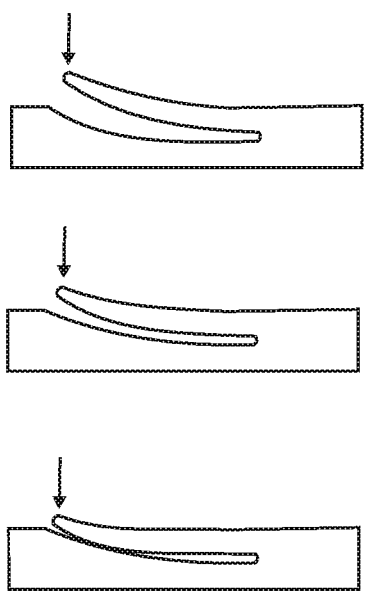
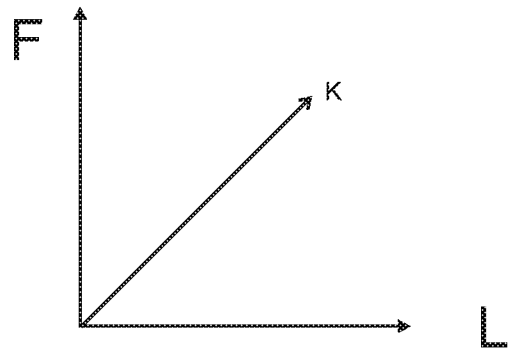

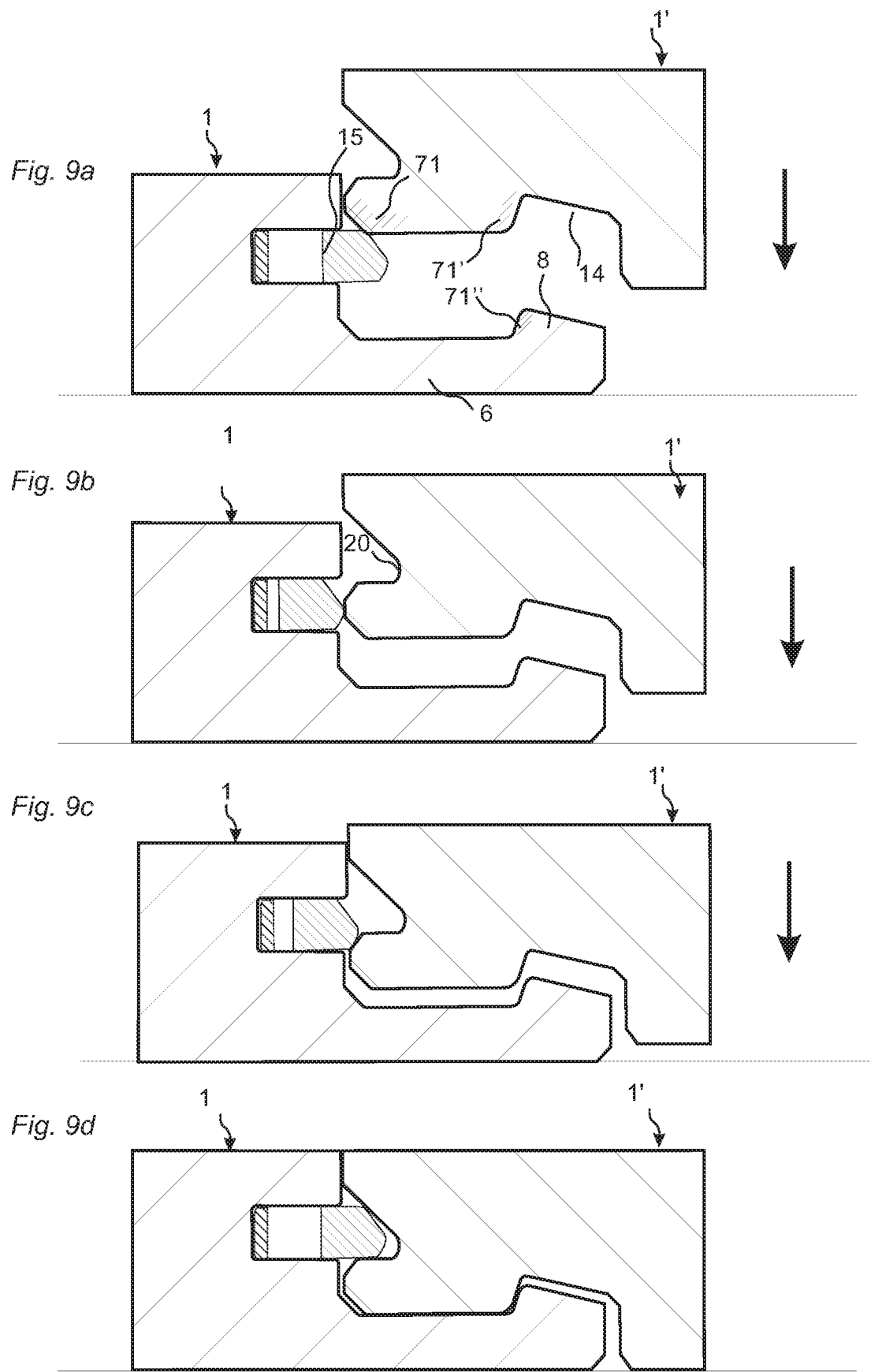

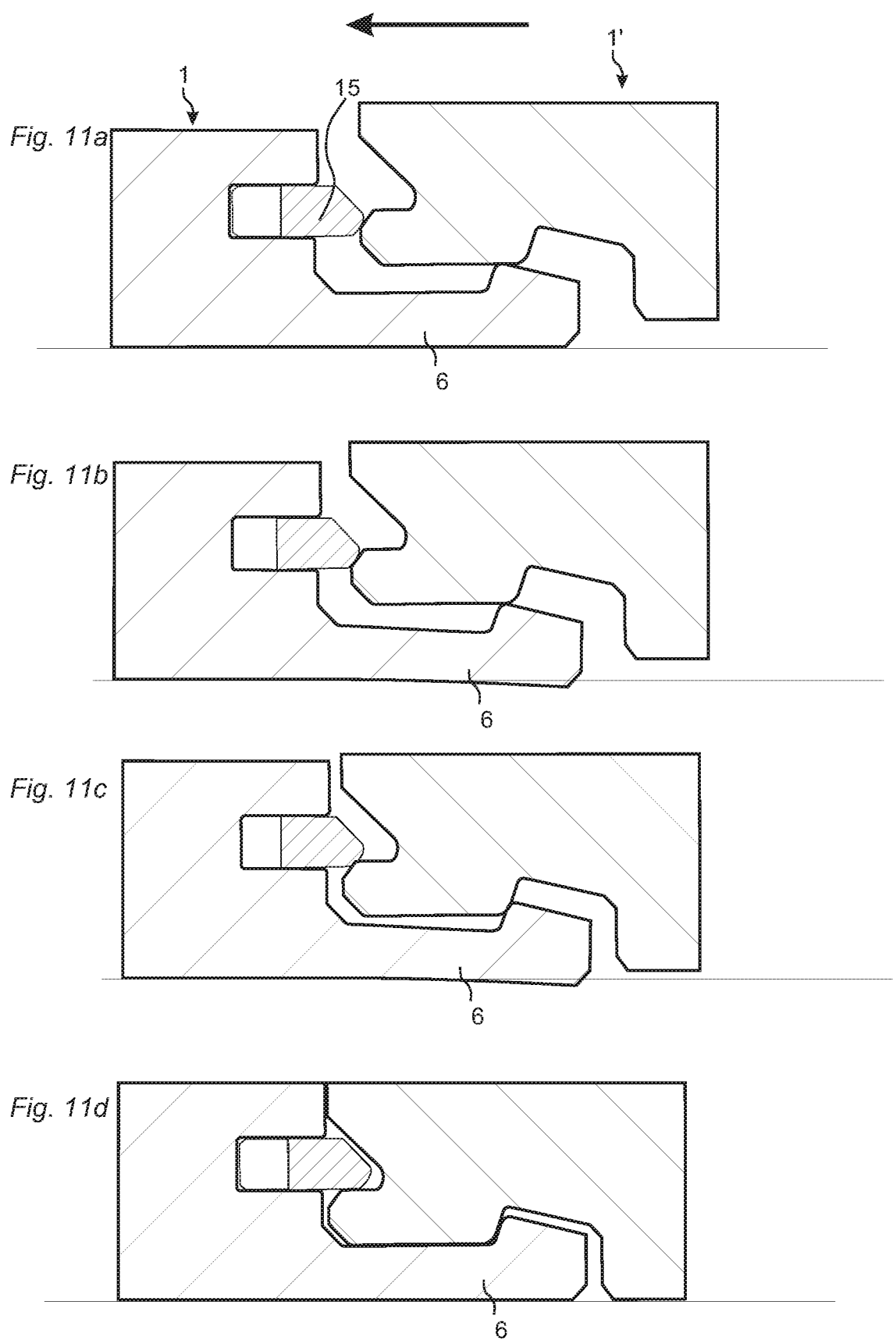

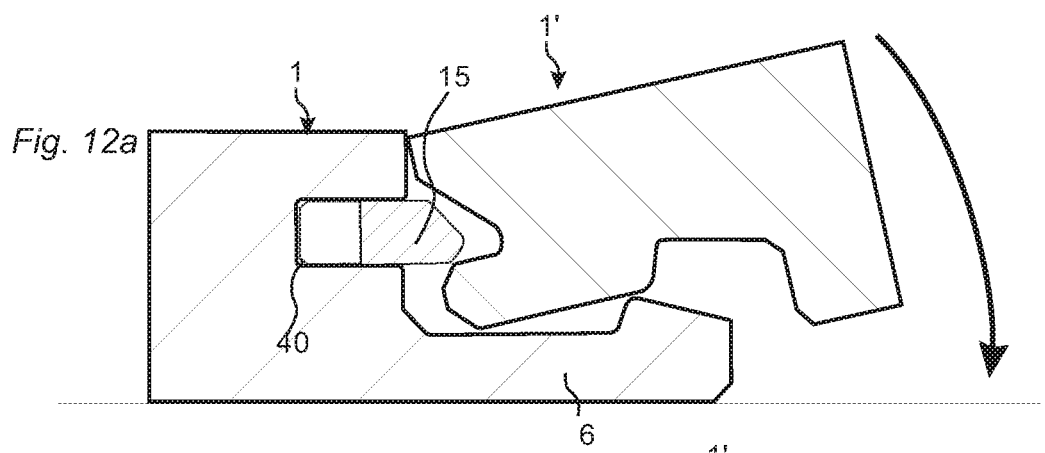
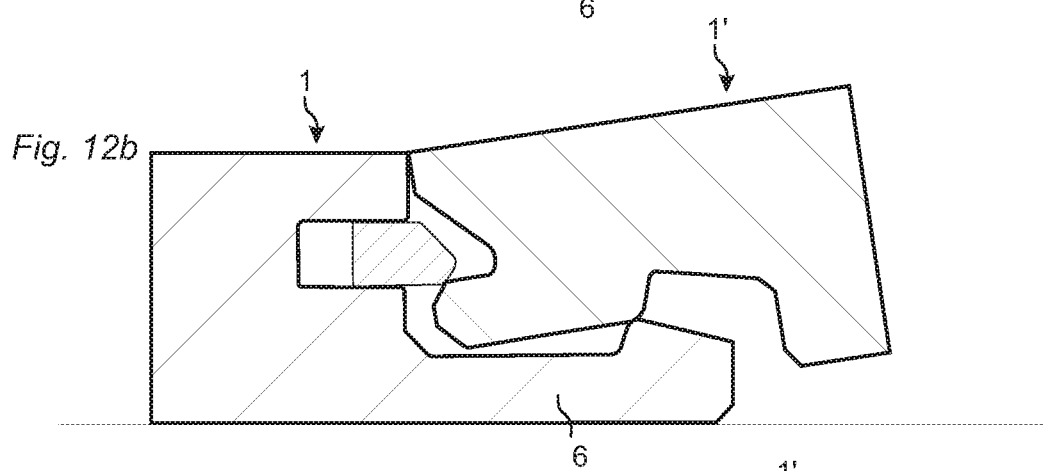
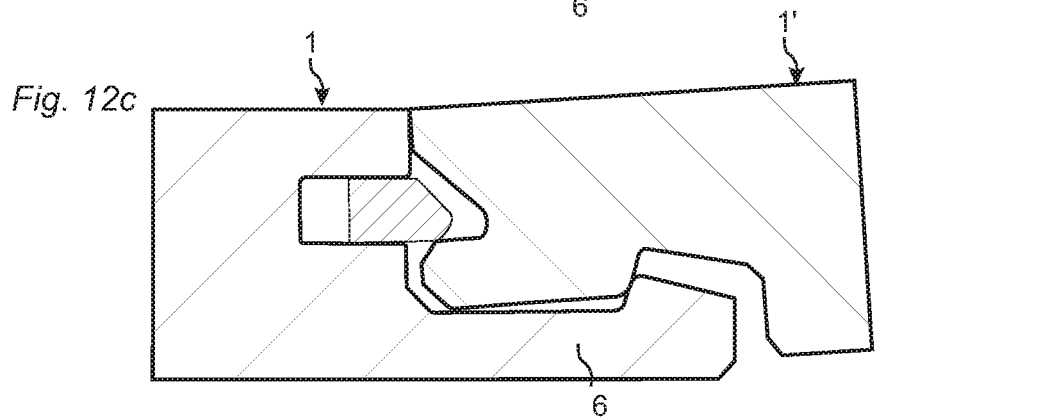
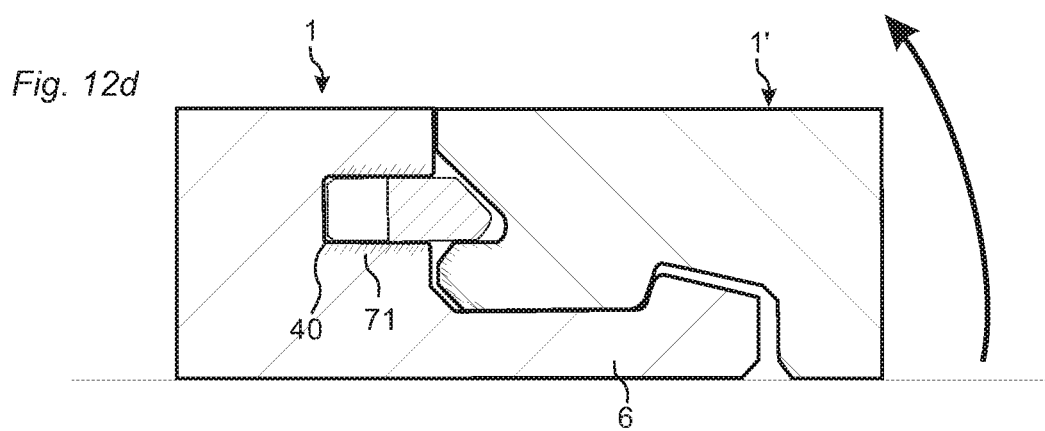

Fig. 17a
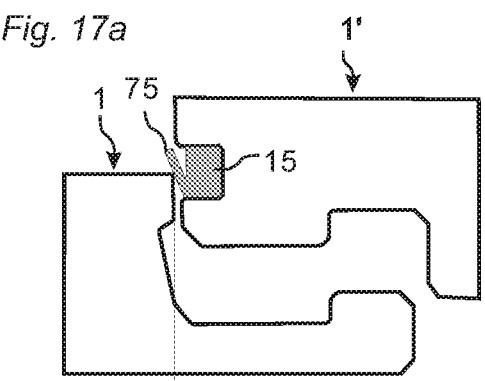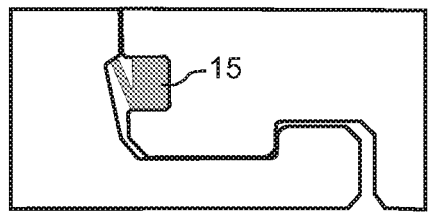
Fig. 17b
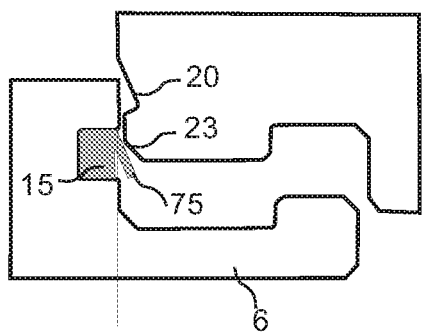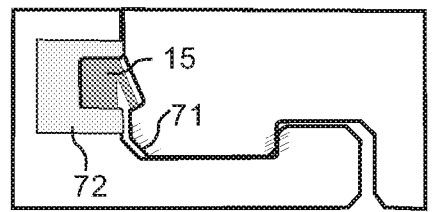
Fig. 17c
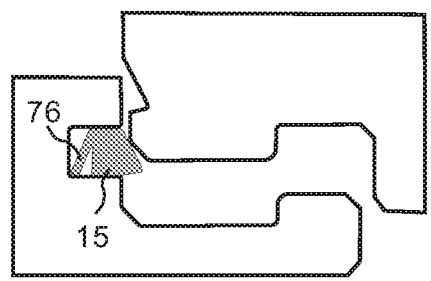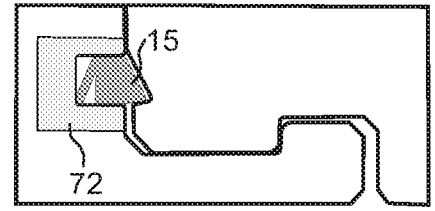
Fig. 17d
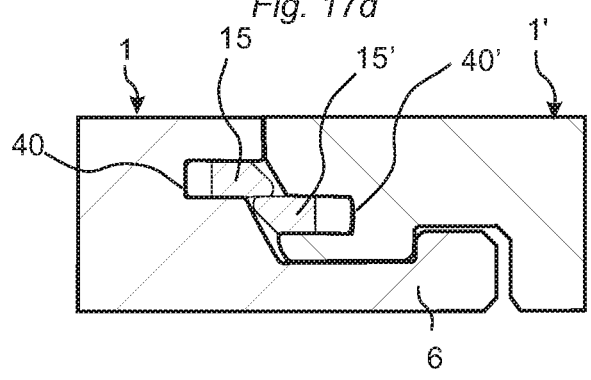
Fig. 17e
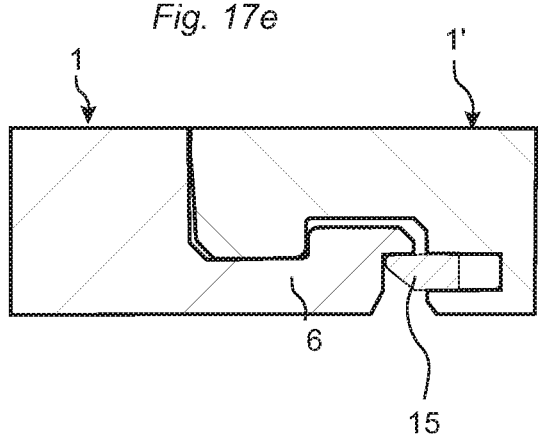

MECHANICAL LOCKING OF FLOOR PANELS WITH A FLEXIBLE BRISTLE TONGUE

CROSS-REFERENCE TO RELATED APPLICATIONS

The present application is a continuation of U.S. application Ser. No. 17/518,836, filed on Nov. 4, 2021, now U.S. Pat. No. 11,680,415 which is a continuation of U.S. application Ser. No. 16/861,686, filed on Apr. 29, 2020, now U.S. Pat. No. 11,193,283, which is a continuation of U.S. application Ser. No. 15/172,926, filed on Jun. 3, 2016, now U.S. Pat. No. 10,669,723, which is a continuation of U.S. application Ser. No. 14/463,972, filed on Aug. 20, 2014, now U.S. Pat. No. 9,382,716, which is a continuation of U.S. application Ser. No. 13/728,121, filed on Dec. 27, 2012, now U.S. Pat. No. 8,844,236, which is a continuation of U.S. application Ser. No. 13/195,297, filed on Aug. 1, 2011, now U.S. Pat. No. 8,359,805, which is a continuation of application Ser. No. 12/788,384, filed on May 27, 2010, now U.S. Pat. No. 8,033,074, which is a continuation of application Ser. No. 11/775,885, filed on Jul. 11, 2007, now U.S. Pat. No. 7,908,815, which is a continuation-in-part of International Application No. PCT/SE2006/001218, filed on Oct. 27, 2006, and which claims the benefit of U.S. Provisional Application No. 60/806,975, filed on Jul. 11, 2006, and of Swedish Application No. SE 0601550-7, filed in Sweden on Jul. 11, 2006. The entire contents of each of U.S. application Ser. No. 17/518,836, U.S. application Ser. No. 16/861,686, U.S. application Ser. No. 15/172,926, U.S. application Ser. No. 14/463,972, U.S. application Ser. No. 13/728,121, U.S. application Ser. No. 13/195,297, U.S. application Ser. No. 12/788,384, U.S. application Ser. No. 11/775,885, International Application No. PCT/SE2006/001218, U.S. Provisional Application No. 60/806,975 and Swedish Application No. SE 0601550-7 are hereby incorporated herein by reference in their entirety.

FIELD OF INVENTION

The invention generally relates to the field of floor panels with mechanical locking systems with a flexible and displaceable tongue. The invention also relates to a partly bendable tongue for a building panel with such a mechanical locking system.

BACKGROUND

In particular, yet not restrictive manner, the invention concerns a tongue for a floor panel and a set of floor panels mechanically joined to preferably a floating floor. However, the invention is as well applicable to building panels in general. More particularly invention relates to the type of mechanically locking systems comprising a flexible or partly flexible tongue and/or displaceable tongue, in order to facilitate the installation of building panels.

A floor panel of this type is presented in WO 2006/043893, which discloses a floor panel with a locking system comprising a locking element cooperating with a locking groove, for horizontal locking, and a flexible tongue cooperating with a tongue groove, for locking in a vertical direction. The flexible tongue bends in the horizontal plane during connection of the floor panels and makes it possible to install the panels by vertical folding or solely by vertical movement. By "vertical folding" is meant a connection of three panels where a first and second panel are in a connected state and where a single angling action connects two perpendicular edges of a new third panel, at the same time, to the first and the second panel. Such a connection takes place for example when a long side of the first panel in a first row is already connected to a long side of a second panel in a second row. The third panel, which in this text is referred to as "folding panel" is then connected by angling to the long side of the first panel in the first row. This specific type of angling action, which also connects the short side of the new third panel and second panel in the second row, is referred to as "vertical folding". It is also possible to connect two panels by lowering a whole panel solely by a substantially vertical movement against another panel where no substantial turning of the panel edge is involved. This connection of two panels is referred to as "vertical locking."

Similar floor panels are further described in WO 2003/016654, which discloses locking system comprising a tongue with a flexible tab. The tongue is extending and bending essentially in a vertical direction and the tip of the tab cooperates with a tongue groove for vertical locking. The flexible tab is directed upwards and located on the folding panel. The major disadvantage of such an embodiment is that the flexible tab must be displaced inwards by a sharp panel edge as shown in FIG. 17a.

Definition of Some Terms

In the following text, the visible surface of the installed floor panel is called "front face", while the opposite side of the floor panel, facing the sub floor, is called "rear face". The edge between the front and rear face is called "joint edge". By "horizontal plane" is meant a plane, which extends parallel to the outer part of the surface layer. Immediately juxtaposed upper parts of two adjacent joint edges of two joined floor panels together define a "vertical plane" perpendicular to the horizontal plane.

By "joint" or "locking system" are meant co acting connecting means, which connect the floor panels vertically and/or horizontally. By "mechanical locking system" is meant that joining can take place without glue. Mechanical locking systems can in many cases also be combined with gluing. By "integrated with" means formed in one piece with the panel or factory connected to the panel.

By a "flexible tongue" is meant a separate tongue which has a length direction along the joint edges and which is forming a part of the vertical locking system and could be displaced horizontally during locking. The tongue could, for example, be bendable or have a flexible and resilient part in such a way that it can bend along its length and spring back to its initial position.

By "angling" is meant a connection that occurs by a turning motion, during which an angular change occurs between two parts that are being connected or disconnected. When angling relates to connection of two floor panels, the angular motion takes place with the upper parts of joint edges at least partly being in contact with each other, during at least part of the motion.

SUMMARY

Embodiments of the present invention relate to a set of floor panels or a floating flooring and tongue for a floor panel, which provides for new embodiments according to different aspects offering respective advantages. Useful areas for the invention are floor panels of any shape and material e.g., laminate, wood, HDF, veneer or stone.

According to a first object, an embodiment of the invention provides for a set of floor panels comprising a mechanically locking system at two adjacent edges of a first and a second panel, whereby the locking system is configured to connect a first panel to a second panel in the horizontal and vertical plane. The locking system is provided, in order to facilitate the installation, with a displaceable tongue for locking in the vertical plane. The tongue is displaceable in a displacement groove in the edge of one of the floor panels and is configured to cooperate with a tongue groove in the other of said floor panels. A first long edge of the tongue comprises at least two bendable protrusions extending essentially in the horizontal plane and bendable in the horizontal plane. A second long edge of the tongue, which in the connected state extends outside the displacement groove, has an essentially straight outer edge over substantially the whole length of the tongue.

As the floor panel according to embodiments of the first object of the invention is provided with a displaceable tongue with bendable protrusions and an essentially straight outer edge this offers several advantages. A first advantage consists in that the floor panels are locked in the vertical direction along substantially the whole length of the tongue. A second advantage is that it is possible to mould the tongues in one part in e.g., plastic material and if desired to cut them up in shorter tongues, which all have essentially the same properties. The same moulding tool could be used to produce flexible tongues for different panel widths. Especially the displacement resistance and the locking strength per length unit could be achieved. A third advantage is that the displacement resistance, due to the bending of the protrusions, is essentially the same along the whole tongue. A larger number of protrusions provides for a more constant displacement resistance along the edge of the tongue. If the panels are installed by vertical folding a constant displacement resistance over the length of the tongue is desired. Also, a high angle between the fold panel and the second panel when the fold panel initially contact the tongue in the second panel is provided. The protrusions are designed to allow displacement but also to prevent tilting of the tongue.

A floor panel is known from WO 2006/043893, as mentioned above, and discloses a bow shaped flexible tongue bendable in the length direction. The drawback of this bow shaped tongue is that due to the shape, there is no locking at the end of the tongue. One embodiment is shown that provides locking along the whole length (FIG. 7f), but that tongue consists of two connected parts (38, 39). It is also important that the tongue easily springs back after being displaced into the displacement groove during installation. Therefore, it is advantageously if the part of the tongue which cooperate with the adjacent panel is relatively stable and is provided with sliding surfaces with an area enough to avoid that the tongue get stuck before reaching its final position for vertical locking. A sliding surface at the tip of a tab or a protrusion is therefore not a useful solution.

Advantageously, the protrusions of the tongue are bow shaped, providing an essentially constant moment arm during installation of the panels and bending of the protrusions.

Preferably, the tongue comprises a recess at each protrusion, resulting in avoiding of deformation and cracking of the protrusion if the tongue is displaced too far and too much force is applied.

Preferably, the length of the tongue is of more than 90% of the width WS of front face of the panel; in other preferred embodiments the length of the tongue is preferably in the range from 75% to substantially the same as the width WS of front face.

According to a second object, an embodiment of the invention provides for a tongue for a building panel, said tongue is of an elongated shape and made of moulded plastic. The tongue comprises at least two protrusions at a first long edge of the tongue. The protrusions are bendable in a plane parallel to the upper surface of the tongue and extending essentially in the parallel plane. Furthermore, the tongue has a second long edge, which is essentially straight over substantially the whole length of the tongue.

A first advantage consists in that the tongue provides for locking in the vertical direction along the whole length of the tongue. A second advantage is that it is possible to mould the tongue in one part in plastic and, if desired, cut the tongue into shorter tongues, which all have essentially the same properties. Especially the displacement resistance and the locking strength per length unit are essentially the same. A third advantage is that the displacement resistance, due to the bending of the protrusions, is essentially the same along the whole tongue. A larger number of protrusions provides for a more constant displacement resistance along the edge of the tongue. Even rather rigid materials such as reinforced plastic, metals, for example aluminum and wood may be made flexible with protrusions according to the principle of the invention. If the panels are installed by vertical folding, e.g., by the installation method explained below (see FIG. 5), a constant displacement resistance is desired.

According to a third object, an embodiment of the invention provides for a set of floor panels comprising a mechanically locking system at two adjacent edges of a first and a second panel, whereby the locking system is configured to connect a first panel to a second panel in the horizontal and vertical plane. The locking system is provided, in order to facilitate the installation, with a displaceable tongue for locking in the vertical plane. The tongue is displaceable in a displacement groove in the edge of one of the floor panels and is configured to cooperate with a tongue groove in the other of said floor panels. At least one long edge of the tongue, which in the connected state extends outside the displacement groove, comprises at least two bendable protrusions extending essentially in the horizontal plane and bendable in the horizontal plane. This embodiment with displaceable and bendable protrusions at the outer edge offers several advantages. The whole tongue may also be displaceable. A first advantage consists in that only a part of the tongue has to be pressed into the displacement groove during folding and this will decrease the friction force that has to be overcome during folding. The protrusions are in one embodiment slightly thinner than the body of the tongue. A small play of about 0.01 to about 0.10 mm may for example be provide between at least a part of the protrusion and the displacement groove and this play could substantially eliminate friction during displacement even in the case when the groove, due to production tolerances, is slightly smaller than the tongue body. A second advantage is that the protrusions could spring back independently of each other and a more reliable locking is obtained even in cases where the friction forces varies due to production tolerances of the displacement groove and/or the tongue groove.

According to a fourth object, an embodiment of the invention provides for a locking system for floor panels comprising a mechanically locking system at two adjacent edges of a first and a second panel, whereby the mechanically locking system comprising a first connector for locking in a horizontal direction (D2) perpendicular to the adjacent edges and a second connector comprising, in order to facilitate the installation, a separate tongue, preferably made of a separate material than the core of the panel, for locking in a vertical direction (D1). A part of the tongue is flexible and bendable in the horizontal and/or vertical plane. The locking system is configured to connect a first panel to a second panel by angling, snapping, vertical folding and vertical locking. Such a locking system offers the advantage that the panels could be locked in several ways and this facilitates installation.

According to a fifth object, an embodiment of the invention comprises an installation method to connect panels preferably floor panels. The panels comprise short sides with a mechanical locking system for locking the adjacent short edges vertically with a separate tongue comprising a flexible part and horizontally with a locking strip comprising a locking element and long sides with a mechanical locking system comprising a tongue, a groove a locking strip and a locking groove that allows vertical and horizontal locking by angling. The method comprising the steps of:
- a) installing a second row of panels by connecting the short sides of the panels with vertical locking or horizontal snapping whereby the flexible part of the tongue is displaced; and
- b) connecting the second row to an adjacent and already installed first row by angling.

All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

FIGS. 1a-d illustrate a known art locking system.

FIGS. 8a-b show the bending of the protrusion of the tongue, during installation, according to embodiments of the invention.

FIGS. 9a-d show installation with vertical folding or vertical locking according to one embodiment of the invention.

FIGS. 11a-d show an embodiment of installation with snapping facilitated by a flexible tongue and bending of a locking strip.

FIGS. 12a-d show an embodiment of installation and disconnection of panels with angling.

FIGS. 17a-c show embodiments of locking systems which could be applied in the fourth and fifth object of the invention.

FIGS. 17d-e show embodiments of the invention.

DESCRIPTION OF EMBODIMENTS OF THE INVENTION

Figure 2A:
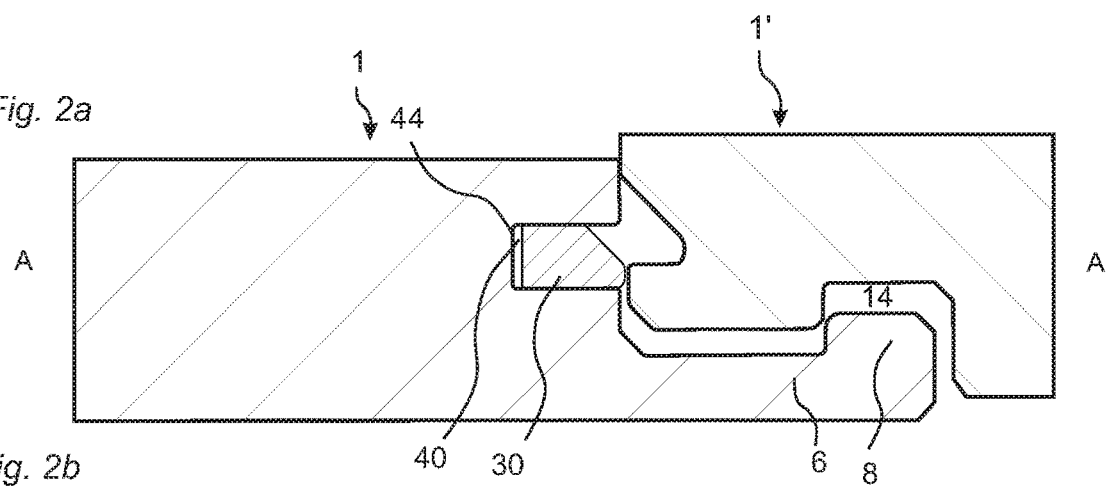
FIGS. 2a-b show a known art flexible tongue during the locking action.

As represented in FIGS. 5-17, the disclosure relates to a set of floor panels with a displaceable tongue, displaceable tongue for a floor panel, a locking system for floor panels and a method to install floor panels.

A known art floor panel 1, 1' provided with a mechanical locking system and a displaceable tongue is described with reference to FIGS. 1a-1d.

FIG. 1a illustrates schematically a cross-section of a joint between a short side joint edge 4a of a panel 1 and an opposite short side joint edge 4b of a second panel 1'.

The front faces of the panels are essentially positioned in a common horizontal plane HP, and the upper parts 21, 41 of the joint edges 4a, 4b abut against each other in a vertical plane VP. The mechanical locking system provides locking of the panels relative to each other in the vertical direction D1 as well as the horizontal direction D2.

To provide joining of the two joint edges in the D1 and D2 directions, the edges of the floor panel have in a manner known per se a locking strip 6 with a locking element 8 in one joint edge, hereafter referred to as the "strip panel" which cooperates with a locking groove 14 in the other joint edge, hereafter referred to as the "fold panel", and provides the horizontal locking.

The known art mechanical locking system comprises a separate flexible tongue 30 fixed into a displacement groove 40 formed in one of the joint edges. The flexible tongue 30 has a groove portion P1, which is located in the displacement groove 40 and a projecting portion P2 projecting outside the displacement groove 40. The projecting portion P2 of the flexible tongue 30 in one of the joint edges cooperates with a tongue groove 20 formed in the other joint edge.

The flexible tongue 30 has a protruding part P2 with a rounded outer part 31 and a sliding surface 32, which in this embodiment if formed like a bevel. It has upper 33 and lower 35 tongue displacement surfaces and an inner part 34.

The displacement groove 40 has an upper 42 and a lower 46 opening, which in this embodiment are rounded, a bottom 44 and upper 43 and lower 45 groove displacement surfaces, which preferably are essentially parallel with the horizontal plane HP.

The tongue groove 20 has a tongue-locking surface 22, which cooperates with the flexible tongue 30 and locks the joint edges in a vertical direction D1. The fold panel 1' has a vertical locking surface 24, which is closer to the rear face 62 than the tongue groove 20. The vertical locking surface 24 cooperates with the strip 6 and locks the joint edges in another vertical direction. The fold panel has in this embodiment a sliding surface 23 which cooperated during locking with the sliding surface 32 of the tongue.

Figure 3A:
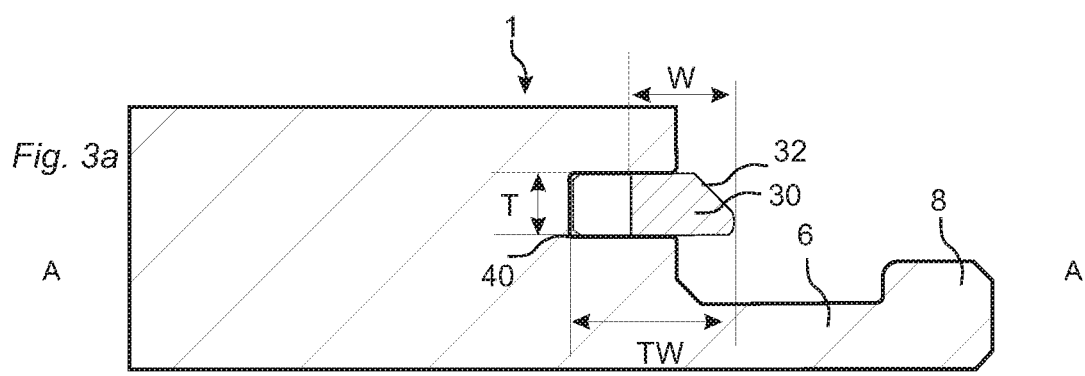
FIGS. 3a-b show a floor panel with a known art mechanical locking system on a short side.
Figure 3B:
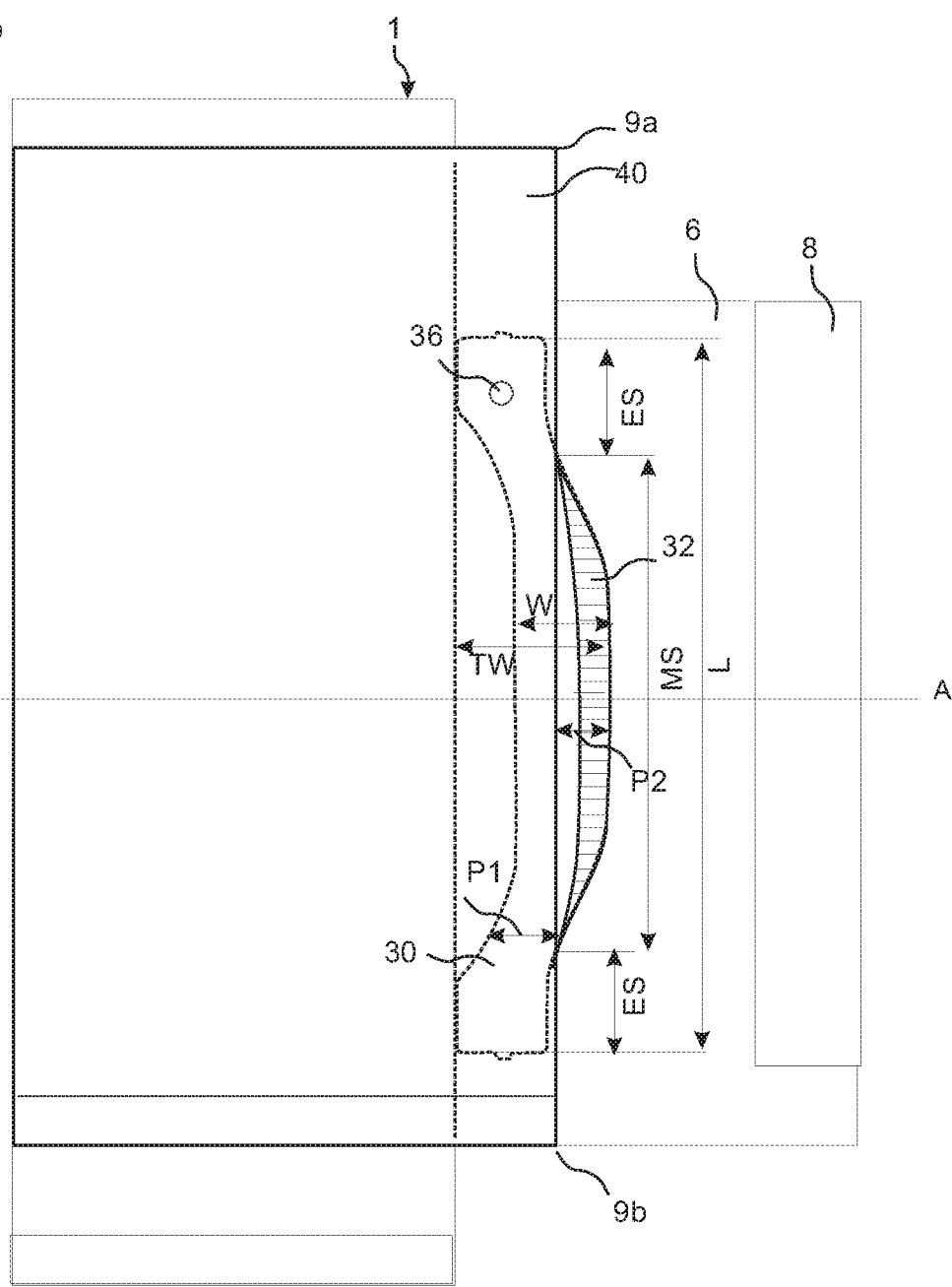

FIG. 3a shows a cross section A-A of a panel according to FIG. 3b seen from above. The flexible tongue 30 has a length L along the joint edge, a width W parallel to the horizontal plane and perpendicular to the length L and a thickness T in the vertical direction D1. The sum of the largest groove portion P1 and the largest protruding part P2 is the total width TW. The flexible tongue has also in this embodiment a middle section MS and two edge sections ES adjacent to the middle section. The size of the protruding part P2 and the groove portion P1 varies in this embodiment along the length L and the tongue is spaced from the two corner sections 9a and 9b. The flexible tongue 30 has on one of the edges sections a friction connection 36 which could be shaped for instance as a local small vertical protrusion. This friction connection keeps the flexible tongue in the displacement groove 40 during installation, or during production, packaging and transport, if the flexible tongue is integrated with the floor panel at the factory.

Figure 2B:
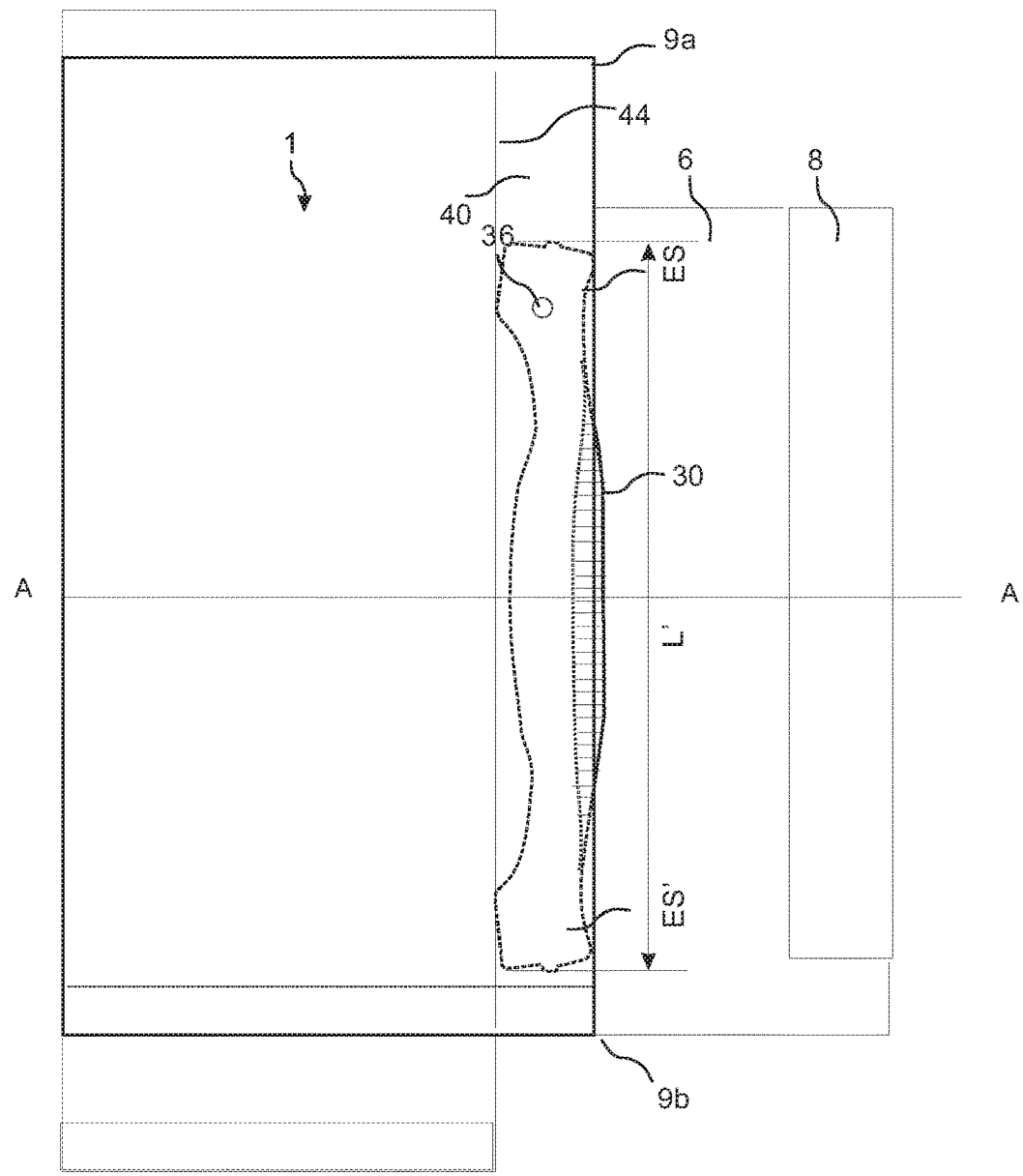

FIGS. 2a and 2b show the position of the flexible tongue 30 after the first displacement towards the bottom 44 of the displacement groove 40. The displacement is caused essentially by bending of the flexible tongue 30 in its length direction L parallel to the width W. This feature is essential for this known art.

The fold panel could be disconnected with a needle shaped tool, which could be inserted from the corner section 9b into the tongue grove 20 and press the flexible tongue back into the displacement groove 40. The fold panel could then be angled up while the strip panel is still on the sub floor. Of course, the panels could also be disconnected in the traditional way.

Figure 4A:
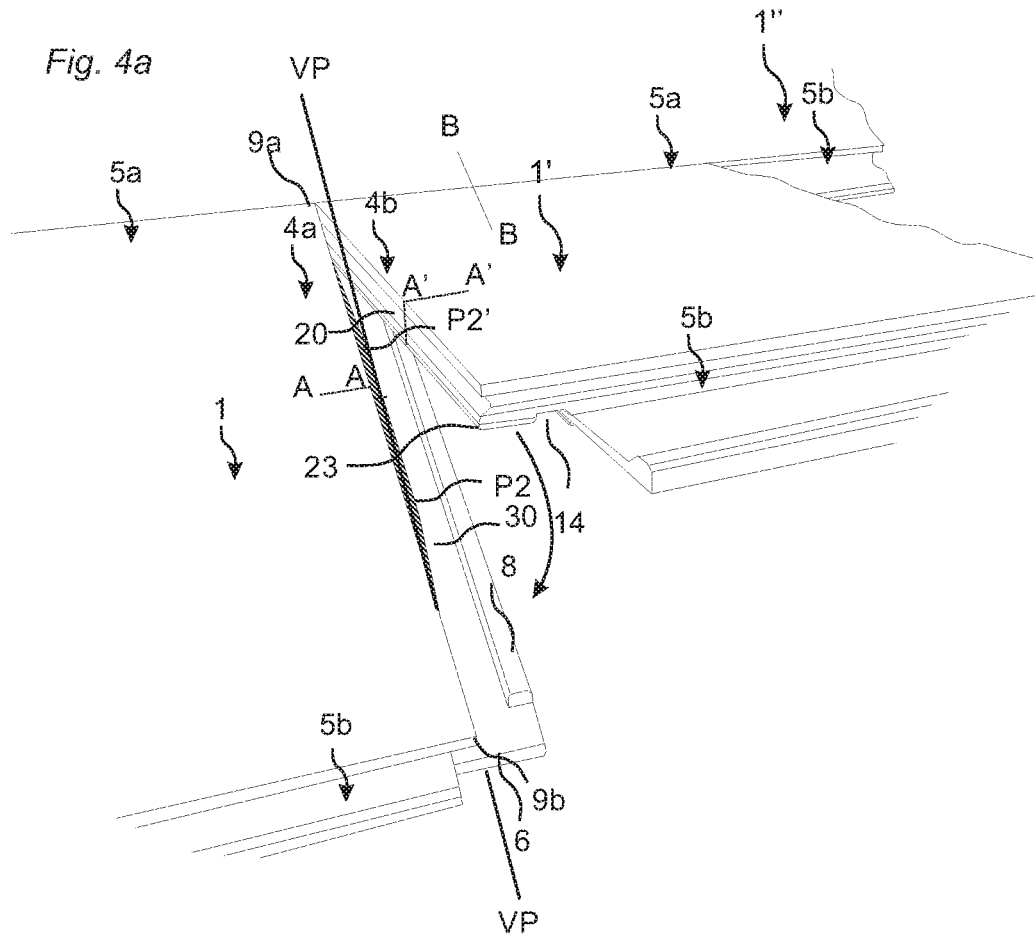
FIGS. 4a-b show how short sides of two floor panels could be locked with vertical folding according to known art.
Figure 4B:
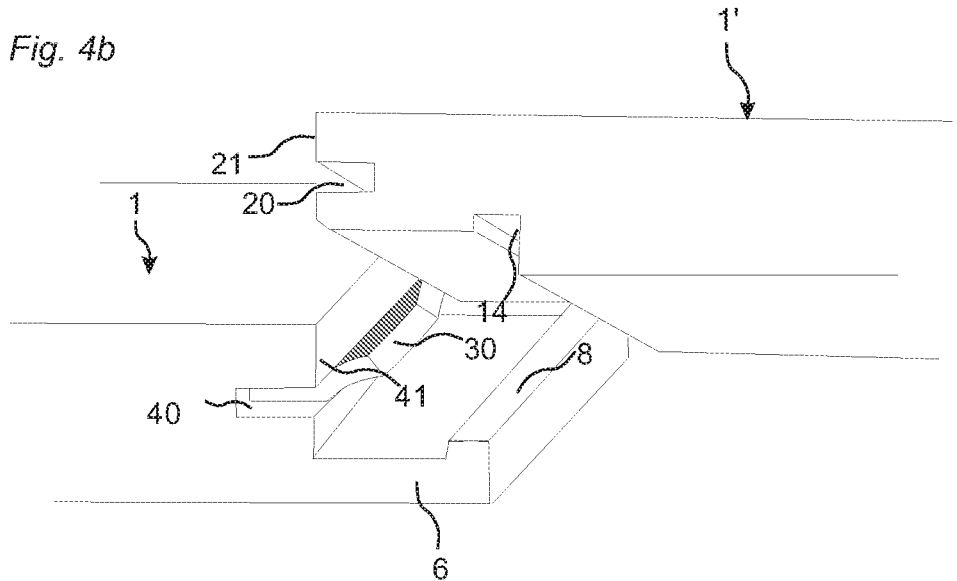

FIGS. 4a and 4b show one embodiment of a vertical folding. A first panel 1″ in a first row is connected to a second 1 panel in a second row. The new panel 1′ is connected with its long side 5a to the long side 5b of the first panel with angling. This angling action also connects the short side 4b of the new pane with the short side 4a of the second panel. The fold panel 1′ is locked to the strip panel 1 with a combined vertical and turning motion along the vertical plane VP. The protruding part P2 has a rounded and or angled folding part P2′ which during folding cooperates with the sliding surface 23 of the folding panel 1′. The combined effect of a folding part P2′, and a sliding surface 32 of the tongue which during the folding cooperates with the sliding surface 23 of the fold panel 1′ facilitates the first displacement of the flexible tongue 30. An essential feature of this embodiment is the position of the projecting portion P2, which is spaced from the corner section 9a and 9b. The spacing is at least 10% of the length of the joint edge, in this case the visible short side 4a.

Figure 5A:
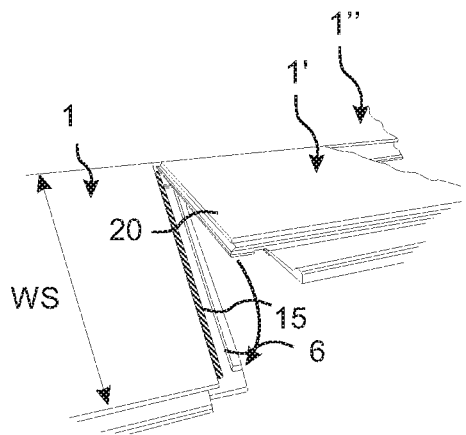
FIGS. 5a-c show panels according to one embodiment of the invention and a preferred locking method.
Figure 5B:
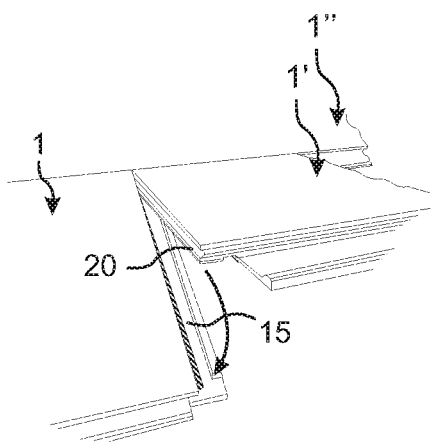
Figure 5C:
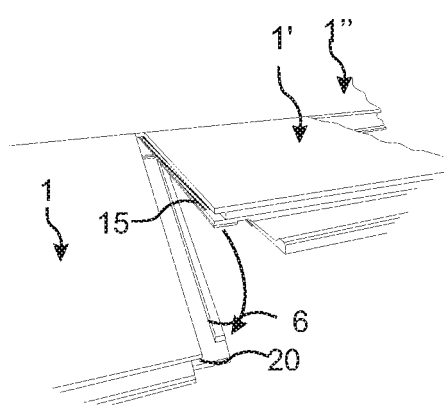

FIGS. 5a-5c show an embodiment of the set of floor panels with a displaceable tongue according to the invention and a preferred installation method. In this embodiment the length of the tongue is of more than 90% of the width WS of front face of the panel, in other preferred embodiments the length of the tongue is preferably in the range from 75% to substantially the same as the width WS of front face. Preferably, the length of the tongue is about the total width of the panel minus the width of the locking system of the adjacent edges of the panel. A small bevel may be provided at the ends of the outer edge, but the straight part of the tongue at the outer edge has preferably a length substantially equal to the length of the tongue or desirably more than 90%. The new panel 1′ is in angled position with an upper part of the joint edge in contact with the first panel 1″ in the first row. The new panel 1′ is then displaced towards the second panel 1 until the edges are essentially in contact and a part of the flexible tongue 15 is pressed into the displacement groove 40 as can be seen in the FIG. 5b. The new panel 1′ is then folded down towards the second panel 1. Since the displacement of the new panel 1′ presses only an edge section of the flexible tongue 15 into the displacement groove 40, vertical folding will be possible to make with less resistance. Installation could be made with a displaceable tongue that has a straight outer edge. When panels with the known bow shaped tongue 30 (see FIG. 2-4) are installed the whole tongue has to be pressed into the displacement groove. When comparing the known bow shaped tongue with a tongue according to the invention less force is needed for a tongue with the same spring constant per length unit of the tongue. It is therefore possible, using the principles of the invention, to use a tongue with higher spring constant per length unit and higher spring back force, resulting in more reliable final position of the tongue. With this installation method, the beveled sliding surface of the fold panel is not necessary, or may be smaller, which is an advantage for thin panels. If the tongue is not long enough, the installation method above is not working and the beveled sliding surface of the fold panel is needed. FIG. 5c show that the tongue could be on the folding panel.

A preferred production method according to the invention is injection moulding. With this production method a wide variety of complex three-dimensional shapes could be produced at low cost and the flexible tongues 15 may easily be connected to each other to form tongue blanks 50. A tongue could also be made of an extruded or machined plastic or metal section, which could be further shaped with for example punching to form a flexible tongue according to the invention. The drawback with extrusion, besides the additional production steps, is that it is hard to reinforce the tongue, e.g., by fibres.

As can be seen when comparing FIGS. 5 and 4, the angle between the new panel rand the second panel 1 is higher, for the panels with the tongue according to an embodiment of the invention, when the new panel initially contacts the end of the tongue 15 and begins to displace the tongue into the displacement groove 40. It is an advantage if the angle is higher, since a higher angle means a more comfortable working position in which it is easier to apply a higher force pushing the tongue into the displacement groove.

Any type of polymer materials could be used such as PA (nylon), POM, PC, PP, PET or PE or similar having the properties described above in the different embodiments. These plastic materials could be when injection moulding is used be reinforced with for instance glass fibre, Kevlar fibre, carbon fibre or talk or chalk. A preferred material is glass fibre, preferably extra-long, reinforced PP or POM.

FIGS. 6a-e show embodiments of the tongue 15 according to the invention. They are all configured to be inserted in a groove in a floor panel, in a similar way as described for the known art tongues and panels in reference to FIGS. 1-4 above. All methods to injection mould, insert and also the tool for disassembling described in WO2006/043893 and partly in the description and FIGS. 1-4 above are applicable to the invention.

Figure 6A:
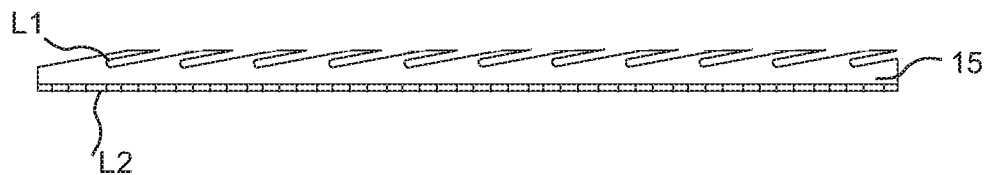
FIGS. 6a-e show displaceable tongues in embodiments according to the invention.

FIG. 6a shows an embodiment with a first long edge L1 and a second long edge L2. The first long edge has protrusions extending in a plane parallel to the topside 64 of the tongue 15 and with an angle relative the longitudinal direction of the tongue.

Figure 6B:
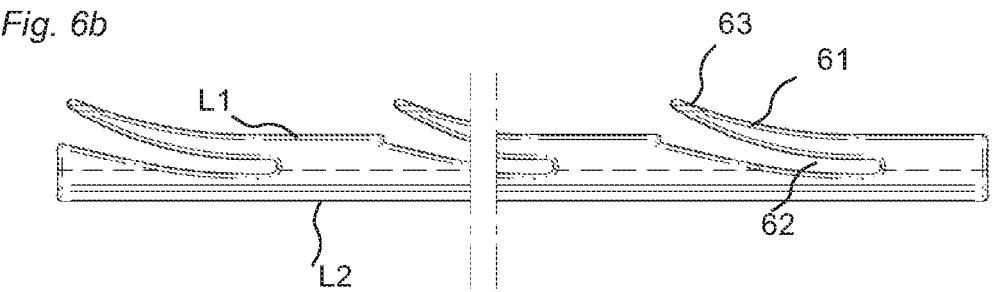

FIGS. 6a-b show the embodiment, in top and in a side view, with a first long edge L1 and a second long edge L2. The first long edge has protrusions 61 extending in a plane parallel to the topside, an upper displacement surface 61, and rear side, a lower displacement surface, of the tongue and with an angle relative the longitudinal direction of the tongue. The protrusions are preferably bow shaped and, in a particular preferred embodiment, the tongue is provided with a recess 62 at each protrusion 61. The recess is preferably adapted to the size and shape of the protrusion.

The protrusions are preferably provided with a friction connection 63, most preferably close to or at the tip of the protrusion, which could be shaped for instance as a local small vertical protrusion. This friction connection keeps the flexible tongue in the displacement groove 40 during installation, or during production, packaging and transport, if the displaceable tongue is integrated with the floor panel at the factory.

Figure 6C:
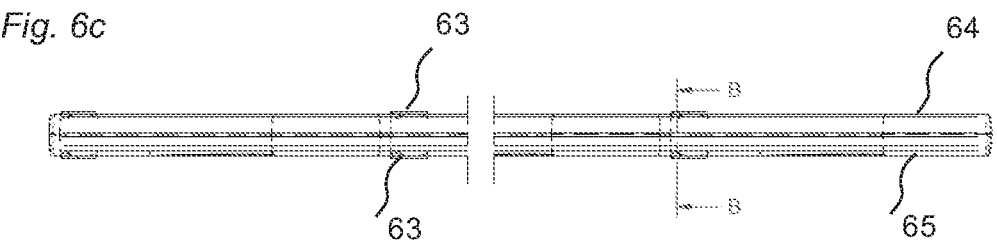
Figure 6D:
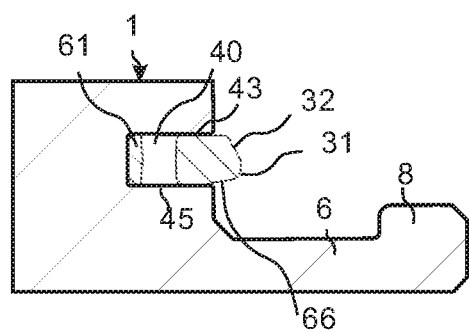

FIG. 6d shows the tongue 15 in the cross section B-B in FIG. 6c and positioned in the displacement groove 40 of a panel 1. The upper and lower displacement surface of the tongue is configured to cooperate with an upper 43 and a lower 45 groove displacement surfaces. The panel comprises a locking strip 6 and a locking element 8 for horizontal locking. The panel 1 is configured to be connected to a second panel 1' in a similar way as the known art panel 1' in FIG. 1a-1d. The upper displacement surface (64) and/or the lower displacement surface (65) of the tongue is in one preferred embodiment provided with a beveled edge, presenting a sliding surface (32, 31) and an inclined locking surface (66), respectively. The inclined locking surface cooperates preferably with an inclined tongue-locking surface 22 in the tongue groove (20).

Figure 6E:
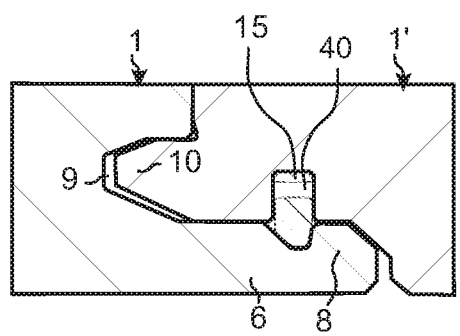

In embodiments according to FIGS. 6d and 6e, the displacement groove (40) is formed in one piece with the core of the panel, but other alternatives are possible. The displacement groove may be formed in a separate material, for example HDF, which is connected to a wood core in a parquet floor. The displacement grove may be formed of U-shaped plastic or metal sections, which are connected to the panel with for example a snap connection, glue or friction. These alternatives could be used to reduce friction and to facilitate horizontal displacement of the tongue in the displacement grove. The displacement groove may also be treated with a friction reducing agent. These principles may also be applied to the tongue groove.

FIG. 6e shows that the tongue 15 may also be inserted into the displacement groove 40 of a panel for locking in the horizontal plane. The tongue is displaced in the vertical plane during connection of the panels. These types of panels are connected by a movement in the horizontal plane—"horizontal snapping".

To facilitate the installation, it is advantageous if the spring constant of the protruding part is as linear as possible. A linear spring constant results in a nice and smooth connection movement without suddenly or heavily increased displacement resistant. According to one embodiment, this is achieved by a bow shaped protrusion. FIG. 8b shows that a bow shaped protrusion results in an essentially constant moment arm, the force is during the whole course of connecting two panels at the tip of the protrusion, and an essentially linear spring constant. FIG. 8a shows that a straight protrusion results in that the moment arm is changed during the course; the force is spread out over a larger part of the length of the protrusion, resulting in an increased spring constant during the course. F is the displacement force and L is the displaced distance.

The preferred recess at the protrusion has the advantage that the protrusion is not destroyed if too much force is applied or the tongue is displaced too far. The protrusion is pushed into the recess and a cracking of the protrusion is avoided.

Figure 7A:
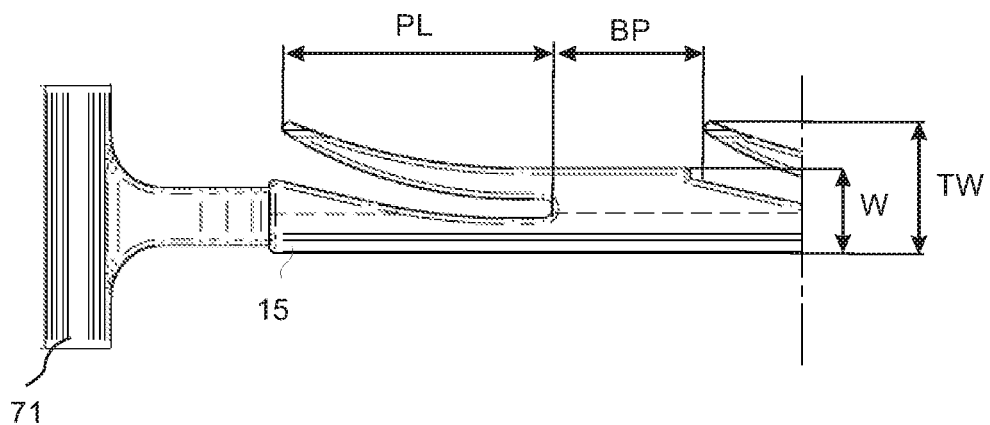
FIGS. 7a-b show the displaceable tongues in an embodiment according to the invention in a top view and a 3D view.
Figure 7B:
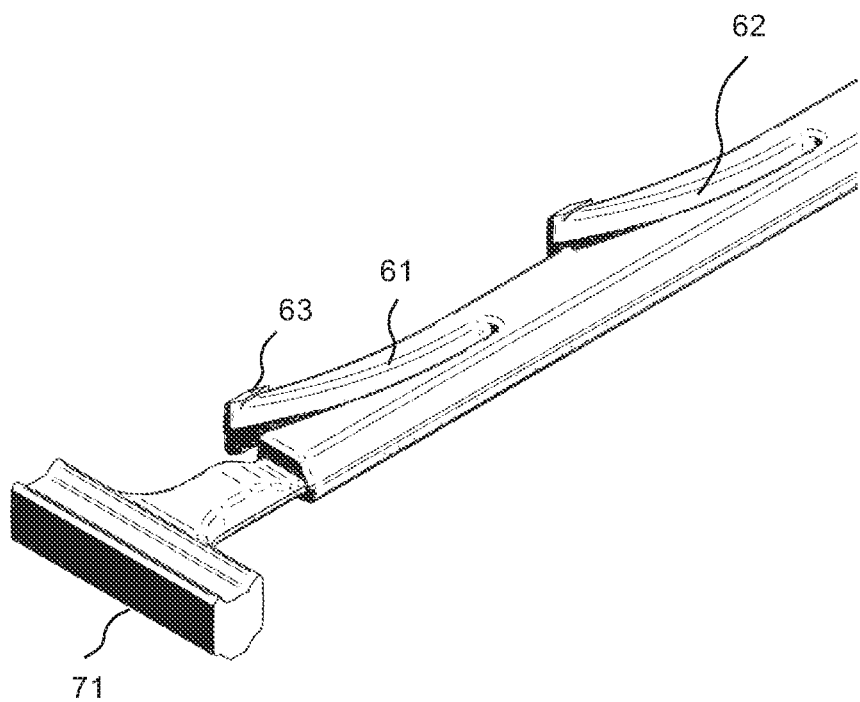
Figure 10A:
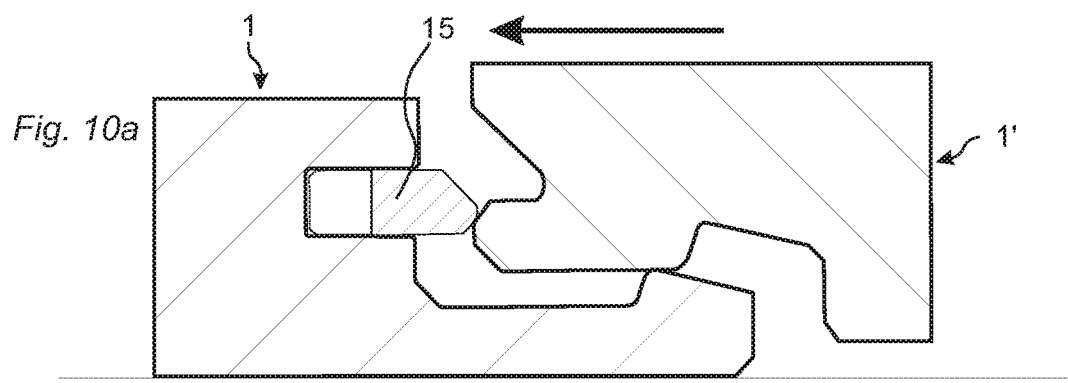
FIGS. 10a-d show installation with snapping according to one embodiment of the invention.
Figure 10B:
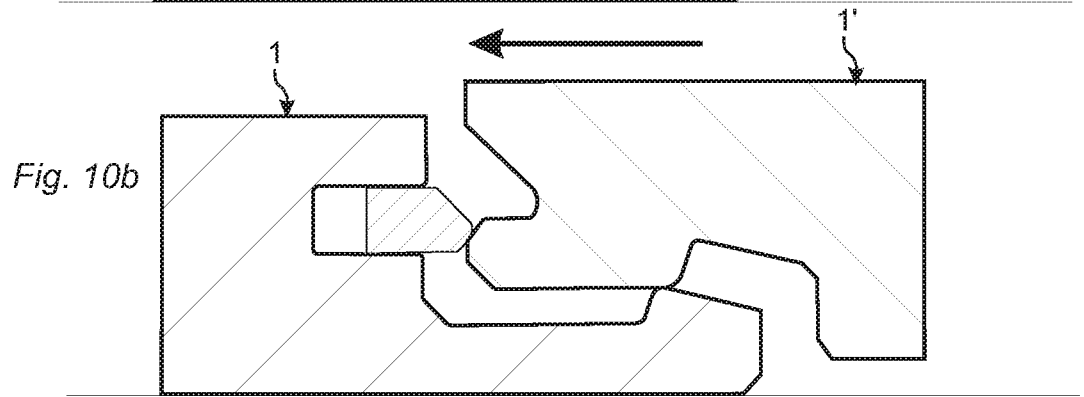
Figure 10C:
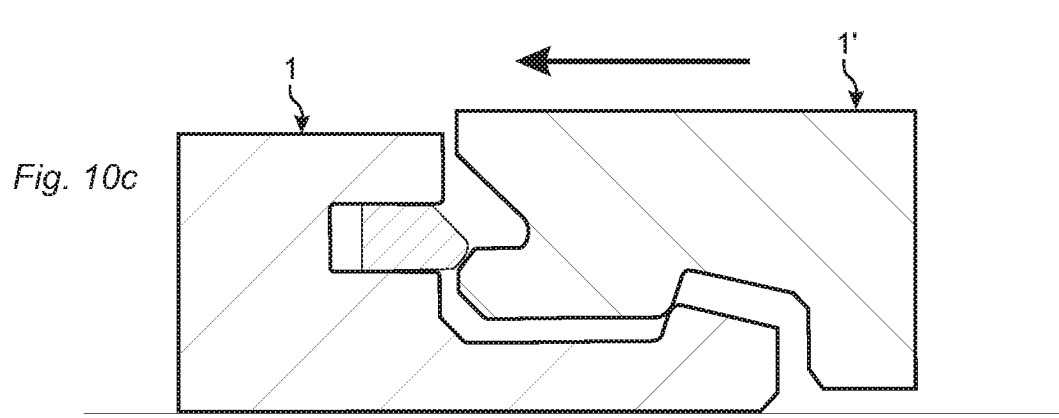
Figure 10D:
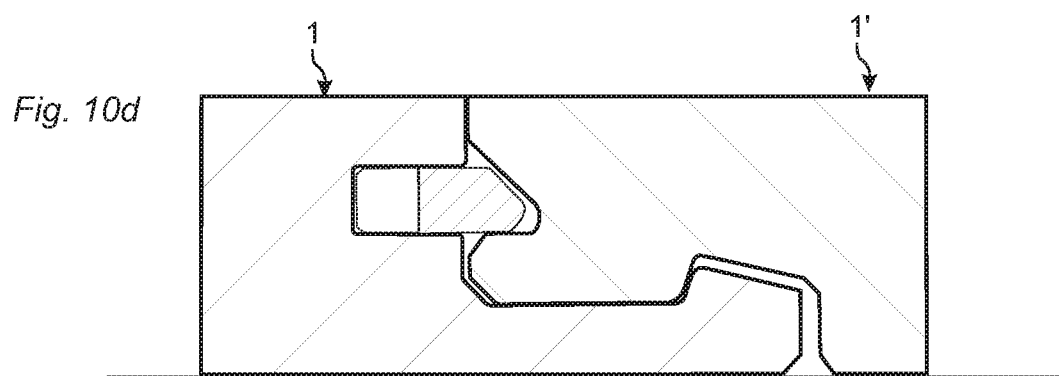

FIGS. 7a-b show two enlarged embodiments of a part of the tongue in a top view and in a 3D view. The figures show a casting gate 71 which is cut off before insertion into the displacement groove.

It is preferred that the length of the protrusion PL is larger than the total width TW of the tongue. The total width is the width of the tongue W plus the distance from the tongue body to the tip of the protrusion perpendicular to the length direction of the tongue. In the most preferred embodiment, PL is larger than 2*TW. It is also preferred that the recess is wider near the tip of the protrusion than near the bottom of the recess; as shown I FIG. 7a.

Preferably, the force to displace the tongue 1 mm is per 100 mm length of the tongue in the range of about 20 to about 30 N.

Preferably the length of the protrusion PL is in the range of about 10 mm to about 20 mm, the width W of the tongue is in the range of about 3 mm to about 6 mm and the total width TW of the tongue is in the range of about 5 mm to about 11 mm. The length of the body part BP between two protrusions, i.e., the distance from the root of one protrusion to the tip of an adjacent protrusion, is in the range of about 3 mm to about 10 mm. As a non-limiting example, for a width of a floor panel of about 200 mm, including the width of the locking system at adjacent edges, with a tongue length of about 180 mm, having 9 protrusions the protrusion length is about 15 mm, the length of the body part BP is about 5 mm, the width of the tongue W is about 5 mm and the total width TW is about 8 mm.

The tongues according to the embodiments of the invention are all possible to mould in one piece. It is further possible to cut the moulded tongue in shorter pieces which all have the same properties per length unit, provided that the number of protrusions is not too few. Another production method is extrusion combined with punching or cutting of the recess and the protrusions of the tongue.

FIGS. 9a-9d show a locking system, which allow vertical folding and vertical locking according to the main principles of the invention. In order to facilitate locking, the locking system comprises a friction reducing agent (71, 71', 71") such as wax, oil or similar chemicals at the edge of folding panel 1' and/or at the locking element 8 and/or at the locking grove 14. Preferably all flexible tongues shown in this application are provided with a friction reducing agent, e.g., wax or oil.

FIGS. 10a-10d show that a locking system, which allows vertical folding, also could be designed to be locked with horizontal snapping. In this embodiment the snapping is mainly facilitated by the flexible tongue (15). The locking system could be designed to be locked with a substantial horizontal displacement or with a combination of horizontal and vertical displacement, as shown in FIGS. 10a-d. The outer parts of the tongue 15 and the edge of the folding panel 1 could be designed with bevels and/or rounded parts that facilitate snapping.

FIGS. 11a-11d show that the snapping could also be combined with a flexible strip (6) that during snapping is bended downwards towards the sub floor.

FIGS. 12a-12d show that the locking system also could be designed to allow locking with angling. FIG. 12d shows that the locking system also could be unlocked with angling. Wax and other types of friction reducing agents could also be applied in the displacement groove, the tongue groove or in the locking system and especially on surfaces that during locking are in contact with the flexible tongue. Such friction reducing agent will improve the locking and unlocking functions in all locking systems, for example shown in FIGS. 2b, 13c-d, 14a-c, 15a-b and 17a-e where a part of a tongue is flexible.

A locking system, which could be locked with vertical folding, vertical locking, angling and snapping, could have many different types of tongues, which are made of a separate material than the core of the panel, which tongues are connected to a panel edge and which tongues have at least one part that is flexible. Examples of embodiments of locking systems and separate tongues that allow such locking are shown in FIGS. 2b, 13c-d, 14a-c, 15a-b and 17a-e. All types of flexible tongues, which for example have snap tabs, are bended in length direction, have flexible protrusions inside or outside a groove etc. could be used. According to the invention a locking system with a separate tongue which has at least one flexible part provided and this locking system has locking means which allow vertical and horizontal locking with vertical folding, vertical locking snapping with or without a flexible strip and with angling. It could also be unlocked by angling. Such a locking system will offer several advantages during installation of floor panels. Of course, locking systems could be designed such that one or several of the above mentioned locking function could be prevented. For example, a locking element, which has a locking surface essentially perpendicular to the horizontal plane, will prevent disassembly with angling up of the panel. Such a locking system will however have a high strength in the horizontal direction.

Figure 13A:
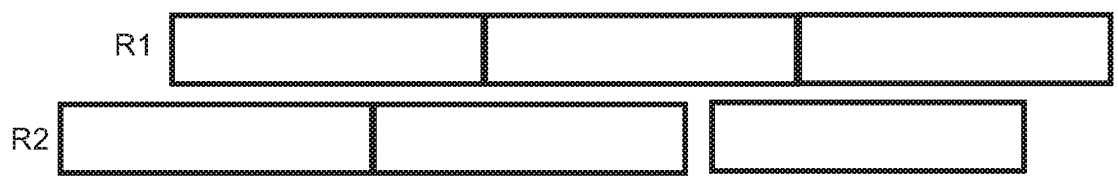
FIGS. 13a-b show an embodiment of an installation method.
Figure 13B:
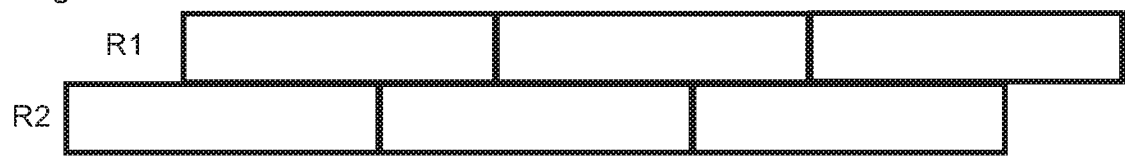

Vertical folding is in most cases the most convenient installation method. However, FIGS. 13a and 13b show an alternative installation method. The short sides of panels in a first row R1 are connected. The short sides of panels in a second row R2 are connected to each other by vertical locking or horizontal snapping where a part of a separate tongue, comprising a flexible part, is displaced during locking. Such a connecting method is extremely easy since the panels could be laid flat on the sub floor short edge against short edge and connected. They do not have to be angled or snapped together with a tapping block. The two adjacent rows R1 and R2 are then connected with angling.

The method comprises installation of floor panels comprising short edges with a mechanical locking system for locking the adjacent short edges vertically with a separate tongue comprising a flexible part and horizontally with a locking strip comprising a locking element and long sides with a mechanical locking system comprising a tongue, a groove a locking strip and a locking groove that allows vertical and horizontal locking by angling.
 a) Installing a second row R2 of panels by connecting the short sides of the panels with vertical locking or horizontal snapping whereby the flexible part of the tongue is displaced.
 b) Connecting the second row R2 to an installed and adjacent row R2 by angling.

Figure 13C:
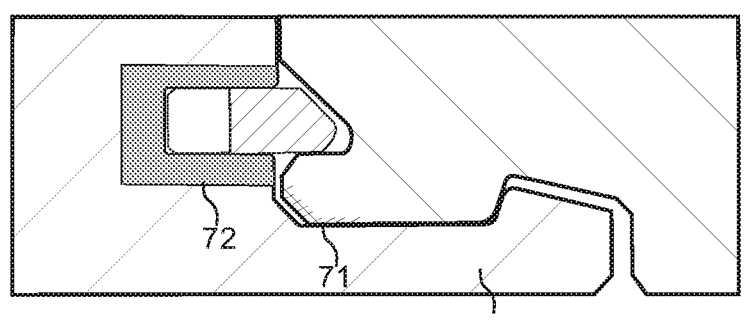
FIGS. 13c-e show embodiments with separate materials connected to the panel edge.
Figure 13D:
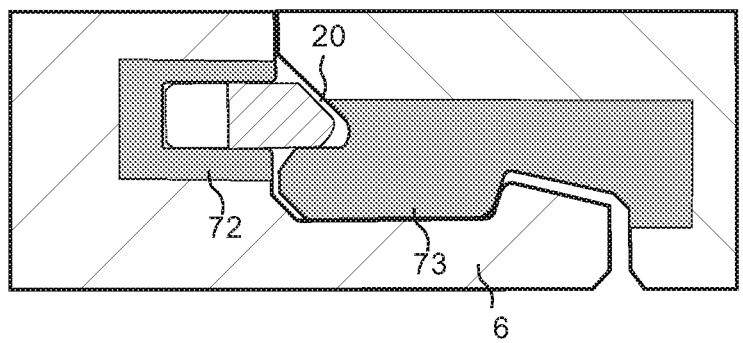
Figure 13E:
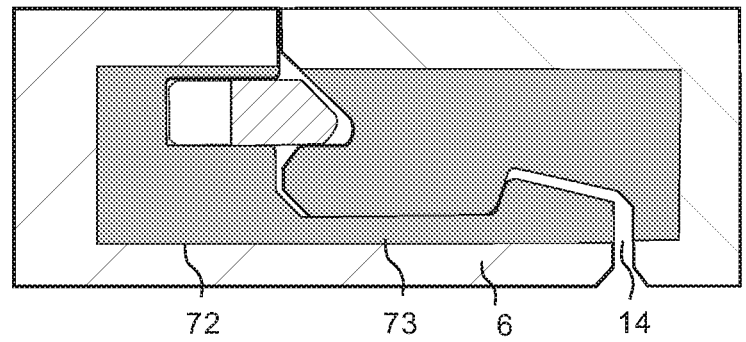

FIGS. 13c-13e show that separate materials 72-73 could be used to improve strength and locking functions. Such separate materials that could be connected as an edge portion in a for example a laminate or wood floor panel and they could preferably comprise hard wood, plywood, plastic materials, HDF, MDF and similar. Separate materials could be attached to one or both edges. They could form a part of the displacement groove, as shown in FIG. 13c, a part of the tongue groove 20, as shown in FIG. 13d or even at least a part of the locking strip 6 and the locking groove 14 as shown in FIG. 13e. Separate materials could be used in all locking systems with separate and partly flexible tongues. These principles could be used for example in locking systems shown in FIGS. 17a-17e.

Figure 14A:
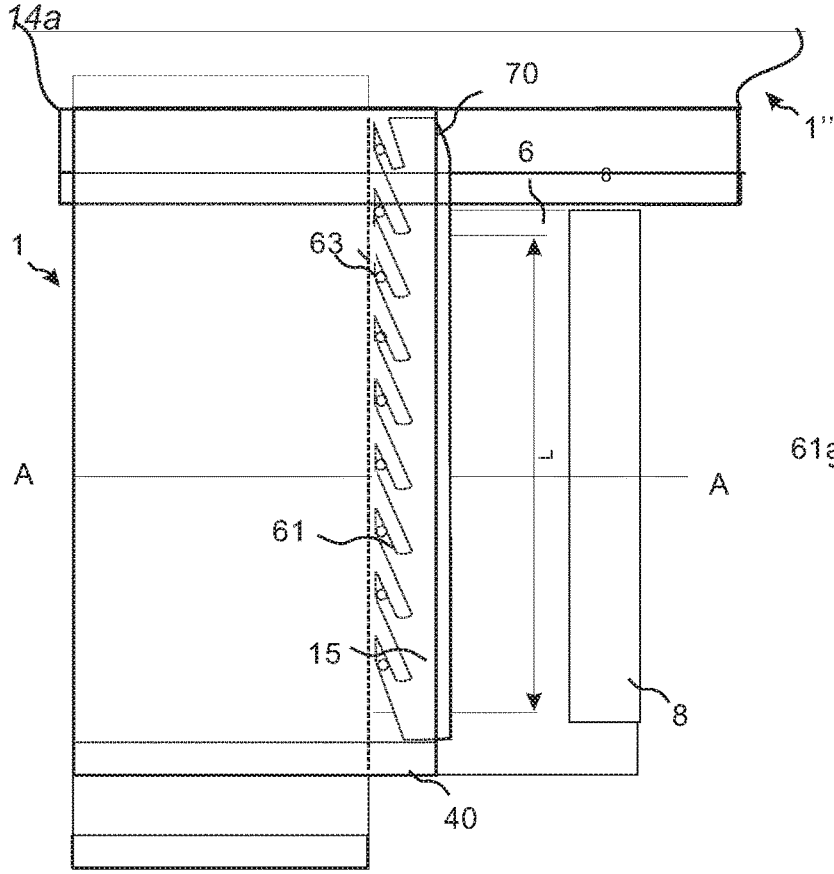
FIGS. 14a-c show embodiments according to the invention.
Figure 14C:
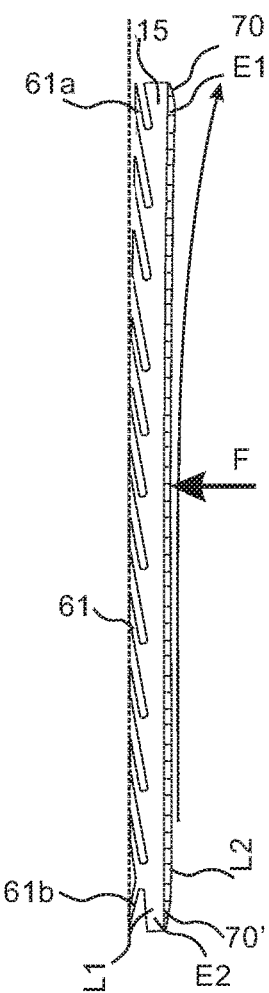
Figure 14B:
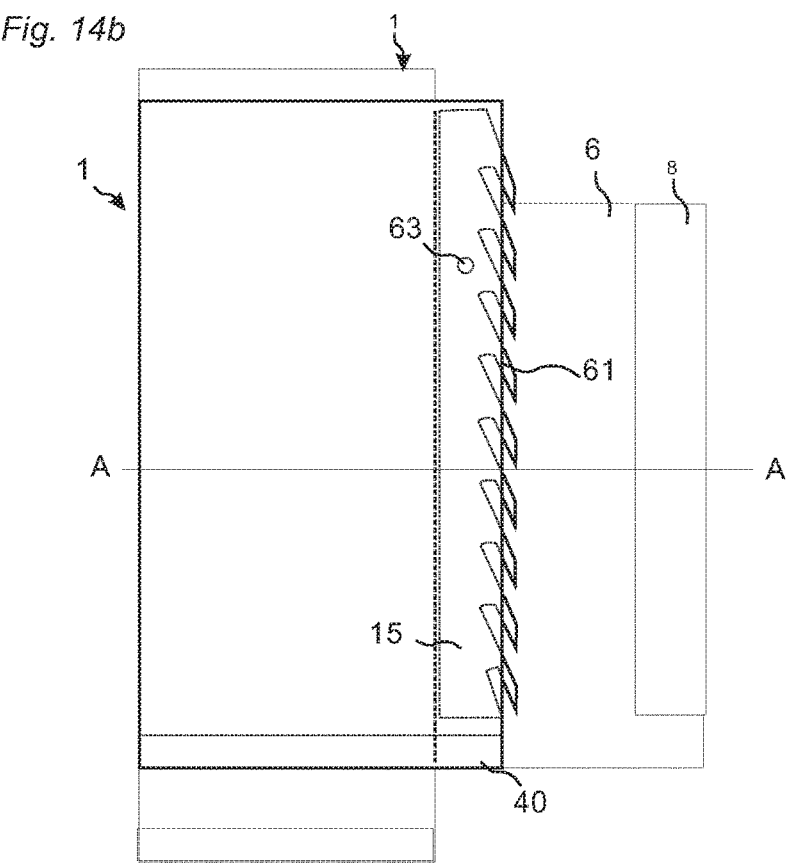

FIGS. 14a and 14b show that the protrusions 61 could be located inside or outside the displacement groove 40. The flexible protrusions, which are located outside the displacement groove, could be designed to cooperate with the tongue groove and to lock the panels vertically.

Figure 15A:
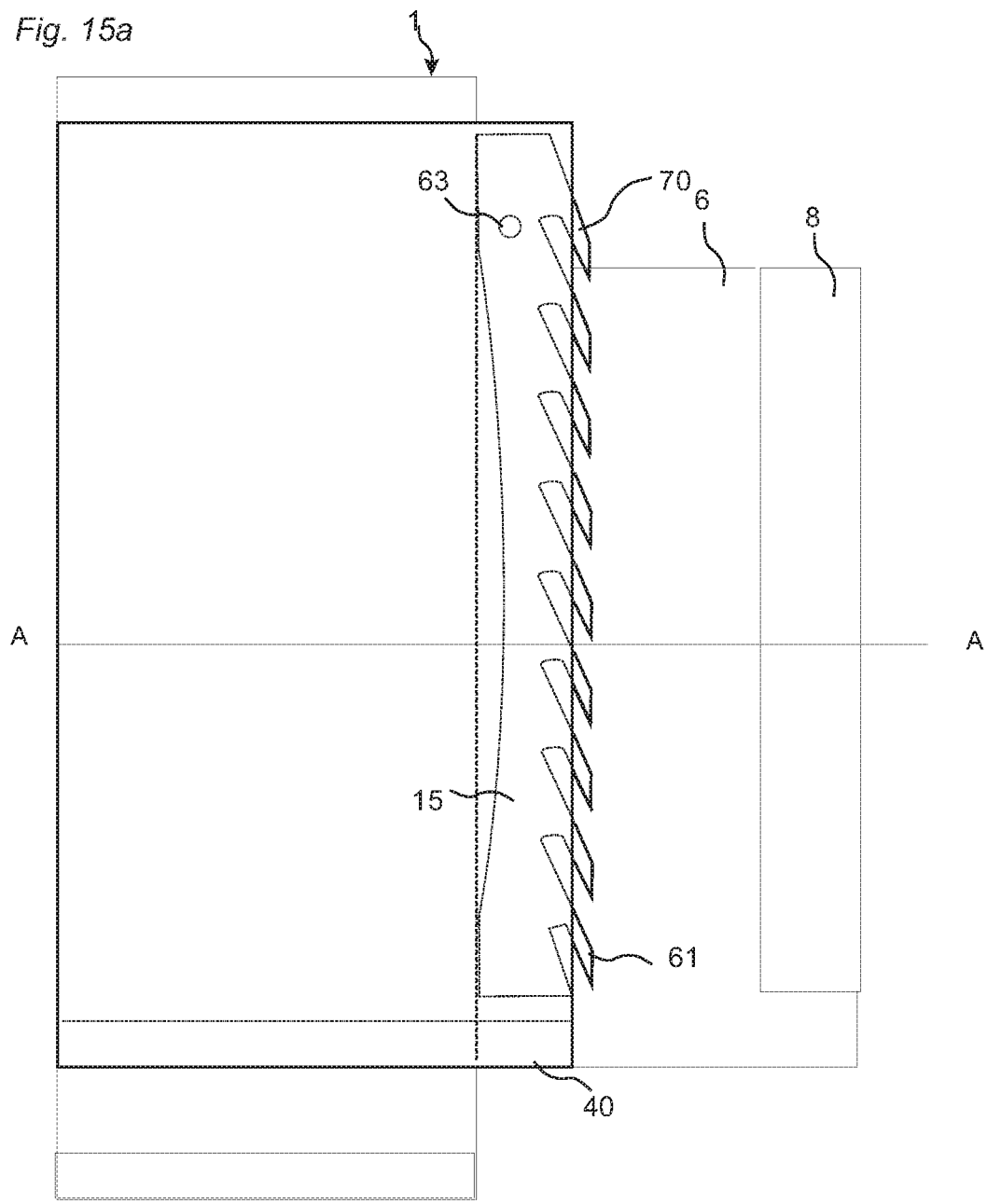
FIGS. 15a-b show embodiments according to the invention.

FIG. 15a shows an embodiment of the flexible tongue 15 with protrusions 61 partly outside the displacement groove and with a bow shaped inner part.

FIG. 14c shows that one short edge portion (E1) of the flexible tongue (15) which is located in the same direction as the direction as the protrusions, will bend out (provided that the friction connection do not prevent such bending) if a force F is pressed against the tongue when it is in the displacement groove with the protrusions inside the groove. Therefore, it is preferred that in this embodiment, protrusions should be directed towards the part of the panel where the folding starts, as shown in FIG. 14a. Such an embodiment offers the advantage that the flexible tongue will not snap out during the final part of the folding. It is preferred that the flexible tongue has at least one rounded or beveled end portion (70). Such a portion could be integrated in a moulded tongue. It could also be for example a punched or cut part in a tongue, which is extruded. In this embodiment there are protrusions 61a and 61b at the edge portions of the tongue and these extrusions extend in different directions away from each other. The tongue has also two short edge portions E1 and E1 which are formed such that they do not extend outside the displacement grove as much as the middle part of the tongue. Such an embodiment will facilitate installation. The shape of the protrusions and the short edge portions could be used separately or in combination.

Figure 15B:
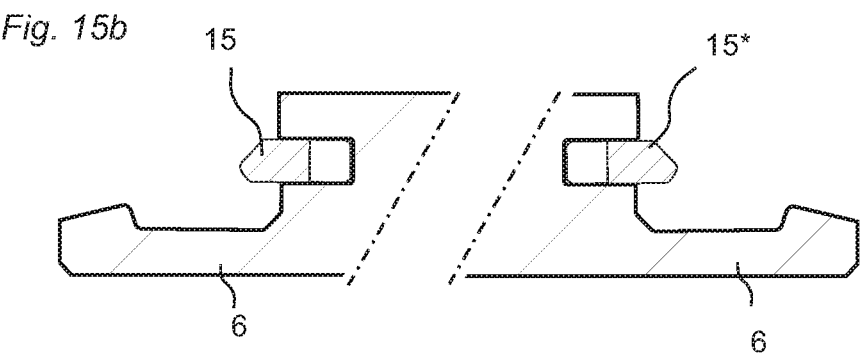

FIG. 15b shows an embodiment with flexible tongues 15, 15' on two opposite edges of the same panel. This is useful in advanced installations. All embodiments of separate tongues shown in this application could be used.

Figure 16A:
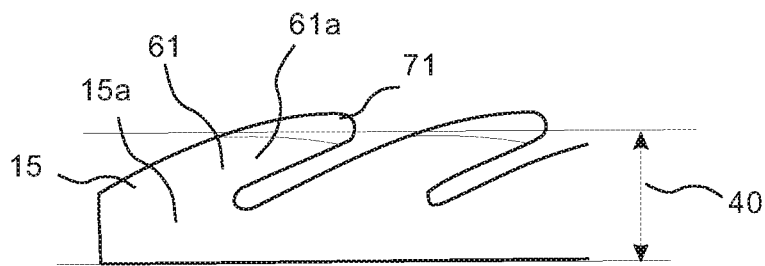
FIGS. 16a-e show embodiments according to the third object of the invention.
Figure 16B:
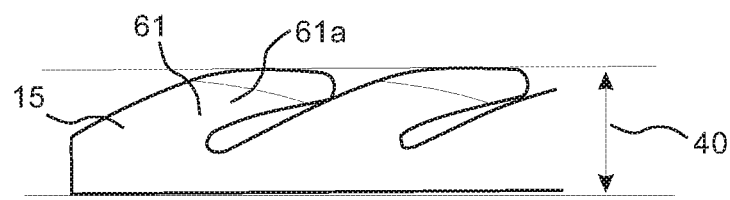
Figure 16C:
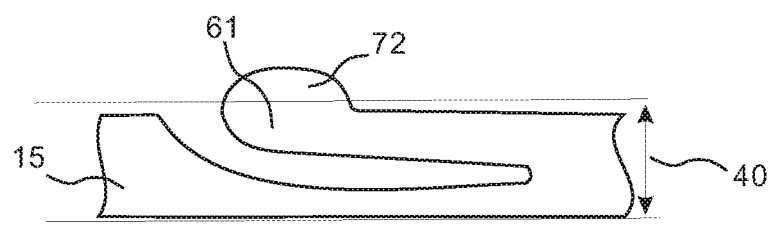

FIGS. 16a-16e show embodiments of a flexible tongue 15 with protrusions. FIG. 16a shows protrusions 61 with beveled or rounder tips (71). FIG. 16b shows the protrusions in a compressed position when they are pressed into the displacement groove 40. FIG. 16c shows round shapes 72 at the outer part of the protrusions, which facilitates installations with vertical folding from both long edges.

Figure 16D:
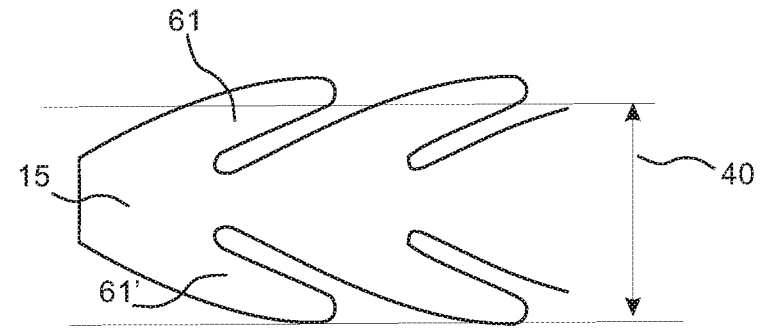
Figure 16E:
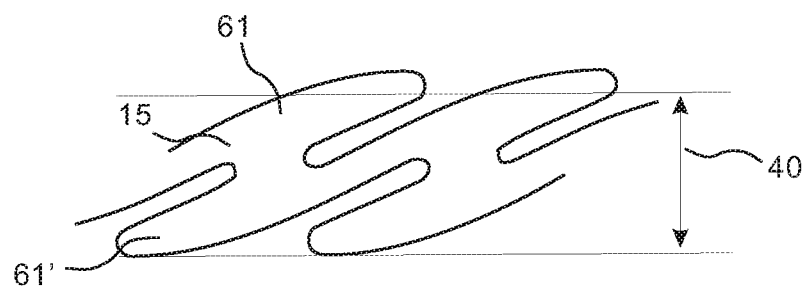

FIGS. 16d and 16e show embodiments with double protrusions 16, 16' inside and outside the displacement groove 40. All embodiments could be combined. For example, a tongue with double protrusions as in FIGS. 16d and 16e could have rounder outer parts 72 as in FIG. 16c.

Figure 16F:
FIGS. 16f-g show embodiments of the tongue according to the invention.
Figure 16G:
Figure 16H:
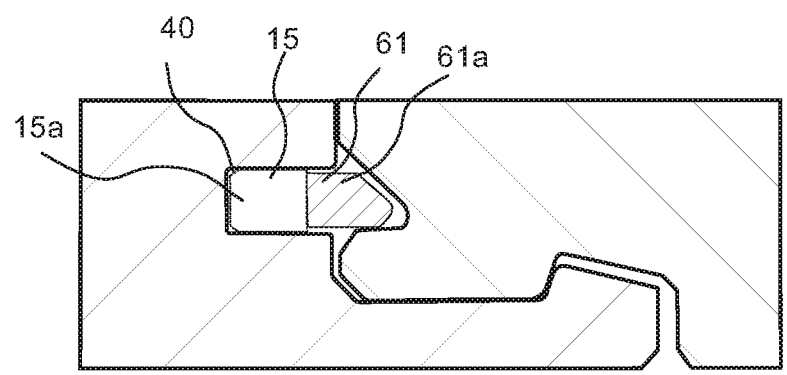
FIGS. 16h-i show embodiments of the invention.

FIGS. 16h and 16a-b show that the flexible tongue 15 could have a body 15a which is slightly thicker than the part of the part 61a of the protrusion 61 which is displaceable in the displacement groove 40 during locking. The play between the displacement grove and the protrusion reduces the friction and facilitates a reliable displacement of the protrusion 61. It is preferred that protrusions and flexible parts are such that the parts of the tongue which lock in the tongue groove exert a pressure force in locked position. An example is a tongue, which comprise flexible parts, which after 100 hours of compression, corresponding to the compression during vertical folding, could spring back to a position, which is at least 90% of their initial position.

FIGS. 16f and 16g show embodiments of the tongue, which are symmetric in a vertical plane perpendicular to the edge of the floor panel. These tongues have the same properties for both folding directions. The tongue in FIG. 16g with protrusions extending outwards at both ends of the tongue also has the advantage of support at the outer most edge of the tongue. In another preferred embodiment of a tongue with protrusions only in one direction, the tongue is symmetric in a horizontal plane, which gives the advantage that it is possible to turn the tongue upside down, resulting in the same properties for both folding directions.

Figure 16I:
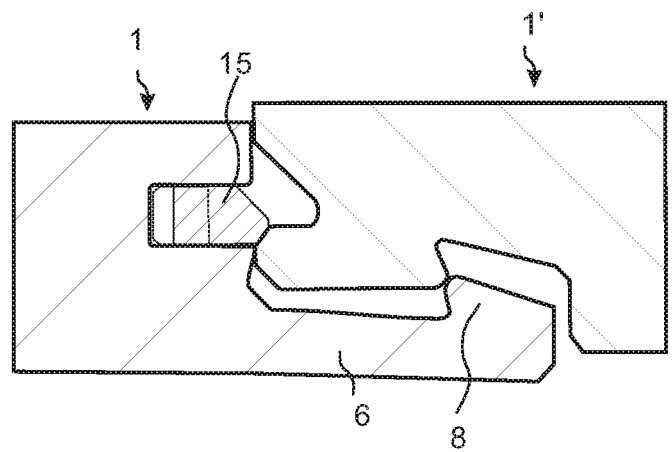

A locking surface of a locking element 8 at a locking strip 6 could be made with different angles, bevels and radius. The locking surface of the locking element 8 may e.g., extend inwardly towards the upper edge of the panel, as shown in FIG. 16*i*. The vertical locking could in such an embodiment consist of a flexible tongue 15 and a locking element 8 on a locking strip 6.

FIG. 17*a* shows a flexible tongue 15 with flexible tab 75 extending upwards. The flexible tongue is connected to the folding panel 1.

FIG. 17*b* shows a flexible tongue 15 with flexible tab 75 extending downwards. The flexible tongue is connected to the edge, which has a locking strip 6 extending from the edge. This embodiment is an improvement of the locking system shown in FIG. 17*a* since the flexible tab is not displaced by a sharp panel edge. The folding panel could be formed with a sliding surface 23, which facilitates the displacement of the snap tab 75. The snap tab could be designed with a pre-tension, which presses the folding panel downwards in locked position. The tongue with the flexible tab 75 could be combined with a bow shaped form or protrusions according to the main principles of the invention.

FIG. 17*c* shows that a flexible tab 75 could be located inside a displacement groove. It could be directed upwards or downwards and a separate tongue could have flexible tabs inside and/or outside a displacement groove.

FIG. 17*d* shows an embodiment with two displaceable tongues 15, 15' over and under each other. FIG. 17*e* shows that the flexible tongue could be locked against a part of the locking strip 6. All tongues shown in this application could be used in such locking systems.

A flexible tongue with protrusion could be used to lock very thin floor panels for example about 6 mm and even thinner. Even with a vertical thickness of a flexible tongue of about 1 mm a strong vertical locking could be obtained. Protrusions could be made extremely small. They could for example extent only about 1 mm or even less into the tongue groove and there could be more than 1 protrusion per 10 mm of the tongue length.

The invention claimed is:

1. A building panel having an edge portion presenting a sidewardly open groove, wherein a tongue formed as a separate part is received in the sidewardly open groove, wherein the tongue is of an elongated shape and made of molded plastic,
    wherein the tongue comprises at least two protrusions at a first long edge of the tongue,
    wherein the at least two protrusions are configured to be bendable in the sidewardly open groove in a plane parallel to an upper surface of the tongue, the at least two protrusions extending essentially along the plane,
    wherein the tongue has a second long edge extending outside the sidewardly open groove,
    wherein the second long edge is straight over portions of the second long edge directly opposite to the at least two protrusions, and
    wherein a length of each of the at least two protrusions is larger than a total width of the tongue.

2. The building panel as claimed in claim 1, wherein the at least two protrusions are configured to extend at least partially into the sidewardly open groove.

3. The building panel as claimed in claim 1, wherein the tongue includes a sliding surface which is inclined relative to a main plane of the building panel.

4. The building panel as claimed in claim 1, wherein a vertical protrusion is arranged at an upper side and/or at a lower side of the at least two protrusions.

5. The building panel as claimed in claim 1, wherein the vertical protrusion is arranged at a distal end of at least one of the at least two protrusions.

6. The building panel as claimed in claim 1, wherein the tongue comprises a polymer material.

7. The building panel as claimed in claim 6, wherein the polymer material is polyamide (nylon), polyoxymethylene, polycarbonate, polypropylene, polyethylene terephthalate, or polyethylene.

8. The building panel as claimed in claim 1, wherein the polymer material is reinforced.

9. The building panel as claimed in claim 8, wherein the polymer material is reinforced with fibers.

10. The building panel as claimed in claim 1, wherein the building panel is a floor panel.

11. The building panel as claimed in claim 1, wherein the first long edge of the tongue comprises a recess at each of the at least two protrusions.

12. The building panel as claimed in claim 11, wherein the recess is sized and configured such that the each of the at least two protrusions is displaceable into the recess.

13. The building panel as claimed in claim 1, wherein the second long edge is straight over substantially a whole length of the tongue.

14. The building panel as claimed in claim 1, wherein the at least two protrusions are bow shaped.

15. The building panel as claimed in claim 1, wherein the length of each of the at least two protrusions is larger than two times the total width of the tongue.

16. The building panel as claimed in claim 15, wherein the total width of the tongue is in a range of about 5 mm to about 11 mm.

17. The building panel as claimed in claim 1, wherein the total width is from the second long edge to an outer tip of one of the at least two protrusions.

18. The building panel as claimed in claim 1, wherein the length of each of the two protrusions is in a range of about 10 mm to about 20 mm.

19. The building panel as claimed in claim 1, wherein the length of each of the at least two protrusions and the total width of the tongue are measured within the plane.

* * * * *